US009898317B2

(12) United States Patent
Nakil et al.

(10) Patent No.: US 9,898,317 B2
(45) Date of Patent: *Feb. 20, 2018

(54) PHYSICAL PATH DETERMINATION FOR VIRTUAL NETWORK PACKET FLOWS

(71) Applicant: Juniper Networks, Inc., Sunnyvale, CA (US)

(72) Inventors: Harshad Bhaskar Nakil, Saratoga, CA (US); Ankur Singla, Belmont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/406,107

(22) PCT Filed: Jun. 5, 2013

(86) PCT No.: PCT/US2013/044378
§ 371 (c)(1),
(2) Date: Dec. 5, 2014

(87) PCT Pub. No.: WO2013/184846
PCT Pub. Date: Dec. 12, 2013

(65) Prior Publication Data
US 2015/0244617 A1    Aug. 27, 2015

Related U.S. Application Data

(63) Continuation-in-part of application No. 13/843,500, filed on Mar. 15, 2013, now Pat. No. 8,750,288, and
(Continued)

(51) Int. Cl.
*G06F 9/455* (2006.01)
*H04L 12/26* (2006.01)
(Continued)

(52) U.S. Cl.
CPC .......... *G06F 9/45558* (2013.01); *G06F 9/455* (2013.01); *G06F 11/07* (2013.01);
(Continued)

(58) Field of Classification Search
None
See application file for complete search history.

(56) References Cited

U.S. PATENT DOCUMENTS 5,027,354 A    6/1991   Ara et al.
5,251,205 A    10/1993  Callon et al.
(Continued)

FOREIGN PATENT DOCUMENTS

CN    1791054 A      6/2006
CN    1913482 A1     2/2007
(Continued)

OTHER PUBLICATIONS

Search Report from Counterpart European Application No. 15153235.5-1857, dated Apr. 30, 2015, 4 pp.
(Continued)

*Primary Examiner* — Chirag Shah
*Assistant Examiner* — Srinivasa Reddivalam
(74) *Attorney, Agent, or Firm* — Shumaker & Sieffert, P.A.

(57) ABSTRACT

In general, techniques are described for configuring and managing virtual networks. For example, a distributed virtual network controller is described that configures and manages an overlay network within a physical network formed by plurality of switches. A plurality of servers are interconnected by the switch fabric, each of the servers comprising an operating environment executing one or more virtual machines in communication via the overlay networks. The servers comprises a set of virtual switches that extends the overlay network as a virtual network to the
(Continued)

operating environment of the virtual machines. The controller may instruct the servers and the virtual switches to perform various operations, such as determining a physical network path taken by packets of a network packet flow, determining latency through the network, re-routing traffic in the virtual network due to network events, replicating traffic for multicasting, providing multi-tenant services to support multiple virtual networks, monitoring and logging traffic characteristics within the virtual networks and other operations.

22 Claims, 29 Drawing Sheets

Related U.S. Application Data a continuation-in-part of application No. 13/840,902, filed on Mar. 15, 2013, now Pat. No. 8,953,441, which is a continuation-in-part of application No. 13/843,365, filed on Mar. 15, 2013, now Pat. No. 9,374,270, and a continuation-in-part of application No. 13/835,017, filed on Mar. 15, 2013, now Pat. No. 8,959,185, which is a continuation-in-part of application No. 13/843,241, filed on Mar. 15, 2013, now Pat. No. 8,755,377, which is a continuation-in-part of application No. 13/840,657, filed on Mar. 15, 2013, now Pat. No. 9,094,308, which is a continuation-in-part of application No. 13/841,736, filed on Mar. 15, 2013, now Pat. No. 9,710,762.

(60) Provisional application No. 61/729,474, filed on Nov. 23, 2012, provisional application No. 61/723,684, filed on Nov. 7, 2012, provisional application No. 61/723,685, filed on Nov. 7, 2012, provisional application No. 61/722,696, filed on Nov. 5, 2012, provisional application No. 61/721,979, filed on Nov. 2, 2012, provisional application No. 61/721,994, filed on Nov. 2, 2012, provisional application No. 61/718,633, filed on Oct. 25, 2012, provisional application No. 61/656,468, filed on Jun. 6, 2012, provisional application No. 61/656,469, filed on Jun. 6, 2012, provisional application No. 61/656,471, filed on Jun. 6, 2012.

(51) Int. Cl.
*H04L 12/24* (2006.01)
*G06F 11/07* (2006.01)
*H04L 29/14* (2006.01)
*H04L 12/931* (2013.01)
*H04L 29/12* (2006.01)

(52) U.S. Cl.
CPC ...... *H04L 41/0631* (2013.01); *H04L 41/0856* (2013.01); *H04L 43/0852* (2013.01); *H04L 43/10* (2013.01); *H04L 69/40* (2013.01); *G06F 2009/45595* (2013.01); *H04L 41/0893* (2013.01); *H04L 49/70* (2013.01); *H04L 61/103* (2013.01)

(56) References Cited

U.S. PATENT DOCUMENTS

| | | |
|---|---|---|
| 6,760,328 B1 | 7/2004 | Ofek |
| 6,778,531 B1 | 8/2004 | Kodialam et al. |
| 6,781,959 B1 | 8/2004 | Garakani et al. |
| 6,985,490 B2 | 1/2006 | Czeiger et al. |
| 7,042,838 B1 | 5/2006 | Shand et al. |
| 7,178,059 B2 | 2/2007 | Greenspan et al. |
| 7,184,437 B1 | 2/2007 | Cole et al. |
| 7,215,667 B1 | 5/2007 | Davis |
| 7,500,014 B1 | 3/2009 | Jacobson et al. |
| 7,519,006 B1 | 4/2009 | Wing |
| 7,937,492 B1 | 5/2011 | Kompella et al. |
| 7,941,539 B2 | 5/2011 | Tripathi et al. |
| 7,965,699 B1 | 6/2011 | Accardi et al. |
| 8,018,860 B1 | 9/2011 | Cook |
| 8,018,938 B1 | 9/2011 | Fromm et al. |
| 8,089,905 B2 | 1/2012 | Umeshima |
| 8,254,273 B2 | 8/2012 | Kaminsky et al. |
| 8,291,468 B1 | 10/2012 | Chickering |
| 8,339,959 B1 | 12/2012 | Moisand et al. |
| 8,429,647 B2 | 4/2013 | Zhou et al. |
| 8,638,799 B2 | 1/2014 | Mudigonda et al. |
| 8,699,499 B2 | 4/2014 | Mulligan et al. |
| 8,750,288 B2 | 6/2014 | Nakil et al. |
| 8,755,377 B2 | 6/2014 | Nakil et al. |
| 8,806,025 B2 | 8/2014 | Hummel et al. |
| 8,909,602 B2 | 12/2014 | Soundararajan et al. |
| 8,953,441 B2 | 2/2015 | Nakil et al. |
| 8,953,443 B2 | 2/2015 | Yang et al. |
| 8,958,293 B1 | 2/2015 | Anderson |
| 8,959,185 B2 | 2/2015 | Nakil et al. |
| 9,014,191 B1 | 4/2015 | Mandal et al. |
| 2003/0126233 A1 | 7/2003 | Bryers et al. |
| 2004/0057378 A1 | 3/2004 | Gronberg |
| 2004/0210619 A1 | 10/2004 | Balachandran et al. |
| 2005/0108356 A1 | 5/2005 | Rosu et al. |
| 2005/0163115 A1* | 7/2005 | Dontu .......... H04L 12/46 370/389 |
| 2007/0025256 A1 | 2/2007 | Hertoghs et al. |
| 2007/0147372 A1 | 6/2007 | Liu et al. |
| 2007/0195787 A1 | 8/2007 | Alnuweiri et al. |
| 2007/0195797 A1 | 8/2007 | Patel et al. |
| 2008/0144625 A1* | 6/2008 | Wu .......... H04L 12/4641 370/392 |
| 2008/0240122 A1* | 10/2008 | Richardson .......... H04L 12/4641 370/401 |
| 2009/0006710 A1 | 1/2009 | Daniel et al. |
| 2009/0052894 A1 | 2/2009 | Murata |
| 2009/0199177 A1* | 8/2009 | Edwards .......... G06F 9/5077 718/1 |
| 2009/0327392 A1 | 12/2009 | Tripathi et al. |
| 2010/0014526 A1 | 1/2010 | Chavan et al. |
| 2010/0057649 A1 | 3/2010 | Lee et al. |
| 2010/0061242 A1 | 3/2010 | Sindhu et al. |
| 2010/0214949 A1* | 8/2010 | Smith .......... H04L 45/586 370/254 |
| 2011/0090911 A1 | 4/2011 | Hao et al. |
| 2011/0103259 A1 | 5/2011 | Aybay et al. |
| 2011/0264610 A1 | 10/2011 | Armstrong et al. |
| 2011/0276963 A1 | 11/2011 | Wu et al. |
| 2011/0299528 A1 | 12/2011 | Yu et al. |
| 2011/0317696 A1 | 12/2011 | Aldrin et al. |
| 2012/0011170 A1 | 1/2012 | Elad et al. |
| 2012/0027018 A1 | 2/2012 | Ilyadis |
| 2012/0051358 A1 | 3/2012 | Bellagamba et al. |
| 2012/0110186 A1 | 5/2012 | Kapur et al. |
| 2012/0110393 A1 | 5/2012 | Shieh et al. |
| 2012/0170578 A1 | 7/2012 | Anumala et al. |
| 2012/0207161 A1 | 8/2012 | Uppalli et al. |
| 2012/0230186 A1 | 9/2012 | Lee et al. |
| 2012/0233668 A1* | 9/2012 | Leafe .......... G06F 9/5022 726/4 |
| 2012/0257892 A1 | 10/2012 | Boyd et al. |
| 2012/0320795 A1 | 12/2012 | Shukla et al. |
| 2013/0028073 A1 | 1/2013 | Tatipamula et al. |
| 2013/0044641 A1 | 2/2013 | Koponen et al. |
| 2013/0074066 A1 | 3/2013 | Sanzgiri et al. |
| 2013/0100816 A1 | 4/2013 | Bergamasco et al. |
| 2013/0003725 A1 | 6/2013 | Hendel et al. |
| 2013/0142202 A1 | 6/2013 | Cors et al. |
| 2013/0163606 A1 | 6/2013 | Bagepalli et al. |
| 2013/0215754 A1 | 8/2013 | Tripathi et al. |
| 2013/0215769 A1 | 8/2013 | Beheshti-Zavareh et al. |
| 2013/0232492 A1 | 9/2013 | Wang |
| 2013/0235870 A1 | 9/2013 | Tripathi et al. |

(56) References Cited

U.S. PATENT DOCUMENTS

| | | |
|---|---|---|
| 2013/0238885 A1 | 9/2013 | Tripathi et al. |
| 2013/0242983 A1 | 9/2013 | Tripathi et al. |
| 2013/0294243 A1 | 11/2013 | Wiley et al. |
| 2013/0315596 A1 | 11/2013 | Rollet |
| 2013/0322237 A1 | 12/2013 | DeCusatis et al. |
| 2013/0329548 A1 | 12/2013 | Nakil et al. |
| 2013/0329571 A1 | 12/2013 | Shimokawa et al. |
| 2013/0329584 A1 | 12/2013 | Ghose et al. |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332601 A1 | 12/2013 | Nakil et al. |
| 2013/0346531 A1 | 12/2013 | Hummel et al. |
| 2013/0346665 A1 | 12/2013 | Freking et al. |
| 2014/0056298 A1 | 2/2014 | Vobbilisetty et al. |
| 2014/0059537 A1 | 2/2014 | Kamble et al. |
| 2014/0126418 A1* | 5/2014 | Brendel .............. H04L 12/4641 370/254 |
| 2014/0129700 A1 | 5/2014 | Mehta et al. |
| 2014/0129753 A1 | 5/2014 | Schuette et al. |
| 2014/0146705 A1 | 5/2014 | Luxenberg et al. |
| 2014/0195666 A1 | 7/2014 | Dumitriu et al. |
| 2014/0229941 A1 | 8/2014 | Bert et al. |
| 2014/0233568 A1 | 8/2014 | Dong |
| 2014/0269321 A1 | 9/2014 | Kamble et al. |
| 2014/0301197 A1 | 10/2014 | Birke et al. |
| 2015/0032910 A1 | 1/2015 | Ben Yehuda et al. |
| 2015/0172201 A1 | 6/2015 | DeCusatis et al. |

FOREIGN PATENT DOCUMENTS

| | | |
|---|---|---|
| CN | 101150499 A1 | 3/2008 |
| CN | 101658001 A | 2/2010 |
| CN | 102281148 A | 12/2011 |
| EP | 1482689 A2 | 1/2004 |
| EP | 1549002 A1 | 6/2005 |
| WO | 2008088402 A1 | 7/2008 |
| WO | 2013184846 A1 | 12/2013 |

OTHER PUBLICATIONS

"Cloud Computing and Security—A Natural Match," Trusted Computing Group, Apr. 2010, 5 pp.

Hopps, "Analysis of an Equal-Cost Multi-Path Algorithm," Network Working Group, RFC 2992, Nov. 2000, 8 pp.

"TCG Trusted Network Connect, TNC IF-MAP Binding for SOAP," TCG Published, Specification version 2.1, Revision 15, May 7, 2012, 81 pp.

"Trusted Multi-Tenant Infrastructure Work Group FAQ," Trusted Computing Group, Sep. 2010, 2 pp.

Invitation to Pay Additional Fees from International Application No. PCT/US2013/044378, dated Sep. 18, 2013, 5 pp.

Notification of Transmittal of the International Search Report from International Application No. PCT/US2013/044378, dated Nov. 7, 2013, 16 pp.

Prosecution History from U.S. Appl. No. 13/843,500, dated Oct. 7, 2013 through Jan. 24, 2014, 24 pp.

Prosecution History from U.S. Appl. No. 13/840,657, dated Sep. 18, 2014 through Jan. 5, 2015, 47 pp.

Prosecution History from U.S. Appl. No. 13/840,902, dated Sep. 22, 2014 through Nov. 24, 2014, 25 pp.

Prosecution History from U.S. Appl. No. 13/843,365, dated Dec. 22, 2014 through Dec. 22, 2014, 25 pp.

Prosecution History from U.S. Appl. No. 13/835,017, dated Dec. 19, 2014 through Dec. 19, 2014, 8 pp.

Extended Search Report from Counterpart European Patent Application No. 15153261.1, dated Mar. 3, 2015, 5 pp.

Prosecution History from U.S. Appl. No. 13/843,241, dated Sep. 27, 2013 through May 20, 2014, 52 pp.

Marques et al., "BGP-Signaled End-System IP/VPNs," draft-ietf-l3vpn-end-system-00, Network Working Group, Internet Draft, Oct. 2012, 21 pp.

First Office Action, and translation thereof, from counterpart Chinese Patent Application No. 2015101532630, dated Nov. 26, 2015, 10 pp.

"TNC IF-MAP Binding for SOAP," Trusted Computing Group, May 7, 2012, 81 pp.

Office Action, in the Chinese language, from counterpart Chinese Application No. 201610371801.8, dated Dec. 5, 2016, 6 pp.

Extended European Search Report from counterpart European Application No. 16175568.1, dated Dec. 16, 2016, 7 pp.

"Amazon CloudWatch Developer Guide API Version Aug. 1, 2010 ," Amazon Web Services LLC, 2011, 84 pp. (Note: Applicant points out in accordance with MPEP 609.04(a) that the 2011 year of publication is sufficiently earlier than the effective U.S. filing date and any foreign priority date of Jun. 19, 2014 so that the particular month of publication is not in issue.).

"PCI Express—An Overview of the PCI Express Standard," National Instruments, Aug. 13, 2009, 6 pp.

Amendment in Response to Office Action dated Jul. 13, 2016, from U.S. Appl. No. 14/309,714, filed Oct. 13, 2016, 11 pp.

Final Office Action from U.S. Appl. No. 14/309,714, dated Oct. 25, 2016, 21 pp.

Handigol et al., "Aster*x: Load-Balancing Web Traffic over Wide-Area Networks," 9th GENI Engineering Conference (GEC9), Nov. 2, 2010, 4 pp.

Kim et al, "Internet Protocol Engine in TCP/IP Offloading Engine," 10th International Conference on Advanced Communication Technology, Feb. 17-20, 2008, 6 pp.

Office Action from U.S. Appl. No. 14/309,714, dated Jul. 13, 2016, 26 pp.

U.S. Appl. No. 13/724,975, by Santosh Kumar Dornal, filed Dec. 21, 2012.

U.S. Appl. No. 14/309,714, by Pradeep Sindhu, filed Jun. 19, 2014.

Zhu et al., "Tunnel Congestion Exposure," Internet Draft: draft-zhang-tsvwg-tunnel-congestion-exposure-00, Oct. 15, 2012, 16 pp.

First Office Action and Search Report, and translation thereof, from counterpart Chinese Application No. 201380041497.5, dated Nov. 2, 2016, 8 pp.

Response to Extended Search Report dated Dec. 16, 2016, from counterpart European Application No. 16175568.1, filed Jul. 17, 2017, 5 pp.

\* cited by examiner

PHYSICAL PATH DETERMINATION FOR VIRTUAL NETWORK PACKET FLOWS

PRIORITY CLAIM

This application is a national stage entry under 35 U.S.C. § 371 of International Application No. PCT/US2013/044378 filed Jun. 5, 2013 which is a continuation-in-part of each of U.S. application Ser. No. 13/843,500 filed Mar. 15, 2013, now issued U.S. Pat. No. 8,750,288, U.S. application Ser. No. 13/840,902 filed Mar. 15, 2013, U.S. application Ser. No. 13/843,365 filed Mar. 15, 2013, U.S. application Ser. No. 13/835,017 filed Mar. 15, 2013, U.S. application Ser. No. 13/843,241 filed Mar. 15, 2013, now issued U.S. Pat. No. 8,755,377, U.S. application Ser. No. 13/840,657 filed Mar. 15, 2013 and U.S. application Ser. No. 13/841,736 filed Mar. 15, 2013, and which claims the benefit of each of U.S. Provisional Application No. 61/729,474, filed Nov. 23, 2012; U.S. Provisional Application No. 61/723,684, filed Nov. 7, 2012; U.S. Provisional Application No. 61/723,685, filed Nov. 7, 2012; U.S. Provisional Application No. 61/722,696, filed Nov. 5, 2012; U.S. Provisional Application No. 61/721,979, filed Nov. 2, 2012; U.S. Provisional Application No. 61/721,994, filed Nov. 2, 2012; U.S. Provisional Application No. 61/718,633, filed Oct. 25, 2012; U.S. Provisional Application No. 61/656,468, filed Jun. 6, 2012; U.S. Provisional Application No. 61/656,469, filed Jun. 6, 2012; and U.S. Provisional Application No. 61/656,471, filed Jun. 6, 2012; the entire content of each being incorporated herein by reference.

TECHNICAL FIELD

The invention relates to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, techniques are described for configuring and managing virtual networks. For example, a virtual network controller is described that configures and manages an overlay network within a physical network formed by plurality of switches. A plurality of servers are interconnected by the switch fabric, and each of the servers provide an operating environment executing one or more virtual machines in communication via the overlay networks. The servers comprise a set of virtual switches that extends the overlay network as a virtual network to the operating environment of the virtual machines. The controller may instruct the servers and the virtual switches to perform various operations, such as determining a physical network path taken by packets of a network packet flow, determining latency through the network, re-routing traffic in the virtual network due to network events, replicating traffic for multicasting, providing multi-tenant services to support multiple virtual networks, monitoring and logging traffic characteristics within the virtual networks and other operations.

Techniques for facilitating the operation of one or more virtual networks using a distributed virtual network controller are also described. The system may include a first controller node device configured to control operation of a first set of elements in the one or more virtual networks. The system may further include a second controller node device configured to control operation of a second set of elements in the one or more virtual networks. The first controller node device and the second controller node device may be peered using a peering protocol and may be peers according to the peering protocol. The system may include hardware (and software) associated with one or more of the first controller node device and the second controller node device.

In some examples, a system includes a first set of elements and a second set of elements that implement one or more virtual networks. The system also includes a first server device and a second server device each connected to a network by a switch fabric. The system also includes a first controller node device configured to control operation of the first set of elements in the one or more virtual networks, wherein the first set of elements includes the first server device. The system further includes a second controller node device configured to control operation of the second set of elements in the one or more virtual networks, wherein the second set of elements includes the second server device, wherein the first controller node device and the second controller node device are peers according to a peering protocol by which the first controller node device and the second controller node device exchange information relating to the operation of the first set of elements and the second set of elements.

In some examples, a method for facilitating operation of one or more virtual networks, the one or more virtual networks including a first server device and a second server device each connected to a network by a switch fabric, includes using a first controller node device to control operation of a first set of elements in the one or more virtual networks, wherein the first set of elements includes the first server device. The method also includes using a second controller node device to control operation of a second set of elements in the one or more virtual networks, wherein the second set of elements includes the second server device. The method further includes peering the first controller node device and the second controller node device using a peering protocol to exchange information, between the first controller node device and the second controller node device, relating to the operation of the first set of elements and the second set of elements.

In some examples, a virtual network controller node device includes one or more processors and a control plane virtual machine executed by the processors to communicate with a plurality of virtual network switches using an eXtensible Messaging and Presence Protocol (XMPP). The virtual network controller node device also includes a configuration virtual machine to store and manage a configuration database that includes configuration information for the virtual network switches. The virtual network controller node device also includes an analytics virtual machine to store and manage an analytics database that includes logging information for the virtual network switches, wherein the configuration virtual machine and analytics virtual machine communicate with the control plane virtual machine using an Interface for Metadata Access Points protocol, wherein the control plane virtual machine configures the virtual network switches by using XMPP to send route data and configuration information to the virtual network switches, and wherein the control plane virtual machine uses XMPP to receive logging information for the virtual network switches and routes the logging information to the analytics virtual machine for storage to the analytics database.

In some examples, a network system comprises a switch fabric comprising a plurality of switches and a distributed controller having a set of controller node devices in peer communication with each other in accordance with a peering protocol, wherein each of the controller node devices configures and manages an overlay network within the plurality of switches. The network system also comprises a plurality of servers interconnected by the switch fabric, wherein each of the servers comprises an operating environment executing one or more virtual machines in communication via the overlay networks, and wherein the servers comprises a set of virtual switches that extends the overlay network as virtual networks to the operating environment of the virtual machines.

In addition, techniques are described for determining a physical network path taken by packets of a network packet flow, such as within the virtual networks described herein. The techniques may be applied to determine, or "trace," a physical network path in the virtualized network domain. In a virtualized or overlay network environment, the edge of the network extends from a physical network element (e.g., a switch or a router) to software switches (i.e., virtual switches) each executed by a hypervisor or a host operating system of a physical server. In such an environment, physical servers may execute application instances that communicate by exchanging layer three (L3 or "network") packets using a virtual network that is implemented by one or more software switches and that is orthogonal from the physical network and the corresponding physical addressing scheme. Virtual network elements (which include both the virtual switches and physical network elements) encapsulate packets generated or consumed by instances of the application in the virtual network domain in a tunnel header that includes addresses that conform to the physical network addressing scheme. Accordingly, and hereinafter, a packet generated or consumed by application instances may be referred to as an in "inner packet," while the physical network packet that includes the inner packet encapsulated within the added tunnel header may be referred to as an "outer packet." The tunnel header allows the physical network to tunnel the inner packet toward a destination virtual switch for delivery to a destination application instance. In some cases, the tunnel header may include sub-headers for multiple layers, such as a transport layer (e.g., Transmission Control Protocol (TCP) or User Datagram Protocol (UDP) header), network layer, and/or tunneling layer.

In some examples, a virtual network element receives a request to determine a physical network path taken by packets of a network packet flow. For a packet that corresponds to a particular packet flow, the virtual network element generates a first flow trace packet that has one or more tunnel header fields identical to packets of the packet flow. As a result, the first flow trace packet will traverse a physical network path identical to packets of the packet flow. To determine a first next hop along the physical network path taken by the packet flow, the virtual network element sets a time-to-live (TTL) value for the flow trace packet to 1, then forwards the first flow trace packet to the first next hop according to the virtual network element network forwarding table. Because the TTL value for the first flow trace packet is set to 1, the first next hop discards the first flow trace packet and returns a Time Exceeded message for the first flow trace packet, such as an Internet Control Message Protocol (ICMP) Time Exceeded message. The time exceeded message includes a network address of the first next hop. The virtual network element iterates TTL values on successive flow trace packets, otherwise similar to the first flow trace packet, and forwards the successive flow trace packets according to the virtual network element forwarding table. Successive next hops along the physical path for the packet flow therefore each receives a flow trace packet with TTL value set to 1 and each returns a time exceeded message. The virtual network element can use the returned time exceeded messages returned from physical next hops along the physical path to generate a list of the physical next hops, which the virtual network element can return to a device that has requested the physical network path.

Because the flow trace packet is a trace packet and may not include application data for an application, the virtual network element may in some instances add a special flow trace packet indicator to a field of the tunnel header of flow trace packets. A tunnel termination virtual network element, or "tunnel endpoint," ordinarily decapsulates received outer packets of the tunneled packet flow to remove the outer header and forwards the resulting inner packet toward an application. The flow trace packet indicator indicates to the tunnel endpoint that a received packet is a flow trace packet and should be discarded rather than forwarded. The tunnel endpoint therefore identifies packet flow packets that include the flow trace packet indicator and discards the packet. In some instances, the tunnel endpoint may have previously received an antecedent flow trace packet for the packet flow for which the tunnel endpoint returned a time exceeded message to the issuing virtual network element. In some examples, the tunnel endpoint may return an ICMP Echo Reply message or other confirmation message upon receiving a flow trace packet to the issuing virtual network element in order to confirm receipt of the flow trace packet at the termination of the tunnel.

The techniques described herein may provide one or more advantages. For example, the techniques may allow for determination of a physical network path for a packet flow traversing a virtualized network domain. Determining a physical network path for a packet flow using the described techniques may also overcome certain limitations of the network trace route utility conventionally used to determine a physical network path. In some cases, multiple paths of equal cost exist between a virtual network element and a destination. The virtual network element may allocate packet flows having the same source and destination to different equal-cost paths according to the particularities of packet flow packet headers. In contrast to the trace route utility, which may produce ICMP echo request messages that form a packet flow allocated by a virtual network element to a different one of the multiple paths, the techniques may ensure that the path taken by the flow trace packets matches the physical network path taken by a corresponding packet flow in a multi-path environment.

In one aspect, a method for determining a physical network path of a packet flow includes generating, with a network device, one or more flow trace packets having incrementally increasing respective time-to-live (TTL) values. The method also includes sending, with the network device, the flow trace packets on an outbound interface of the network device for the physical network path. The method further includes receiving, with the network device, corresponding time exceeded messages for the flow trace packets, wherein each of the time exceeded message includes a source network address of a network element on the physical network path.

In another aspect, a network device includes one or more processors and a switch executed by the processors to forward packets of a packet flow to a physical network path. The network device also includes a flow trace module to generate one or more flow trace packets having incrementally increasing respective time-to-live (TTL) values, wherein the switch module forwards the flow trace packets on an outbound interface of the network device for the physical network path, wherein the flow trace module receives corresponding time exceeded messages for the flow trace packets, and wherein each of the time exceeded message includes a source network address of a network element on the physical network path.

In another aspect, a non-transitory computer-readable medium contains instructions. The instructions cause one or more programmable processors to generate, with a network device, one or more flow trace packets having incrementally increasing respective time-to-live (TTL) values. The instructions further cause the programmable processors to send, with the network device, the flow trace packets on an outbound interface of the network device for the physical network path. The instructions further cause the programmable processors to receive, with the network device, corresponding time exceeded messages for the flow trace packets, wherein each of the time exceeded message includes a source network address of a network element on a physical network path. The instructions also cause the programmable processors to determine, with the network device, the physical network path using the source network addresses of the time exceeded message.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
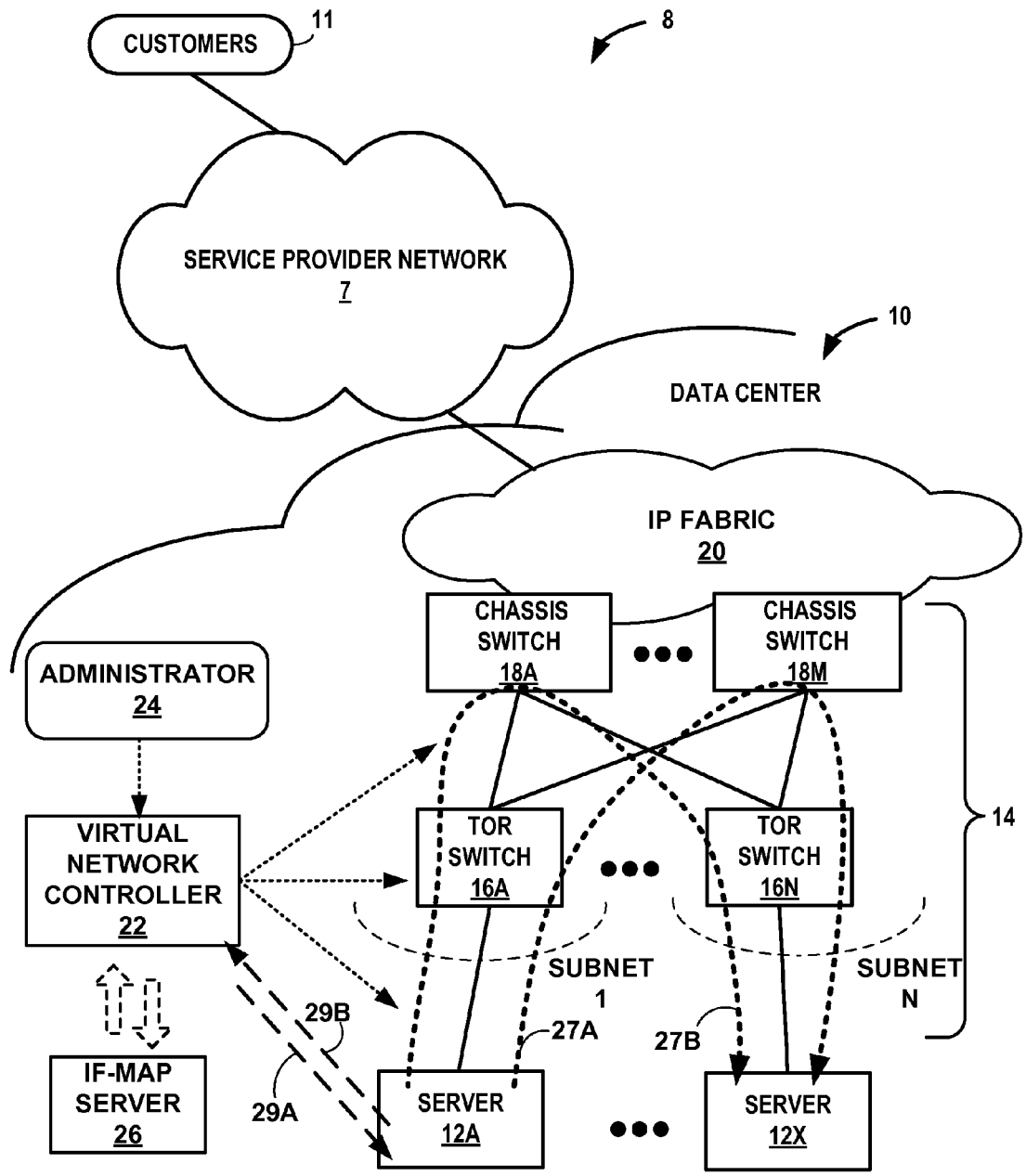
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header to a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each individual switch router in the network may perform its own independent hashing computation to determine the path that will be used by a particular flow. The ECMP paths between the first and second network devices may be viewed by the virtual network as one physical connection, as their packet (inner packet) is encapsulated by an outer IP header.

In the example of FIG. 1, multiple paths 27A-27B (collectively, "path 27") of equal routing cost exist from server 12A to server 12X. Path 27B traverses a physical network path proceeding from server 12A and consisting of TOR switch 16A, chassis switch 18A, TOR switch 16N, and server 12X. Path 27A, by contrast, traverses a physical network path proceeding from server 12A and consisting of TOR switch 16A, chassis switch 18M, TOR switch 16N, and server 12X. Server 12A may allocate packet flows, generated by applications executing on server 12A (not shown in FIG. 1), to any of paths 27 according to an allocation scheme. The allocation scheme may allocate packets according to an invariant selection of the packet header fields, including source IP address, destination IP address, IP protocol (IPv4) or next header (IPv6), transport layer source port, and/or transport layer destination port, for example. Invariant is used to refer to packet fields that do not change among packets belonging to a packet flow. Packets belonging to a packet flow allocated to path 27A, for example, traverse path 27A to reach server 12X.

In accordance with techniques described in this disclosure, server 12A may receive a request 29A to determine a physical network path traversed by packets of a particular packet flow that server 12A has allocated to path 27A. Server 12A generates a first flow trace packet that has at least the packet header fields identical to packets of the requested packet flow sufficient to cause server 12A to match the first flow trace packet to the packet flow according to the allocation scheme and thereby cause the first flow trace packet to be forwarded according to path 27A. As a result, the first flow trace packet will traverse a physical network path identical to packets of the packet flow.

To determine a first next hop along the physical network path taken by the packet flow, server 12A sets a time-to-live (TTL) value for the flow trace packet to 1, then forwards the first flow trace packet to the first next hop of path 27A, i.e., TOR switch 16A. Because the TTL value for the first flow trace packet is set to 1, TOR switch 16A decrements the TTL value to zero, discards the first flow trace packet, and returns an Internet Control Message Protocol (ICMP) Time Exceeded message for the first flow trace packet, which includes a network address of TOR switch 16A. Although described as an ICMP Time Exceeded Message, the time exceeded message may include another type of message that indicates TOR switch 16A has received an IP packet having TTL value=1.

Server 12A generates a second flow trace packet, otherwise similar to the first flow trace packet, but increments the TTL value to set the TTL value on the second flow trace packet to 2. Server 12A forwards the second flow trace packet along path 27A. Chassis switch 18M receives the second flow trace packet, discards the packet, and responsively returns an ICMP Time Exceeded message to server 12A. Server 12A iteratively generates additional flow trace packets for the packet flow, incrementing the TTL value with each successive flow trace packet and forwarding the additional flow trace packets along path 27A. As a result, successive next hop along the path 27A each receives, for the packet flow, a flow trace packet with zero TTL and each returns an ICMP Time Exceeded message to server 12A. In contrast to the trace route utility, which if executed by server 12A would produce ICMP echo request messages that form a packet flow that could be allocated by server 12A to path 27B, the techniques may ensure that the path taken by the flow trace packets matches the physical network path taken by a corresponding packet flow, i.e., path 27A in a multi-path environment. Server 12A can use the returned ICMP Time Exceeded messages returned from physical next hops along path 27A to generate a list of the physical next hops, which server 12A returns to VNC 22 in response 29B. In some instances, the techniques described above as being performed by server 12A may instead, or additionally, be performed by elements of switch fabric 14 such as TOR switches 16 and chassis switches 18.

In a virtual network as shown in the example of FIG. 1, network controller 22 may direct techniques to find the real latency using a statistical technique. Typically, the virtual network domain is controlled separately from the physical network domain and, as a result, the ability to ascertain the actual path of a packet for a given network flow within the virtual network domain is not straightforward, and typically requires knowledge of the state of the physical network.

One technique that could be employed to determine the path taken by a network IP packet through a switch router network is to use an IP trace-route function, which is supported by most operating systems as well as network operating systems. However, such a trace-route function may not work well when a multi-path latency of any particular flow, i.e., the time it takes for a packet to travel from one network device (e.g., server) to another network device via a particular path of switches and connectors (e.g., within IP fabric 20), is not readily available to the virtual network and to virtual routing technique is employed, as different network flows use different paths through the network and the trace-route packet that is used to ascertain the route will not have the same header as the application packet. Because hashing functions in most network switch routers depends on the packet header, this trace-route packet may not follow the same path.

In accordance with the techniques of this disclosure, one method for determining latency in a multi-path routing environment is to collect statistics on every virtual switch node (e.g., residing on servers 12), that is, every switch node collects data on which packets have traveled through the switch node and when they traveled through the switch node between servers 12. The switch then sends this data to an analytics engine executing on virtual network controller 22. The analytics engine can use the data to calculate latency. Collecting all such data from the virtual switch nodes on all servers 12, however, may result in massive amounts of data, which may be difficult to use effectively and will eat away network bandwidth. So in some exemplary embodiments, an administrator 24 may choose to restrict the data that is gathered. For example, the administrator 24 may specify at virtual network controller 22 that statistics are to be captured for a certain class of traffic, and may also restrict the period of time over which statistic are collected. To capture a certain class of traffic the packet can be used like a match list, called a packet classifier. Virtual network controller 22 can send the packet classifiers down to be installed on the appropriate servers 12.

In order to provide network services for customers 11, servers 12 of data center 10 may exchange large amounts of data with each other via switch fabric 14. In general, it may be desirable for servers 12 to communicate using multicast service. Multicast service involves delivering data through a network to a group of subscribers substantially simultaneously in a single transmission from a source device. In the example of FIG. 1, when two or more of servers 12 are interested in receiving the same multicast data from a source server 12A, for example, the interested servers 12 may request to join a multicast group associated with the multicast data.

In a conventional data center, in order to forward the multicast data from a source server to two or more other servers, the multicast data is replicated, as needed, by the physical network switches and routers within the switch fabric. The network switches and routers used to replicate and forward the multicast data for the multicast group may create a multicast distribution tree through the switch fabric to manage the replication and delivery of the multicast data. In a case where a large number of servers, e.g., 2000 servers, are interconnected by the switch fabric, each pair of servers may have a large number of equal cost paths between them. The physical servers may communicate using unicast service, but multicast service between the physical servers may be more difficult to manage due to the large number of redundant paths in the switch fabric.

In addition, multicast protocols used in the conventional data center may waste bandwidth by not efficiently using all of the available links within the switch fabric. Moreover, the physical switches and routers within the switch fabric may only be able to support a very small number of multicast tables such that the conventional data center will be unable to scale to support the large number of multicast groups necessary for the large number of interconnected servers.

The above issues with providing L3 multicast service between servers in a large data center may not be solved, however, with a virtual overlay network built on the switch fabric to emulate an L2 network between virtual switches executed on the servers. Conventionally, in order for the virtual overlay network to emulate L2 multicast service, the underlying switch fabric must also support multicast service.

In general, this disclosure describes techniques to provide multicast service within a virtual network without requiring multicast support in the underlying network. More specifically, the techniques enable support of L2 multicast service in a virtual overlay network of switch fabric 14 using virtual network controller 22 and endpoint replication. The virtual network controller 22 is configured to create a multicast tree for endpoint devices, e.g., servers 12, of a multicast group in the virtual network. The multicast tree is considered a multicast tree because it is created in a virtual overlay network emulating L2 multicast such that any of servers 12 can be the source server of the multicast traffic, known as bidirectional multicast. The virtual network controller 22 then communicates the multicast tree to one or more of servers 12 of the multicast group to instruct servers 12 to replicate and forward multicast packets to the two or more of servers 12 that belong to the multicast group according to the multicast tree.

According to the techniques, the multicast tree is calculated at virtual network controller 22 instead of in a distributed fashion by network switches and routers in switch fabric 14 that service the multicast group. In addition, the replication and forwarding of multicast packets is performed by virtual switches executed on servers 12 of the virtual network. No replication is performed within the underlying switch fabric 14. In this way, the techniques enable multicast service within a virtual network without requiring multicast support in the underlying network. For example, switch fabric 14 does not need to support L3 multicast, which may make switch fabric 14 simple and easy to manage.

In addition, virtual network controller 22 may create the multicast tree to minimize a replication limit such that several of servers 12 may replicate and forward a small number of multicast packets, instead of a single source server having to incur the load of replicating and forwarding the packets to all the servers that belong to the multicast group. Further, virtual network controller 22 may configure a unique virtual network tunnel encapsulation for each link direction in the multicast tree for the multicast group in order to efficiently use bandwidth in switch fabric 14. The techniques are described in more detail with respect to virtual network controller 22 and servers 12 in FIGS. 2A and 2B.

In some examples, virtual network controller 22 operates as a logging information collector to obtain logging information from different elements of data center 10, including any of chassis switches 18, TOR switches 16, IF-MAP server 26, and any of servers 12 or applications executing thereon. Chassis switches 18, TOR switches 16, IF-MAP server 26, and any of servers 12 may generally be referred to as "generators" herein. Although described below primarily with respect to server 12A, the techniques of this disclosure may therefore be applied to at least any of the aforementioned network elements.

Server 12A is configured to generate logging information in accordance with a baseline extent of logging. Server 12A and other generators of logging information are alternatively referred to herein as "generators." The baseline extent refers to the types and amount of logging information that is collected by generators under ordinary or "baseline" operating circumstances with the logging extent unmodified by VNC 22. Server 12A sends collected logging information to VNC 22 in log messages. Server 12A may send the log messages periodically or responsive to some event, e.g., the generation of new logging information or a certain amount of logging information generated, to update the logging information for server 12A on VNC 22. In the illustrated example, server 12A sends log message 25 including newly-generated logging information to VNC 22.

In accordance with techniques described herein, VNC 22 analyzes the logging information in log message 25 to determine that the extent of logging performed by server 12A should be modified. Virtual network controller 22 therefore generates and sends logging modification message 27 to server 12A to indicate to server 12A the new extent of logging. Server 12A modifies its logging operations to conform to the extent of logging specified by VNC 22, which may include increasing an amount of logging by, e.g., returning state information already stored to memory for an application, directing the application to execute one or more diagnostic subroutines to generate additional logging information, setting a variable or flag that causes the application to generate logging information to a greater extent over the baseline. Server 12A returns the logging information generated in accordance with the increase over the baseline extent in log message 29. In this way, VNC 22 dynamically adapts the extent of logging performed by server 12A to expand the amount of logging information collected when indicated by previously-received logging information (here, the logging information in log message 25).

In some examples, in addition to dynamically adjusting the extent of logging information generated by server 12A, VNC 22 may also direct server 12A to modify a rate of sending log messages. For instance, server 12A may generate log messages for baseline logging information periodically. When directed by VNC 22 according to described techniques, server 12A may increase the rate of log messages and/or may send logging information generated in accordance with the increase over the baseline extent as soon as possible after its generation to rapidly provide the logging information to VNC 22 to facilitate rapid response to the events of interest, e.g., errors and/or exceptions caused by the execution of one or more applications by server 12A.

In some examples, VNC 22 may implement techniques to facilitate multi-tenancy in the context of a vendor-neutral server, such as Interface for Metadata Access Point (IF-MAP) server 26 ("IF-MAP server 26"). IF-MAP server 26 may represent an intermediate network device that stores information in accordance with a vendor-neutral data model. "IF-MAP" originally referred to an authorization data model that provides a standardized authorization data model that vendors may adopt so as to reduce communication or interoperability issues that arise between vendor-specific or proprietary authorization data models. The group responsible for introducing IF-MAP, known as the Trusted Computing Group (TCG), is encouraging vendors to accept this new IF-MAP standard and vendors are releasing devices compliant with this standard.

The IF-MAP standard provides not only a vendor-neutral or cross-vendor data model but also provides an IF-MAP protocol by which to access the authorization information stored according to this standard, vendor-neutral authorization data model. The IF-MAP protocol supports various IF-MAP messages or communications by which to publish authorization information, search authorization information stored within the IF-MAP server, subscribe to authorization information stored within the IF-MAP server, and poll the IF-MAP server for authorization information to which a given device is subscribed. More information concerning the IF-MAP cross-vendor or vendor-neutral data model and protocol can be found in a specification entitled "TNC IF-MAP Binding for SOAP," Specification Version 2.1, Revision 15, dated May 7, 2012, the contents of which are hereby incorporated by reference as if set forth in its entirety.

IF-MAP has since been expanded or modified to accommodate different technologies, including cloud computing (which may involve data centers, such as data center 10, that host cloud computing applications). IF-MAP server 26 may represent an IF-MAP server that implements a data model that conforms to IF-MAP in this cloud computing context and that supports the IF-MAP protocol for publishing, polling, accessing and/or receiving data stored to this cloud computing version of the IF-MAP data model.

While described herein with respect to this particular vendor-neutral authorization data model set forth by the IF-MAP standard, the techniques may be implemented with respect to any standard or accepted authorization data model. Moreover, while described as a separate device, e.g., a standalone database, IF-MAP server 22 may be integrated within any one of the network devices shown as residing within data center 10 in FIG. 1. For example, virtual network controller 22 may include an integrated IF-MAP server 26. The techniques of this disclosure therefore should not be limited to the example of FIG. 1 in this respect.

A virtual network may be used with multi-tenancy. The term "multi-tenancy" may refer to a system in which a single hardware and software platform simultaneously supports multiple tenants (e.g., customers, clients) from a common data store. The shared platform in the multi-tenant architecture is usually designed to virtually partition data and operations so that each tenant works with a unique virtual application instance. In one implementation, each subnet shown in FIG. 1 may serve one tenant, for example one company. In some examples, a first virtual network would belong to CompanyA, a second virtual network would belong to CompanyB, etc.

IF-MAP server 26 may not however support multi-tenancy when identifiers from different companies overlap. To illustrate by way of example, both CompanyA and CompanyB may have an employee identified as "Employee #5," where this identifier may be used to retrieve authorization or other information concerning "Employee #5." IF-MAP server 26 may not be able to resolve to which of CompanyA and CompanyB the request for information concerning "Employee #5" is to be returned. In this sense, IF-MAP server 26 may be unable to maintain different records for "Employee #5" at CompanyA and "Employee #5" at CompanyB, which may result in a single record used for both of Employee #5 at CompanyA and CompanyB. Mingling of information across CompanyA and CompanyB in this manner may represent a substantial breach of security, especially given that IF-MAP server 26 may store authorization information that may result in Employee #5 receiving authorization to access data for a CompanyA at which Employee #5 may not work.

In accordance with various aspects of the techniques described in this disclosure, one or more of servers 12 may translate what may be referred to as "locally unique" identifiers into globally unique identifiers that are unique within the context of data center 10. In other words, servers 12 may translate identifiers used for accessing data stored to IF-MAP server 26 that are locally unique within the context of the company into identifiers that are unique across all of the companies accessing data center 10, thereby potentially ensuring that data stored to IF-MAP server 26 remains secure in the sense that the data is only accessibly by the particular CompanyA and not by another company or customer of data center 10.

In operation, server 12A may, as one example, receive a request regarding data associated with an identifier that is unique within one of a number of customers of data center 10 (where, as described in more detail below, each customer as is often represented within data center 10 by a corresponding one of a number of virtual networks) that originated the request. In the example of FIG. 1, the request conforms to the vendor-neutral IF-MAP protocol, but the techniques may be performed with respect to any vendor-neutral or vendor specific protocol.

Server 12A may then translate the identifier (e.g., Employee #5) included within the request to generate a globally unique identifier that is unique within the plurality of virtual networks. Typically, this translation is transparent to the customer, which is another way of saying that the customer, CompanyA in this example, is not aware of this translation given that the identifier is locally unique within the context of CompanyA. That is, server 12A may translate the identifier in such a way that users and devices of CompanyA are not be able to detect that the translation occurred.

Typically, server 12A may store an association between each customer (or its virtual network representation of the customer) and a namespace. As one example, the namespace may comprise the name of the customer (e.g., CompanyA). Server 12A may then append this namespace to the identifier to generate the globally unique identifier. To illustrate, server 12A may receive a request from CompanyA having an identifier, Employee #5. Server 12A may translate identifier Employee #5 to a globally unique identifier by appending CompanyA to Employee #5 with the resulting globally unique identifier of "CompanyA:Employee #5." Appending namespaces in this manner is similar to how namespaces are employed in various computer programming languages, such as C++.

In any event, after generating the globally unique identifier, server 12A may update the request to replace the identifier included within the request with the globally unique identifier. Server 12A may then transmit the updated request to IF-MAP server 26. This request may comprise any form of communication including data publish requests, data polling requests, data retrieval requests or any other form of IF-MAP request or communication. The term "request" should therefore not be restricted in this sense to a request for data, but may refer to any request or communication.

IF-MAP server 26 may issue a response to the request, where the response may include the globally unique identifier. Given that the customer, CompanyA in this example, is often not aware of the translation performed by server 12A, server 12A may translate this globally unique identifier to recover the original identifier, which again is locally unique within the context of CompanyA. Server 12A may then update the response to replace the globally unique identifier with the recovered locally unique identifier. Server 12A may then transmit the updated response to CompanyA, which may process the response in any number of ways, but often in the context of authorizing the identifier to access data stored by or applications executed by one or more of servers 12.

While described above as using namespaces, the techniques may generally involve translation or transformation of the identifier from a locally unique identifier to a globally unique identifier. Using namespaces in the manner described above is merely one example of this translation and the techniques may be performed with respect to other forms of translation. For example, the translation may be performed using a mapping between customer/identifier combination and a globally unique identifier (which may be a number or index into the table). In other words, while namespaces are appended to the identifier to form the globally unique identifier, the techniques may be performed with respect to other forms of translation that do not reuse the locally unique identifier in the manner described above with respect to namespaces.

In this way, each tenant would be assigned its own namespace within its own subnet, such as "CompanyA" and "CompanyB." The tenants maintain identifiers that are unique in its respective context/subnet, but the identifiers may not be globally unique. For example, CompanyA may have an identifier "Employee#5" and CompanyB may also have the same identifier "Employee#5" in their respective namespace. As each company has its own namespace, the same identifier may be used by multiple companies without a conflict. Each tenant may then only know about the identifiers in its own namespace.

Figure 2A:
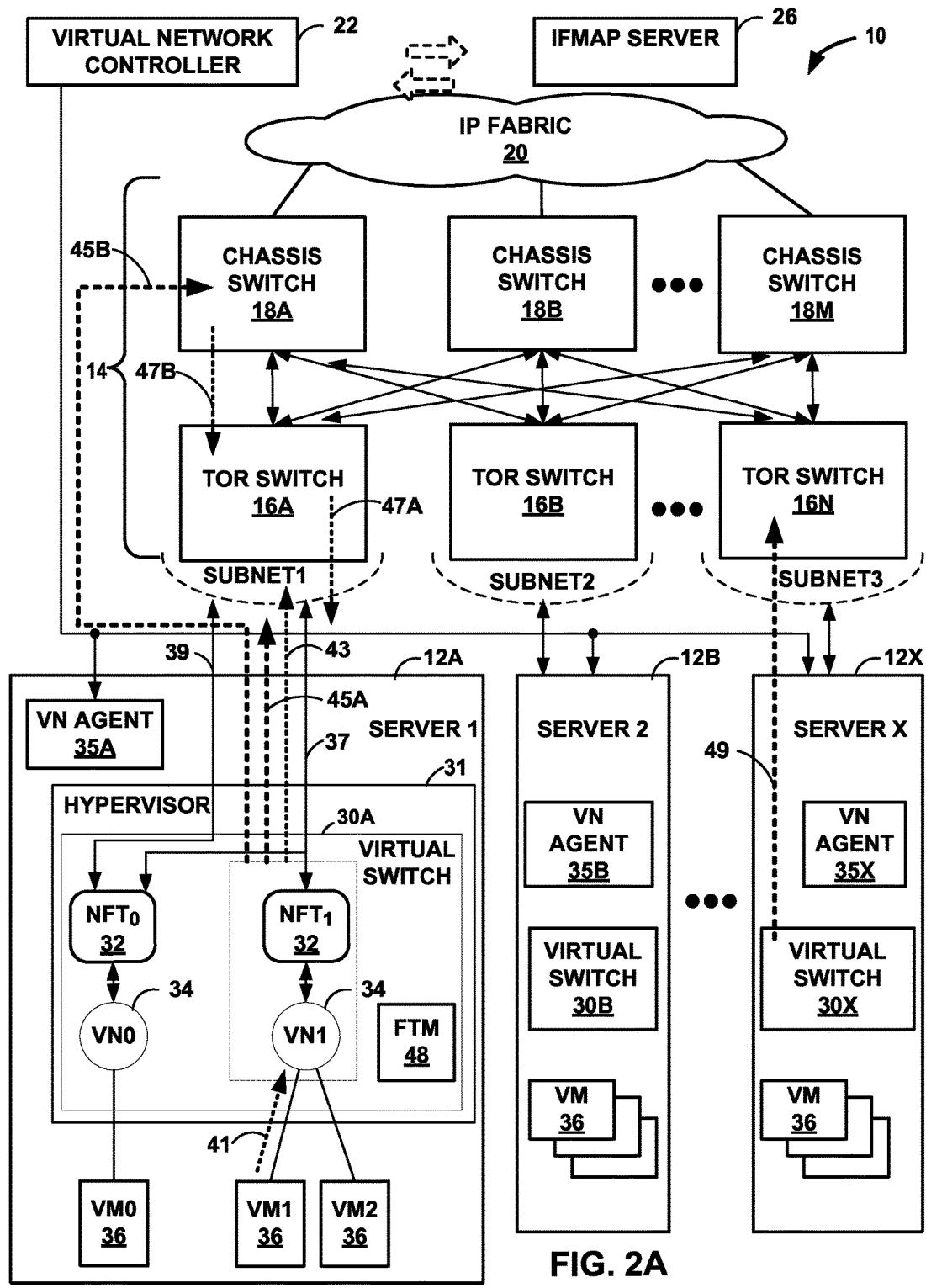
FIG. 2A is a block diagram illustrating an example implementation of the data center of FIG. 1 in further detail.

FIG. 2A is a block diagram illustrating an example implementation of data center 10 of FIG. 1 in further detail. In the example of FIG. 2A, data center 10 includes an overlay network that extends switch fabric 14 from physical switches 16, 18 to software or "virtual" switches 30A-30X (collectively, "virtual switches 30"). Virtual switches 30 dynamically create and manage one or more virtual networks 34 usable for communication between application instances. In one example, virtual switches 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual switch 30 may execute within a hypervisor, a host operating system or other component of each of servers 12. In the example of FIG. 2A, virtual switch 30A executes within hypervisor 31, also often referred to as a virtual machine manager (VMM), which provides a virtualization platform that allows multiple operating systems to concurrently run on one of host servers 12. In the example of FIG. 2A, virtual switch 30A manages virtual networks 34, each of which provides a network environment for execution of one or more virtual machines (VMs) 36 on top of the virtualization platform provided by hypervisor 31. Each VM 36 is associated with one of the virtual subnets VN0-VN1 managed by the hypervisor 31.

In general, each VM 36 may be any type of software application and may be assigned a virtual address for use within a corresponding virtual network 34, where each of the virtual networks may be a different virtual subnet provided by virtual switch 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIGS. 2A and 2B.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual switches 30 maintain routing information, such as one or more routing and/or forwarding tables. In one example implementation, virtual switch 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

For example, virtual machine 36 VM1 sends a packet 41, an "inner packet," virtual switch 30A by an internal link. Virtual switch 30A uses $NFT_1$ to look up a virtual network destination network address for packet 41. $NFT_1$ specifies an outbound interface for virtual switch 30A and encapsulation for packet 41. Virtual switch 30A applies the encapsulation to add a tunnel header to generate outer packet 43 and outputs outer packet 43 on the outbound interface, in this case toward TOR switch 16A.

The routing information may, for example, map packet key information (e.g., destination IP information and other select information from packet headers) to one or more specific next hops within the networks provided by virtual switches 30 and switch fabric 14. In some case, the next hops may be chained next hop that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2A, each virtual network 34 provides a communication framework for encapsulated packet communications 37 for the overlay network established through switch fabric 14. In this way, network packets associated with any of virtual machines 36 may be transported as encapsulated packet communications 37 via the overlay network. In addition, in the example of FIG. 2A, each virtual switch 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table $NFT_0$ provide a mechanism for bypassing the overlay network and sending non-encapsulated packet communications 39 to switch fabric 14.

Moreover, virtual network controller 22 and virtual switches 30 may communicate using virtual subnet VN0 in accordance with default network forwarding table $NFT_0$ during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual switches 30 to update their local network forwarding tables 32. For example, virtual network controller 22 may output commands to virtual network agents 35 to update one or more NFTs 32 to direct virtual switches 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information any may issues messages to other virtual network agents 35 to update local routing information stored by the virtual network agents within network forwarding tables 32.

Virtual switch 30A of server 12A includes flow trace module (FTM) 48 to determine physical network paths traversed by packet flows switched by virtual switch 30A. Flow trace module 48 may be executed by hypervisor 31, by a host operating system of server 12A, or by VM agent 35A of server 12. To trace a physical network path traversed by outer packet 45, flow trace module 48 generates a flow trace packet 45A that includes a tunnel header similar to that of outer packet 43. However, flow trace module 48 initially sets a TTL value of first flow trace packet 45A to 1. In addition, flow trace module 48 may set a special flow trace packet indicator in a field of the tunnel header of flow trace packet 45A and subsequent flow trace packets (e.g., flow trace packet 45B) corresponding to flow trace packet 45A to direct a receiving virtual switch 30 of data center 10 to discard the inner packet of the first flow trace packet if received with a TTL value set greater than 1. Virtual switch 30A outputs flow trace packet 45A on the output interface shared by flow trace packet 45A and outer packet 43. TOR switch 16A that is a first next hop on a physical network path for flow trace packet 45A and outer packet 43 receives flow trace packet 45A, decrements the TTL value to 0 and, because the TTL value is 0, returns an ICMP Time Exceeded message 47A to virtual switch 30A.

ICMP Time Exceeded message 47A may include a Time Exceeded message Code 0 to indicate that TOR switch 16A discarded flow trace packet 45A due to an expired TTL field. ICMP Time Exceeded message 47A is an IP packet that includes an IMCP Time Exceeded message (ICMP Type 11). The IP packet header has a source IP address of TOR switch 16A and a destination IP address that is the source IP address of flow trace packet 45A (e.g., the IP address of virtual machine 36 VM1). The IMCP Time Exceeded message includes the IP header and the first eight bytes of the encapsulated data of flow trace packet 45A.

Flow trace module 48 additionally generates flow trace packet 45B, which is similar to flow trace packet 45A but has a TTL value of 2. Virtual switch 30A outputs flow trace packet 45B on the output interface shared by flow trace packet 45B and outer packet 43. Chassis switch 18A receives flow trace packet 45B with TTL value set to 1, having been TTL value-decremented and forwarded by TOR switch 16A. Chassis switch 18A, like TOR switch 16A with respect to flow trace packet 45A, decrements the TTL value of flow trace packet 45B to 0 and therefore return an ICMP Time Exceeded message 47B to virtual switch 30A. ICMP Time Exceeded message 47B is similar to ICMP Time Exceeded message 47A but has a source IP address that is an IP address of chassis switch 18A.

Flow trace module 48 continues generating flow trace packets in this manner until switch 30A receives a confirmation message 49 that one of the subsequent flow trace packets has arrived at another of virtual switches 30, in this case server 12X. A confirmation message may include, e.g., an ICMP Echo Reply message. In this way, FTM 48 of switch 30A may receive messages, including ICMP Time Exceeded messages 47A, 47B, from each of the physical network elements on a physical network path traversed by outer packet 45. Flow trace module 48 may aggregate IP addresses for each of the physical network elements from the respective received messages into a list, which FTM 48 may send to, e.g., a virtual network controller 22 of data center 10. Flow trace module 48 may in some instances append a virtual IP address for server 12X received in confirmation message 49 to the list. Flow trace module 48 returns the list of IP addresses for the physical network elements to a requesting device, or may provide the list to another component of virtual switch 30A or a host operating system of server 12A, for example.

In accordance with the techniques of this disclosure, network controller 22 may direct the components to find a latency through a physical network in a virtualized network. For example, administrator 24 may configure packet classifiers to specify which packets are to be monitored for latency and on which time domains on virtual network controller 22 via commands entered in web console 42. Virtual network controller 22 notifies relevant VN agents 35 of the packet monitoring definitions based on the packet classifiers. VN agents 35 install packet capture logic on respective virtual switches 30. Virtual switches 30 match packets using the packet capture logic, and sends copies of the matching packets to VN agents 35. VN agents 35 calculate a packet signature for each packet, and send information to virtual network controller 22, such as information specifying the packet signature, a switch identifier of the virtual switch 30 that matched the packets, and a timestamp indicating the time of calculating the packet signature (or a time of matching the packets, for example). Distributed analytics engines of virtual network controller 22 analyze the received information and compile results regarding packet latency, as described in further detail below. Virtual network controller 22 may send results, such as a report, to web console 42 for display to administrator 24.

In some examples, VM1 36 or an application executing thereon is configured to generate logging information in accordance with a baseline extent of logging. VM1 36 sends collected logging information to VNC 22 in log messages. In the illustrated example, VM1 36 sends log message 41 including newly-generated logging information to VNC 22. VM1 36 may be configured to send log message 41 using the default network forwarding table $NFT_0$ that provides a default route that allows a packet to be forwarded to VNC 22 by virtual subnet VN0 without encapsulation, i.e., non-encapsulated packet communications 39 per the routing rules of the physical network of data center 10. In some examples, VM1 36 may be configured with a virtual network address that virtual switch 30A maps to a physical network address of VNC 22 for non-encapsulated transmission of log message 41 to VNC 22.

In still further examples, VM1 36 sends log message 41 by VN agent 35A operating as a proxy for control plane messages between virtual machines 36 and virtual network controller 22. For example, VM1 36 request to send log message 41 using its virtual address via the VN agent 35A, and VN agent 35A may in turn send log message 41 and request that a response to the message be received for the virtual address of the VM 36 that originated log message 41. In some cases, a VM 36 may invoke a procedure or function call presented by an application programming interface of VN agent 35A, and the VN agent 35A may handle encapsulation of the message as well, including addressing.

VNC 22 analyzes the logging information in log message 25 to determine that the extent of logging performed by VM1 36 should be modified. Virtual network controller 22 therefore generates and sends logging modification message 43 to server VM1 36 to indicate to VM1 36 the new extent of logging. VM1 36 modifies its logging operations to conform to the extent of logging specified by VNC 22, which may include increasing an amount of logging by, e.g., returning state information already stored to memory for an application or by directing the application to execute one or more diagnostic subroutines to generate additional logging information. VM1 36 may return the logging information generated in accordance with the increase over the baseline extent to VNC 22 in a log message according to techniques described above.

As further shown in the example of FIG. 2, multiple servers 12 have access to the IF-MAP server 26 via virtual network controller 22. Also, multiple tenants have access to the same IF-MAP server 26. Each server 12 has multiple tenants VN1, VN2, VN3 and a Translator (in the form of VN0) that knows all the tenants managed by its server 12. Upon receiving a query (which may be another way of referring to the requests referenced above) from a subnet, such as VN1, that belongs to CompanyA, the translator VN0 converts the query into a globally unique query by adding the unique namespace of the querying tenant (in this case, CompanyA).

For example, suppose a query is generated by CompanyA about Employee#5. Without the Translator VN0, a query about Employee#5 may not be processed because CompanyB and Company C may also have an identifier Employee#5 in their respective namespaces and the IF-MAP server 26 would not know to which Employee#5 the query pertains. The Translator VN0 translates the query "Employee#5" into "CompanyA: Employee#5" by identifying the connection through which the query came in (i.e., whether it came from VN1, VN2, etc., in the example of FIG. 2). With the translated query that is globally unique, the techniques may promote for efficient use of IF-MAP server 26 (in that IF-MAP server 26 may be shared by multiple tenants).

The query result (which is another way of referring to the response referenced above) generated by IF-MAP server 26 may include the namespace "CompanyA." If needed, the translator VN0 may strip the namespace from the globally unique identifier (and thereby recover the locally unique identifier) before forwarding the result to the subnet VN1 (which is the subnet that originated the request/query) because the subnet VN1 may not recognize the result that includes the namespace "CompanyA."

While the tenants are not "virtualization aware" or, in other words, aware of the multi-tenancy of data center 10, IF-MAP server 26 is virtualization-aware, and may use a format such as "namespace:identifier" when associating the session data for a particular identifier to the namespace: identifier in the database.

In this sense, VN0, which may represent the translator of virtual switch 30A (as one example, may receive a request regarding data associated with an identifier that is unique within one of the VNs 34 that originated the request. VN0 may then translate the identifier included within the request to generate a globally unique identifier that is unique within the VNs 34. VN0 may also update the request to replace the identifier included within the request with the globally unique identifier and transmit the updated request to IF-MAP server 26 via virtual network controller 22.

In some instances, as noted above, VN0 may perform the translation by appending a namespace assigned to the one of the virtual networks that originated the request, i.e., VN1 in the example above, to the identifier to generate the globally unique identifier.

As described above, the techniques may promote more efficient usage of IF-MAP server 26 by facilitating multi-tenancy. As a result of performing the techniques, VN0 may receive another request from a different one of VNs 34 than the one that originated what may be referred to as the first request described above (i.e., VN1 in the above example), where this second request may concern data associated with the same identifier as that included in the first request. This same identifier may also be unique within this other one of VNs 34, e.g., VN2. VN0 may then translate the identifier included within the second request to generate a second globally unique identifier that is unique within VNs 34 and different from the other globally unique identifier generated for the first request. VN0 may update this second request to replace the second identifier included within the second request with the second globally unique identifier, and transmit the updated second request to IF-MAP server 26. In this manner, the techniques may promote multi-tenancy within IF-MAP server 26 without having to virtualize or otherwise create and maintain multiple instances of an IF-MAP server 26 (such as one per customer or tenant).

Figure 2B:
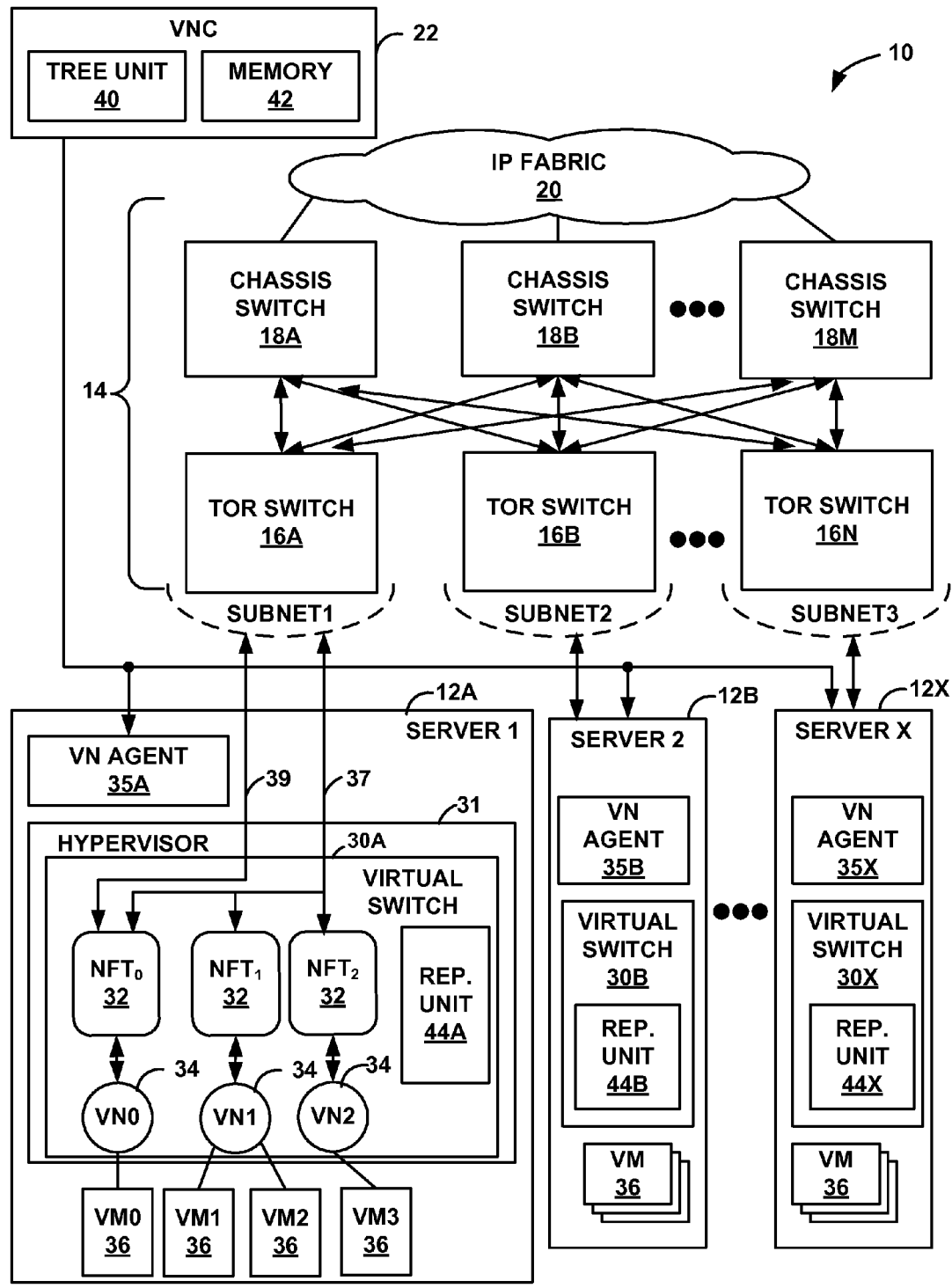
FIG. 2B illustrates further example details of the data center of FIGS. 1 and 2A to provide multicast service within the virtual overlay network without requiring multicast support in the underlying physical network.

FIG. 2B illustrates further example details of the data center of FIGS. 1 and 2A to provide multicast service within the virtual overlay network without requiring multicast support in the underlying physical network. In accordance with the techniques, in this example, virtual network controller 22 includes a tree unit 40 configured to create or calculate a multicast tree for one or more of servers 12 that belong to a given multicast group in the virtual network 34. In general, tree unit 40 may create a different multicast tree for each multicast group within each of virtual networks 34. Tree unit 40 may create the multicast trees to facilitate delivery of multicast packets for the multicast groups between two or more servers in the virtual networks 34. Tree unit 40 then stores the different multicast trees in a memory 42 within virtual network controller 22.

In some cases, the multicast trees may be unidirectional multicast trees in which a root node of the multicast tree operates as the source of the multicast packets for the multicast group and the multicast packets are communicated in a single, downstream direction from the root node. In other cases, the multicast trees may be bidirectional multicast trees in which any node of the multicast tree may operate as the source of the multicast packets for the multicast group and the multicast packets may be communicated in either an upstream or downstream direction from a root node of the multicast tree. According to the techniques, virtual network controller 22 may create bidirectional multicast trees because virtual network 34 emulates L2 multicast, which supports bidirectional multicast.

According to the techniques, the multicast trees are calculated at the centralized location of virtual network controller 22 instead of in a distributed fashion by TOR switches 16 and chassis switches 18 that service the multicast group in the underlying physical network. In this way, the location of servers 12 connected to the underlying network may be considered. For example, in a data center, it may be desirable for tree unit 40 to create a multicast tree such that replication by servers within a given physical rack does not cross rack boundaries.

In the context of multicasting in virtual networks 34, VMs 36 executed in servers 12 may exchange messages to learn about "neighboring" multicast-enabled VMs 36 in other servers 12. In the contest of virtual networks 34, servers 12 may be considered logical neighbors that are directly reachable by tunneling over the underlying physical network. In one example, servers 12 may exchange Protocol Independent Multicast (PIM) messages in virtual networks 34. As described above, the underlying physical network may not support multicast service such that the multicast neighbor messages may be communicated between servers 12 and virtual network controller 22 using virtual networks 34.

In order to create the multicast trees, virtual network controller 22 may receive join requests from one or more of servers 12 interested in receiving multicast packets associated with a particular multicast group. Virtual network controller 22 may similarly receive leave requests from servers 12 that would like to stop receiving multicast packets for the multicast group. For example, virtual network controller 22 may receive the join or leave requests as packets that conform to Internet Group Management Protocol (IGMP) or another multicast protocol. The join and leave request packets may include a multicast group identifier, and a virtual address of a VM 36 executed on one of servers 12 that is interested in joining or leaving the identified multicast group. As described above, the underlying network may not support multicast service such that join and leave requests for the multicast groups may be communicated between servers 12 and virtual network controller 22 using virtual networks 34. Virtual network controller 22 may maintain membership information mapping VMs 36 to multicast groups for each virtual network 34.

Tree unit 40 of virtual network controller 22 may then create a multicast tree of a given multicast group based on the membership information and the routing information maintained for the physical network and the associated virtual network 34. For example, tree unit 40 may determine a topology of the multicast tree based on the servers 12 that include VMs 36 that belong to the multicast group, the available paths in the physical network between the servers 12 included in the multicast group, and the tunnels between the servers 12 in the virtual network 34.

In addition, tree unit 40 may determine a topology of the multicast tree based on a replication limit for each of servers 12 included in the multicast group of the multicast tree. In some cases, tree unit 40 may calculate the multicast tree in order to minimize a replication limit for each of the servers and balance the replication across the tree. In this way, tree unit 40 may create the multicast tree such that each of the servers 12 performs a similar, small amount of replication, instead of one or two servers having to incur the load of replicating and forwarding the packets to all the servers that belong to the multicast group.

As an example, tree unit 40 may create a multicast tree to minimize the replication limit such that each of servers 12 sends at most a quantity (N) of packet copies. The replication limit may be selected to be greater than or equal to 2 and substantially less than the quantity (M) of servers in the multicast group, i.e., $2 \leq N \ll M$. In another example, the replication limit may be selected to be less than or equal to the quantity of the devices minus one, i.e., $2 \leq N \leq M-1$. In yet another example, the replication limit for each of servers 12 may be configured to be fixed at certain value, e.g., 8 or 16.

In some cases, tree unit 40 may be configured to determine the replication limit (N) at least based on the number of servers (M) in the multicast group and latency requirements, which are proportional to a number of replication stages or levels (i.e., depth of the multicast tree). In this case, the replication limit may be determined based on balancing two factors: minimizing the tree depth (D) of the multicast tree and minimizing the replication limit (N) for each of the servers in the multicast tree. Tree unit 40 may be configurable to give greater weight to either tree depth or replication limit. For example, the replication limit may be determined in order to satisfy $[LOG_N(M)]=D$. In some cases, the number of replications for a given server 12 may be a function of the performance of the replication unit 40 of the server 12. For example, tree unit 40 may maintain a table in memory 42 that gives replication count based on a type of the server 12. If the smallest table entry for a server 12 in the multicast group is equal to K, then $2 \leq N \leq K$ such that if $[LOG_K(M)]$ is less than D and $[LOG_N(M)]=D$. Several methods for minimizing the replication limit and balancing the replications limit and the tree depth are described in greater detail below with respect to FIGS. 6A-6B and 8.

Virtual network controller 22 may also be configured to generate a unique tunnel encapsulation for each link direction of the generated multicast tree. In the multicast tree, the tunnel encapsulation in each direction is unique because each direction of a link between two of servers 12 has a different combination of source-IP-address (SIP), destination-IP-address (DIP) and multicast group-ID (MGID). This combination in an ordered tuple {SIP,DIP,MGID} will not repeat for any other group or link or other direction of the same link. In this way, servers 12 may use a different tunnel encapsulation header for each packet copy.

In data center 10, the paths between servers 12 through switch fabric 14 may be substantially equally probable such that forwarding may not be limited to certain links chosen by multicast algorithms in the underlying physical network. The different tunnel encapsulation headers allow multiple equal cost paths in the physical network to be used for the same multicast group, which efficiently utilizes bandwidth of the network. A configuration in which each link direction in the multicast tree has a unique tunnel encapsulation header may enable virtual network controller 22 to randomize the distribution of traffic over the multiple equal cost paths in the underlying physical network.

In order to perform multicast in a virtual network 34, virtual network controller 22 communicates a multicast tree created for specific multicast group in the virtual network 34 to servers 12 that belong to the multicast group. In some examples, virtual network controller 22 communicates a multicast tree to one of servers 12 as tree forwarding state including one or more forwarding entries of the multicast tree relevant to the particular one of servers 12. The forwarding entries may be stored in NFT 32 corresponding to the virtual network 34. The tree forwarding state may include next hop information of the multicast tree for virtual switch 30 of the server 12. The next hops may be chained next hop that specify replication to be performed on each multicast packet for the multicast group by virtual switch 30 when forwarding the packet.

The communicated multicast tree instructs virtual switches 30 of the servers 12 to replicate and forward multicast packets to other servers 12 according to the multicast tree. As illustrated in FIG. 2A, virtual switches 30 each include a corresponding one of replication units 44A-44X ("rep. units 44"). Replication units 44 replicate a received multicast packet based on the topology of the multicast tree. Virtual switches 30 then forward the packet copies to one or more other servers of the multicast group using tunnel encapsulation in accordance with one of NFTs 32 as configured by virtual network controller 22.

According to the techniques, server 12A, for example, receives a multicast tree for a multicast group in a virtual network 34 to which server 12A belongs from virtual network controller 22. Server 12A may then receive multicast packets for the multicast group to be forwarded on the virtual network according to the multicast tree for the multicast group. Virtual switch 30A of server 12A uses replication unit 44A to replicate the multicast packets for the multicast group according to the received bidirectional multicast. If server 12A is the source server or an intermediate server in the multicast tree, then replication unit 44A may create one or more copies of the packet as required by the multicast tree. According to the multicast tree, replication unit 44A of server 12A may generate no more than N copies of the multicast packet. One or more of servers 12B-12X that belong to the same multicast group may also receive the multicast tree from virtual network controller 22. The replication units 44B-44X of each of the servers 12B-12X may also generate a number of copies of the multicast packet according to the multicast tree. In some cases, the number of copies may be the same as the number of copies generated by replication unit 44A. In other cases, the number of the copies may be different than generated by replication unit 44A.

Virtual switch 30A then forwards the replicated multicast packets using tunnel encapsulation to the other servers 12 of the multicast group in the virtual network according to the multicast tree. Virtual switch 30A may encapsulate each of the copies of the packet in a unique tunnel encapsulation header as specified by one of NFTs 32 in virtual switch 30A, as configured by virtual network controller 22. In this way, multiple equal cost paths in the underlying network may be used for the same multicast group to efficiently use bandwidth. The unique tunnel encapsulation headers may be configured by virtual network controller 22 such that each link direction in the multicast tree has a unique virtual network tunnel encapsulation. The replication and forwarding of multicast packets is only performed by virtual switches 30 executed on servers 12 in the virtual network. No replication is performed within the underlying network. In this way, the techniques enable multicast service within a virtual network without requiring multicast support in the underlying network.

Figure 3:
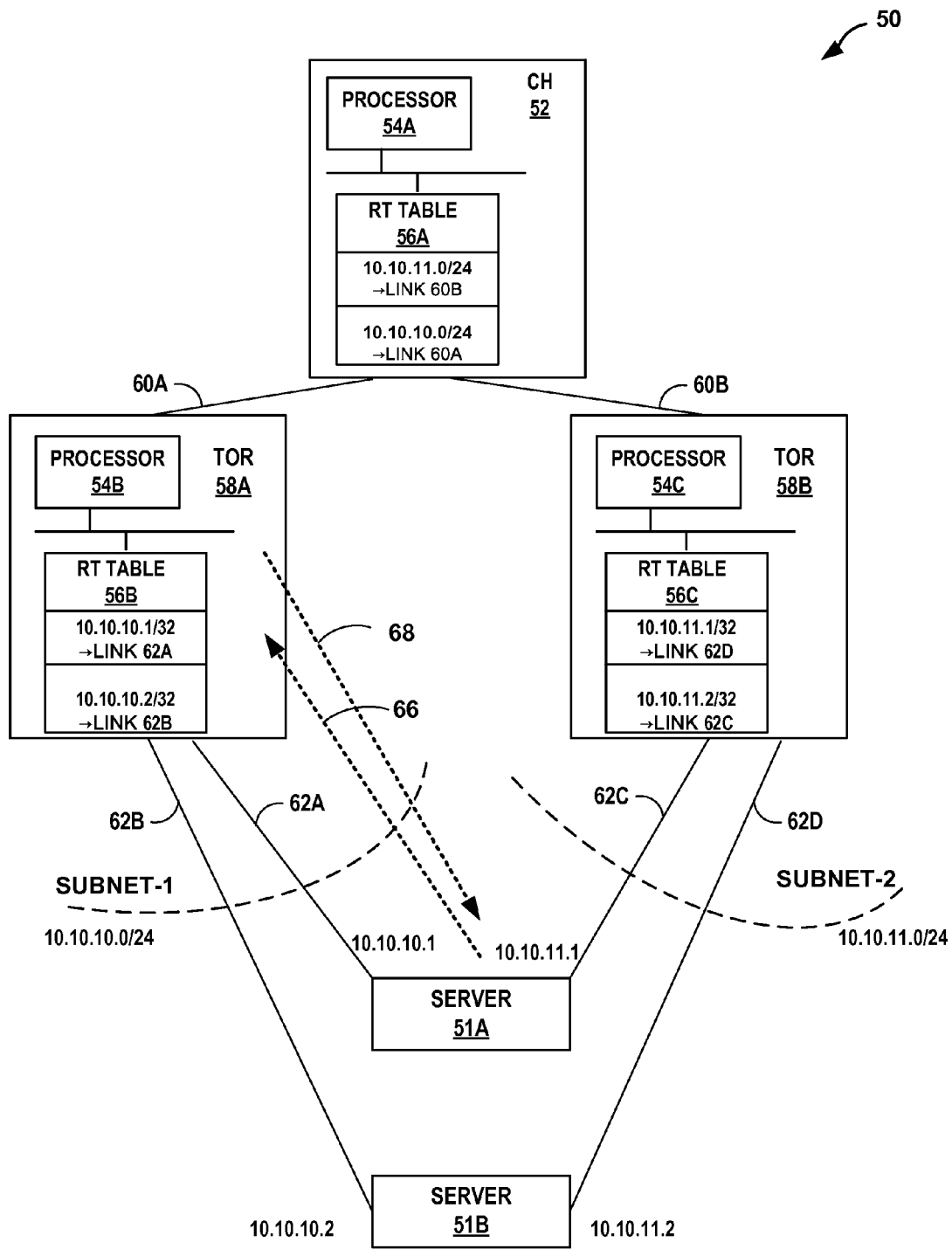
FIG. 3 is another block diagram illustrating an example system illustrating example configuration of routing information within a chassis switch and top-of-rack (TOR) switches as described herein.

FIG. 3 is another block diagram illustrating an example system 50 illustrating example configuration of routing information within a chassis switch and TOR switches as described herein. System 50 of FIG. 3 may, for example, correspond to portions of data center 10 illustrated in FIGS. 1 and 2.

In this example, chassis switch 52 ("CH 52"), which may be any of chassis switches 18 of FIG. 1, is coupled to Top of Rack (TOR) switches 58A-58B ("TORs 58") by chassis link 60A and chassis link 60B, respectively ("chassis links 60"). TORs 58 may, in some examples, be any of TORs 16 of FIG. 1. In the example of FIG. 3, TORs 58 are also coupled to servers 51A-51B ("servers 51") by TOR links 62A-62D ("TOR links 62"). Servers 51 may be any of servers 210 (FIG. 1). Here, servers 51 communicate with both TORs 58, and can physically reside in either associated rack. TORs 58 each communicate with a number of network switches, including chassis switch 52.

Chassis switch 52 has a processor 54A in communication with an interface for communication with a network as shown, as well as a bus that connects a memory (not shown) to processor 54A. The memory may store a number of software modules. These modules include software that controls network routing, such as an OSPF module (not shown) containing instructions for operating the chassis switch 52 in compliance with the OSPF protocol. Chassis switch 52 maintains routing table ("RT table") 56A containing routing information for packets, which describes a topology of a network. Routing table 56A may be, for example, a table of packet destination Internet protocol (IP) addresses and the corresponding next hop, e.g., expressed as a link to a network component. Reference herein to IP may refer to IPv4 or IPv6.

TORs 58 each have a respective processor 54B, 54C, an interface in communication with chassis switch 52, and a memory (not shown). Each memory contains software modules including an OSPF module and routing table 56B, 56C as described above.

TORs 58 and chassis switch 52 may exchange routing information specifying available routes, such as by using a link-state routing protocol such as Open Shortest Path First (OSPF) or IS-IS. TORs 58 may be configured as owners of different routing subnets. For example, TOR 58A is configured as the owner of Subnet 1, which is the subnet 10.10.10.0/24 in the example of FIG. 2A, and TOR 58A is configured as the owner of Subnet 2, which is the subnet 10.10.11.0/24 in the example of FIGS. 2A and 2B. As owners of their respective Subnets, TORs 58 locally store the individual routes for their subnets and need not broadcast all route advertisements up to chassis switch 52. Instead, in general TORs 58 will only advertise their subnet addresses to chassis switch 52.

Chassis switch 52 maintains a routing table ("RT table") 56A, which includes routes expressed as subnets reachable by TORs 58, based on route advertisements received from TORs 58. In the example of FIG. 2A, RT table 56A stores routes indicating that traffic destined for addresses within the subnet 10.10.11.0/24 can be forwarded on link 60B to TOR 58B, and traffic destined for addresses within the subnet 10.10.10.0/24 can be forwarded on link 60A to TOR 58A.

In typical operation, chassis switch 52 receives Internet Protocol (IP) packets through its network interface, reads the packets' destination IP address, looks up these addresses on routing table 56A to determine the corresponding destination component, and forwards the packets accordingly. For example, if the destination IP address of a received packet is 10.10.10.0, i.e., the address of the subnet of TOR 58A, the routing table of chassis switch 52 indicates that the packet is to be sent to TOR 58A via link 60A, and chassis switch 52 transmits the packet accordingly, ultimately for forwarding to a specific one of the servers 51.

Similarly, each of TORs 58 receives Internet Protocol (IP) packets through its network interface, reads the packets' destination IP address, looks up these addresses on its routing table 56 to determine the corresponding destination component, and forwards the packets according to the result of the lookup. In some cases, a network element (e.g., one of TORs 48 or chassis switch 52) may receive an IP packet having a TTL value of 1. As a result, the network element returns an ICMP Time Exceeded message to the source IP address of the packet. In accordance with techniques described herein, servers 51 may "walk" a physical network path of system 50 by issuing successive flow trace packets with iterated TTL values and receive, in response, ICMP Time Exceeded messages from successive physical network elements along the path.

In one example iteration, server 51A sends flow trace packet 66, an IP packet, having a TTL value set to 1 to TOR 58A. Flow trace packet 66 may represent any of flow trace packets 45 of FIG. 2A. TOR 58A receives flow trace packet 66, decrements the TTL value and, because the TTL value is now 0, returns an ICMP Time Exceeded message 68 to server 51A.

Figure 4:
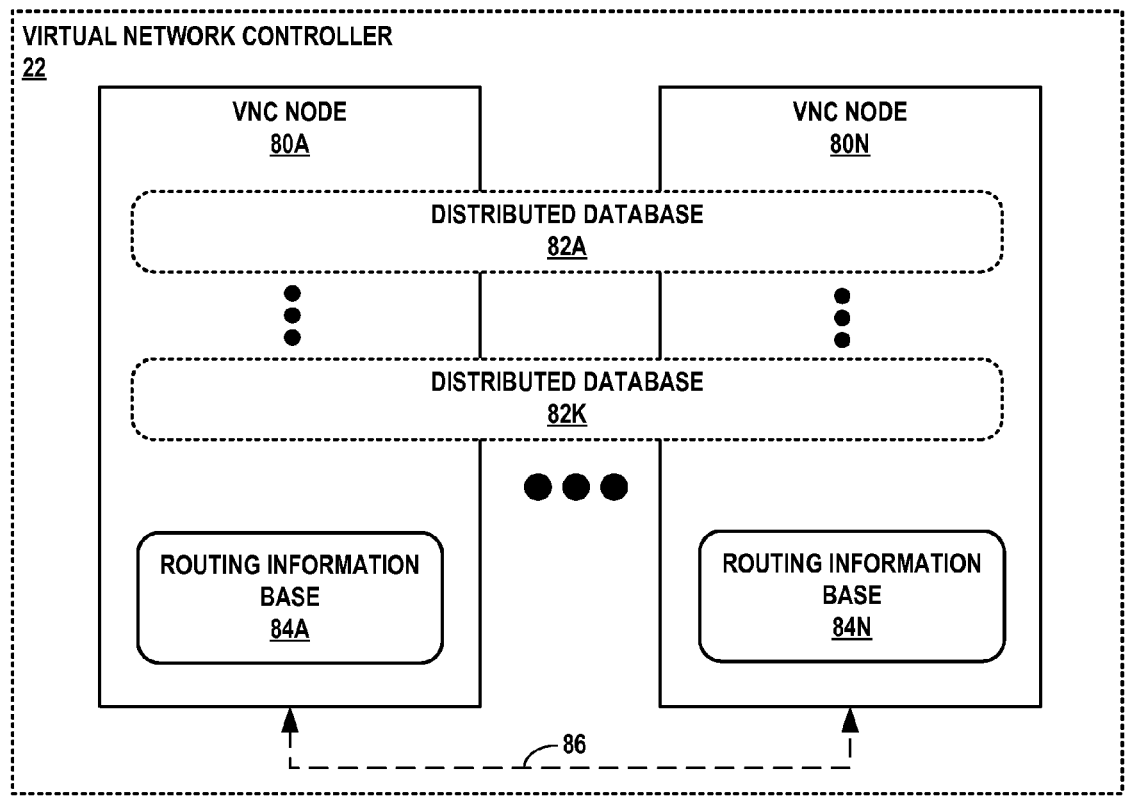
FIG. 4 is a block diagram illustrating an example implementation of a virtual network controller to implement any combination of the techniques described herein within one or more virtual networks in accordance with one or more embodiments of this disclosure.

FIG. 4 is a block diagram illustrating an example implementation of a virtual network controller 22 for facilitating operation of one or more virtual networks in accordance with one or more embodiments of this disclosure. Virtual network controller 22 may, for example, correspond to virtual network controller 22 of data center 10 of FIGS. 1 and 2.

Virtual network controller (VNC) 22 of FIG. 4 illustrates a distributed implementation of a VNC that includes multiple VNC nodes 80A-80N (collectively, "VNC nodes 80") to execute the functionality of a data center VNC, including managing the operation of virtual switches for one or more virtual networks implemented within the data center. Each of VNC nodes 80 may represent a different server of the data center, e.g., any of servers 12 of FIGS. 1-2, or alternatively, on a server or controller coupled to the IP fabric by, e.g., an edge router of a service provider network or a customer edge device of the data center network. In some instances, some of VNC nodes 80 may execute as separate virtual machines on the same server.

Each of VNC nodes 80 may control a different, non-overlapping set of data center elements, such as servers, individual virtual switches executing within servers, individual interfaces associated with virtual switches, chassis switches, TOR switches, and/or communication links. VNC nodes 80 peer with one another using peering links 86 to exchange information for distributed databases, including distributed databases 82A-82K (collectively, "distributed databases 82"), and routing information (e.g., routes) for routing information bases 84A-84N (collectively, "RIBs 84"). Peering links 86 may represent peering links for a routing protocol, such as a Border Gateway Protocol (BGP) implementation, or another peering protocol by which VNC nodes 80 may coordinate to share information according to a peering relationship.

VNC nodes 80 of VNC 22 include respective RIBs 84 each having, e.g., one or more routing tables that store routing information for the physical network and/or one or more overlay networks of the data center controlled by VNC 22. In some instances, one of RIBs 84, e.g., RIB 84A, may store the complete routing table for any of the virtual networks operating within the data center and controlled by the corresponding VNC node 80 (e.g., VNC node 80A).

In general, distributed databases 82 define the configuration or describe the operation of virtual networks by the data center controlled by distributed VNC 22. For instance, distributes databases 82 may include databases that describe a configuration of one or more virtual networks, the hardware/software configurations and capabilities of data center servers, performance or diagnostic information for one or more virtual networks and/or the underlying physical network, the topology of the underlying physical network including server/chassis switch/TOR switch interfaces and interconnecting links, and so on. Distributed databases 82 may each be implemented using, e.g., a distributed hash table (DHT) to provide a lookup service for key/value pairs of the distributed database stored by different VNC nodes 80. VNC nodes 80 may request the servers 12 return a physical path through a virtual network for a network flow. VNC nodes 80 may then store the physical path to one of distributed databases 82. In some instances, any of VNC nodes 80 may determine a physical path through virtual network for a network flow using techniques described herein as being performed by a server 12.

In accordance with aspects of the techniques of this disclosure, when VN agents 35 send messages to virtual network controller 22 over the physical network to trigger virtual network controller 22 to update network forwarding table 280 with specific routes to re-route network traffic, these communications may occur over peering links 66, such as via a routing protocol like BGP or other peering protocol. Similarly, once initial contact has been established with virtual network controller 22 (e.g., a BGP or other communication session is established), virtual network controller 22 may send an overlay route to VN agent 35A via peering links 66. VN agent 35A may receive the message from virtual network controller 22 with the overlay routes via peering links 66.

Figure 5:
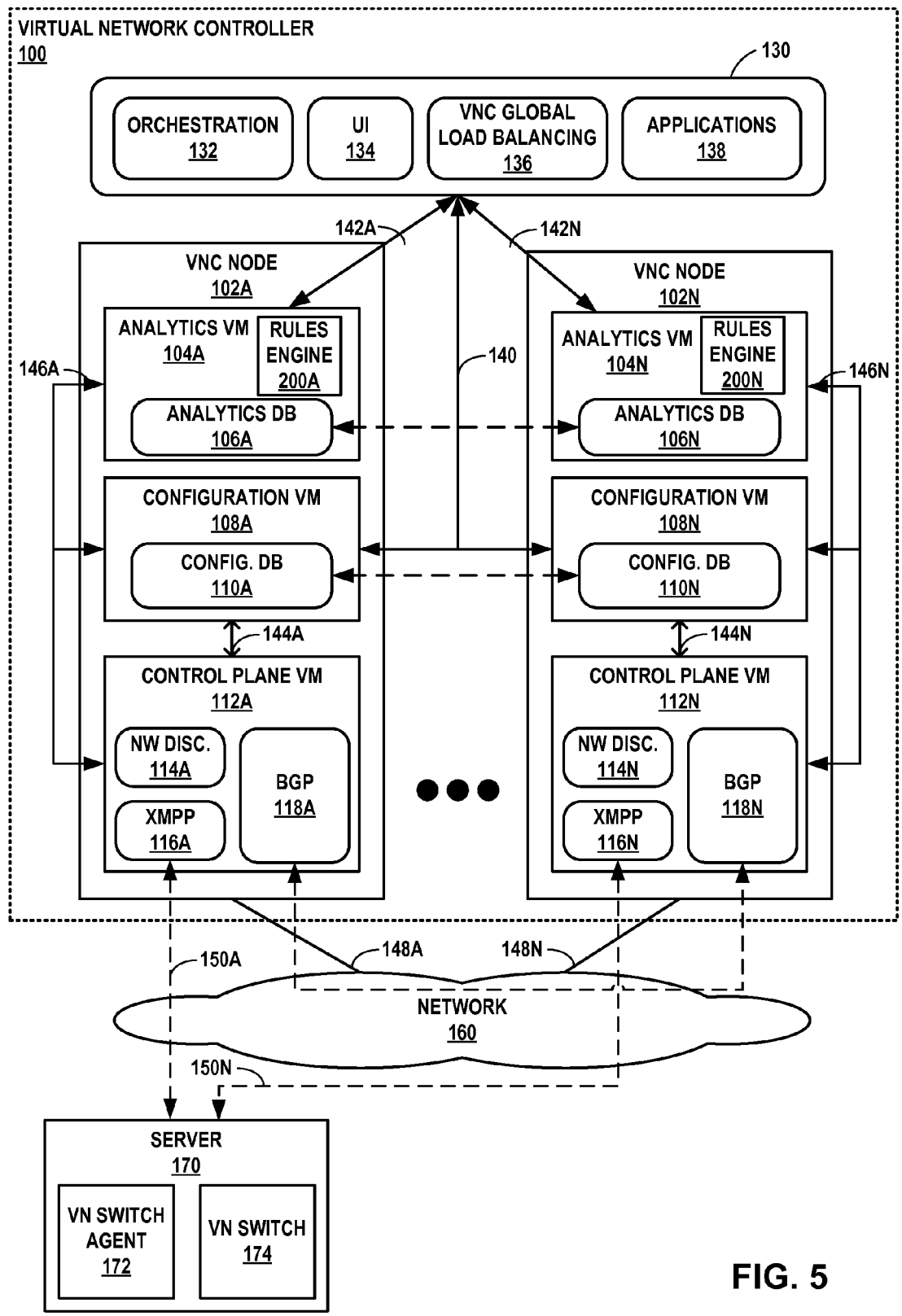
FIG. 5 is a block diagram illustrating an example implementation of a virtual network controller in accordance with one or more embodiments of this disclosure.

FIG. 5 is a block diagram illustrating an example implementation of a virtual network controller 100 for facilitating operation of one or more virtual networks in accordance with one or more embodiments of this disclosure. Virtual network controller 100 may, for example, correspond to virtual network controller 22 of data center 10 of FIGS. 1 and 2 or virtual network controller 22 of FIG. 4.

As illustrated in the example of FIG. 5, distributed virtual network controller (VNC) 100 includes one or more virtual network controller ("VNC") nodes 102A-102N (collectively, "VNC nodes 102"). Each of VNC nodes 102 may represent any of VNC nodes 80 of virtual network controller 22 of FIG. 4. VNC nodes 102 that peer with one another according to a peering protocol operating over network 160. Network 160 may represent an example instance of switch fabric 14 and/or IP fabric 20 of FIG. 1. In the illustrated example, VNC nodes 102 peer with one another using a Border Gateway Protocol (BGP) implementation, an example of a peering protocol. In this sense, VNC nodes 102A and 102N may represent a first controller node device and a second controller node device peered using a peering protocol. VNC nodes 102 include respective network discovery modules 114A-114N to discover network elements of network 160.

VNC nodes 102 provide, to one another using the peering protocol, information related to respective elements of the virtual network managed, at least in part, by the VNC nodes 102. For example, VNC node 102A may manage a first set of one or more servers operating as virtual network switches for the virtual network. VNC node 102A may send information relating to the management or operation of the first set of servers to VNC node 102N by BGP 118A. Other elements managed by VNC nodes 102 may include network controllers and/or appliances, network infrastructure devices (e.g., L2 or L3 switches), communication links, firewalls, and VNC nodes 102, for example. Because VNC nodes 102 have a peer relationship, rather than a master-slave relationship, information may be sufficiently easily shared between the VNC nodes 102. In addition, hardware and/or software of VNC nodes 102 may be sufficiently easily replaced, providing satisfactory resource fungibility.

Each of VNC nodes 102 may include substantially similar components for performing substantially similar functionality, said functionality being described hereinafter primarily with respect to VNC node 102A. VNC node 102A may include an analytics database 106A for storing diagnostic information related to a first set of elements managed by VNC node 102A. VNC node 102A may share at least some diagnostic information related to one or more of the first set of elements managed by VNC node 102A and stored in analytics database 106, as well as to receive at least some diagnostic information related to any of the elements managed by others of VNC nodes 102. Analytics database 106A may represent a distributed hash table (DHT), for instance, or any suitable data structure for storing diagnostic information for network elements in a distributed manner in cooperation with others of VNC nodes 102. Analytics databases 106A-106N (collectively, "analytics databases 106") may represent, at least in part, one of distributed databases 82 of distributed virtual network controller 22 of FIG. 4.

VNC node 102A may include a configuration database 110A for storing configuration information related to a first set of elements managed by VNC node 102A. Control plane components of VNC node 102A may store configuration information to configuration database 110A using interface 144A, which may represent an Interface for Metadata Access Points (IF-MAP) protocol implementation. VNC node 102A may share at least some configuration information related to one or more of the first set of elements managed by VNC node 102A and stored in configuration database 110A, as well as to receive at least some configuration information related to any of the elements managed by others of VNC nodes 102. Configuration database 110A may represent a distributed hash table (DHT), for instance, or any suitable data structure for storing configuration information for network elements in a distributed manner in cooperation with others of VNC nodes 102. Configuration databases 110A-110N (collectively, "configuration databases 110") may represent, at least in part, one of distributed databases 82 of distributed virtual network controller 22 of FIG. 4. Portions of RIBs 84 may be stored by control plane VMs 112 to facilitate operation of network discovery modules and BGPs 118.

Virtual network controller 100 may perform any one or more of the illustrated virtual network controller operations represented by modules 130, which may include orchestration 132, user interface 134, VNC global load balancing 136, and one or more applications 138. VNC 100 executes orchestration module 132 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 136 executed by VNC 100 supports load balancing of analytics, configuration, communication tasks, e.g., among VNC nodes 102. Applications 138 may represent one or more network applications executed by VNC nodes 102 to, e.g., change topology of physical and/or virtual networks, add services, or affect packet forwarding.

User interface 134 includes an interface usable to an administrator (or software agent) to control the operation of VNC nodes 102. For instance, user interface 134 may include methods by which an administrator may modify, e.g. configuration database 110A of VNC node 102A. Administration of the one or more virtual networks operated by VNC 100 may proceed by uniform user interface 134 that provides a single point of administration, which may reduce an administration cost of the one or more virtual networks.

VNC node 102A may include a control plane virtual machine (VM) 112A that executes control plane protocols to facilitate the distributed VNC techniques described herein.

Control plane VM 112A may in some instances represent a native process. In the illustrated example, control VM 112A executes BGP 118A to provide information related to the first set of elements managed by VNC node 102A to, e.g., control plane virtual machine 112N of VNC node 102N. Control plane VM 112A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 112A-112N) may execute different software versions. In one or more aspects, e.g., control plane VM 112A may include a type of software of a particular version, and the control plane VM 112N may include a different version of the same type of software. The peering configuration of the control node devices may enable use of different software versions for the control plane VMs 112A-112N. The execution of multiple control plane VMs by respective VNC nodes 102 may prevent the emergence of a single point of failure.

Control plane VM 112A communicates with virtual network switches, e.g., illustrated VM switch 174 executed by server 140, using a communication protocol operating over network 160. Virtual network switches facilitate overlay networks in the one or more virtual networks. In the illustrated example, control plane VM 112A uses Extensible Messaging and Presence Protocol (XMPP) 116A to communicate with at least virtual network switch 174 by XMPP interface 150A. Virtual network route data, statistics collection, logs, and configuration information may in accordance with XMPP 116A be sent as XML documents for communication between control plane VM 112A and the virtual network switches. Control plane VM 112A may in turn route data to other XMPP servers (such as an analytics collector) or may retrieve configuration information on behalf of one or more virtual network switches. Control plane VM 112A may further execute a communication interface 144A for communicating with configuration virtual machine (VM) 108A associated with configuration database 110A. Communication interface 144A may represent an IF-MAP interface.

VNC node 102A may further include configuration VM 108A to store configuration information for the first set of element to and manage configuration database 110A. Configuration VM 108A, although described as a virtual machine, may in some aspects represent a native process executing on an operating system of VNC node 102A. Configuration VM 108A and control plane VM 112A may communicate using IF-MAP by communication interface 144A and using XMPP by communication interface 146A. In some aspects, configuration VM 108A may include a horizontally scalable multi-tenant IF-MAP server and a distributed hash table (DHT)-based IF-MAP database that represents configuration database 110A. In some aspects, configuration VM 108A may include a configuration translator, which may translate a user friendly higher-level virtual network configuration to a standards based protocol configuration (e.g., a BGP L3VPN configuration), which may be stored using configuration database 110A. Communication interface 140 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 100 may be flexible for new applications 138.

In accordance with various aspects of the techniques described in this disclosure, the translator of one or more of configuration VMs 108 may provide translation to facilitate multi-tenancy within the IF-MAP server/database. That is, these translators discussed above may perform the techniques described in this disclosure to translate identifiers unique to the originating one of configuration VMs 108, but not unique globally across all of configuration VMs 108, to globally unique identifiers to facilitate multi-tenancy within the IF-MAP server/database in the manner described above. These translators may perform translation that is similar, in this respect, to the translation performed by VN 58, as described above with respect to the example of FIG. 3.

VNC node 102A may further include an analytics virtual machine (VM) 104A to store diagnostic information (and/or visibility information) related to at least the first set of elements managed by VNC node 102A. Control plane VM and analytics VM 104 may communicate using an XMPP implementation by communication interface 146A. Analytics VM 104A, although described as a virtual machine, may in some aspects represent a native process executing on an operating system of VNC node 102A.

Analytics VM 104A may include analytics database 106A, which may represent an instance of a distributed database that stores visibility data for virtual networks, such as one of distributed database 82 of distributed virtual network controller 22 of FIG. 4. Visibility information may describe visibility of both distributed VNC 100 itself and of customer networks. The distributed database may include an XMPP interface on a first side and a REST/JASON/XMPP interface on a second side.

Virtual network switch 174 may implement the layer 3 forwarding and policy enforcement point for one or more end points and/or one or more hosts. The one or more end points or one and/or one or more hosts may be classified into a virtual network due to configuration from control plane VM 112A. Control plane VM 112A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual network switch 174 may be agnostic to actual tunneling encapsulation used. Virtual network switch 174 may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 102 may be provided by different suppliers. However, the peering configuration of VNC nodes 102 may enable use of different hardware and/or software provided by different suppliers for implementing the VNC nodes 102 of distributed VNC 100. A system operating according to the techniques described above may provide logical view of network topology to end-host irrespective of physical network topology, access type, and/or location. Distributed VNC 100 provides programmatic ways for network operators and/or applications to change topology, to affect packet forwarding, and/or to add services, as well as horizontal scaling of network services, e.g. firewall, without changing the end-host view of the network.

Control plane VMs 112 may request the servers 12 return a physical path through a virtual network for a network flow. Upon control plane VMs 112 receiving a physical path, corresponding analytics VMs 104 may store the physical path to corresponding analytics databases 106. In some instances, any of VNC nodes 102 may determine a physical path through virtual network for a network flow using techniques described herein as being performed by a server 12.

In accordance with some techniques of this disclosure, analytics VM 104 (which may also be referred to herein as "analytics engines") analyze the status of the physical network indicated by network 160, which may include IP fabric 20 (FIG. 1). Network 160 may include, for example, switches (routers) and connectors. Analytics VM 104 includes, for example, analytics databases 106 and memory (not shown) that may be linearly scaled via same virtual network forming the network 160. Analytics VM 104 are connected to network 160 via connectors 148A-148N. The system of FIG. 5 includes various servers including server 170, which may be servers such as described in FIGS. 2A and 2B as servers 12. Server 170 includes a virtual switch 174, also sometimes referred to as a virtual network router (VN-router), which encapsulates and forwards the application packets over the physical network, and a virtual network agent, VN switch agent 172, which provides the intelligence to virtual switch 174 by talking to virtual network controller 100 and provides statistics to analytics VM 104. The virtual switch 174 hides the physical network from the physical switches and routers as found in the IP fabric of network 160. Thus, it can appear that, for example, server 12A is directly connected to server 12N (FIG. 1). Servers 12 also include a series of guest virtual machines VM 36 (FIG. 2). In some examples, analytics VM 104 are actually some instances of VMs 36.

One method for determining latency in a multi-path routing environment is to collect statistics on every virtual switch 174, that is, every virtual switch 174, collects data on which packets have traveled through the virtual switch 174 and when they traveled through the virtual switch 174 between servers 170. The virtual switch 174 then sends this data to one of the analytics VM 104. The analytics VMs 104 can use the data to calculate latency. For example, the administrator may specify that statistics are to be captured for a certain class of traffic, and may also restrict the period of time over which statistic are collected. To capture a certain class of traffic the packet can be used like a match list, called a packet classifier.

For example, to see how certain flows are doing, an example packet classifier "PC" is defined as:

```
PC = {
    Id: 4502
    Start-time: 8:00:00 12/5/2012
    End-time: 8:01:00 12/5/2012
    SEQ: {
        Protocol: 'TCP',
        SIP: 10.1.1.0/24,
        SP: any,
        DIP: 10.5.1.42/32,
        DP: 80,
        Comment: 'all web traffic to load balancer'
    },
    {
        Protocol: 'TCP',
        SIP: 10.1.1.42/32,
        SP: any,
        DIP: 10.5.1.45/32,
        DP: any,
        Comment: 'all traffic from load balancer to firewall'
    }
}
```

This will capture web traffic to load balancer and traffic from the load balancer that are sent to firewall, starting on 8 am Dec. 5, 2012 for one minute. This classifier can be set by web console 42 (FIG. 2) to analytics VM 104 which will inform all relevant VN switch agents 172.

In some example, distributed virtual network controller 100 may perform techniques described herein to dynamically adapt the extent of logging performed by virtual network elements. These techniques may be performed in a distributed manner, which different VNC nodes 102 controlling logging information collection and dynamically modifying the extent of logging information generated by network elements for the VNC node 102 controls, said techniques being described below with respect to VNC 102A.

Analytics VM 104A is configured in configuration database 110 as a collector of logging information generated by the set of network elements controlled, at least in part, by VNC 102A. Analytics VM 104A receives logging information from the network elements and stores the logging information to analytics database 106A for analysis. Logging information stored to analytics database 106A may indicate any of a number of different network element operation dimensions, including resource utilization, types of applications executed, packet transmission/receipt rate, performance, etc., that may indicate to analytics VM 104A and/or a data center administrator of a need to modify the configuration of one or more network elements, increase the number of resources, modify the software for executing applications, and so forth. In the illustrated example, server 170 may send one or more log messages to VNC 102, which control plane VM 112A receives and communicates to analytics VM 104A using XMPP by communication interface 146A. The log messages may include logging information generated and sent according to a baseline extent.

Rules engines 200A-200N of respective analytics VMs 104A-104N apply one or more (i.e., a set of) rules to logging information collected by analytics VM 104A and stored to analytics DB 106A. An administrator may use UI 134 to dynamically configure the rules applied by rules engine 200A to add, modify, or remove rules. Rules engine 200A, for example, may apply the rules or a strict subset of the rules to logging information transported by incoming log messages prior to analytics VM 104A storing the logging information to analytics DB 106A. Alternatively, or additionally, rules engine 200A may apply the rules or a strict subset of the rules continually to logging information stored to analytics DB 106A.

Each of the rules includes actions for a corresponding condition that, when applied and matched by logging information received, cause rules engine 200A to execute the actions. The actions may include directing a network element to modify the extent to which it generates and sends logging information by, e.g., performing "on-demand" information collection responsive to VNC node 102A directives. For example, on-demand information collection may include tracing events in the virtual/physical memory space of an application executing on the network element to obtain logging information and may also, or alternatively, include actively probing the application by directing the application to execute one or more diagnostic subroutines that generate diagnostic logging information.

In general, event tracing may include the recording of information in a particular memory space, whether written to the memory space by the application during normal operation in response to a directive received from VNC 102A (i.e., a collector). The techniques may therefore allow for the production and logging of additional information once an error or any other information message is received. In general, application probing can involve directing the application in question to run integrated diagnostic subroutines to collect additional information that may be useful to analytics VM 104A or an administrator in diagnosing error. Examples of such subroutines include subroutines for setting up/monitoring new counters or events, running various diagnostics, and performing trace routes or other methods to determine a virtual or physical network path through a data center.

Analytics VM 104A may direct an application to modify the extent to which logging information is generated using various techniques, including calling a method of an API exposed by the application in accordance with XMPP interface 150A. In the illustrated example, analytics VM 104 communicates with server 170 via control plane VM 112A using XMPP by communication interface 146A. Calling a method of an exposed API may represent an example instance of logging modification message 43 of FIG. 2A.

Server 170 sends additional traced information and/or information retrieved by active probing to VNC 102A for storage in analytics database 106A where it can be retrieved by an administrator or analyzed by analytics VM 104A for troubleshooting purposes. Server 170 may sends logging information in accordance with XMPP interface 150A in this example. However, other communication interfaces for exchanging logging information between VNC 102A and server 170 may be used, including Simple Object Access Protocol (SOAP), Common Object Broker Request Architecture (CORBA), Remote Procedure Calls (RPC), and the like.

Physical Path Determination for Virtual Network Packet Flows

Figure 6:
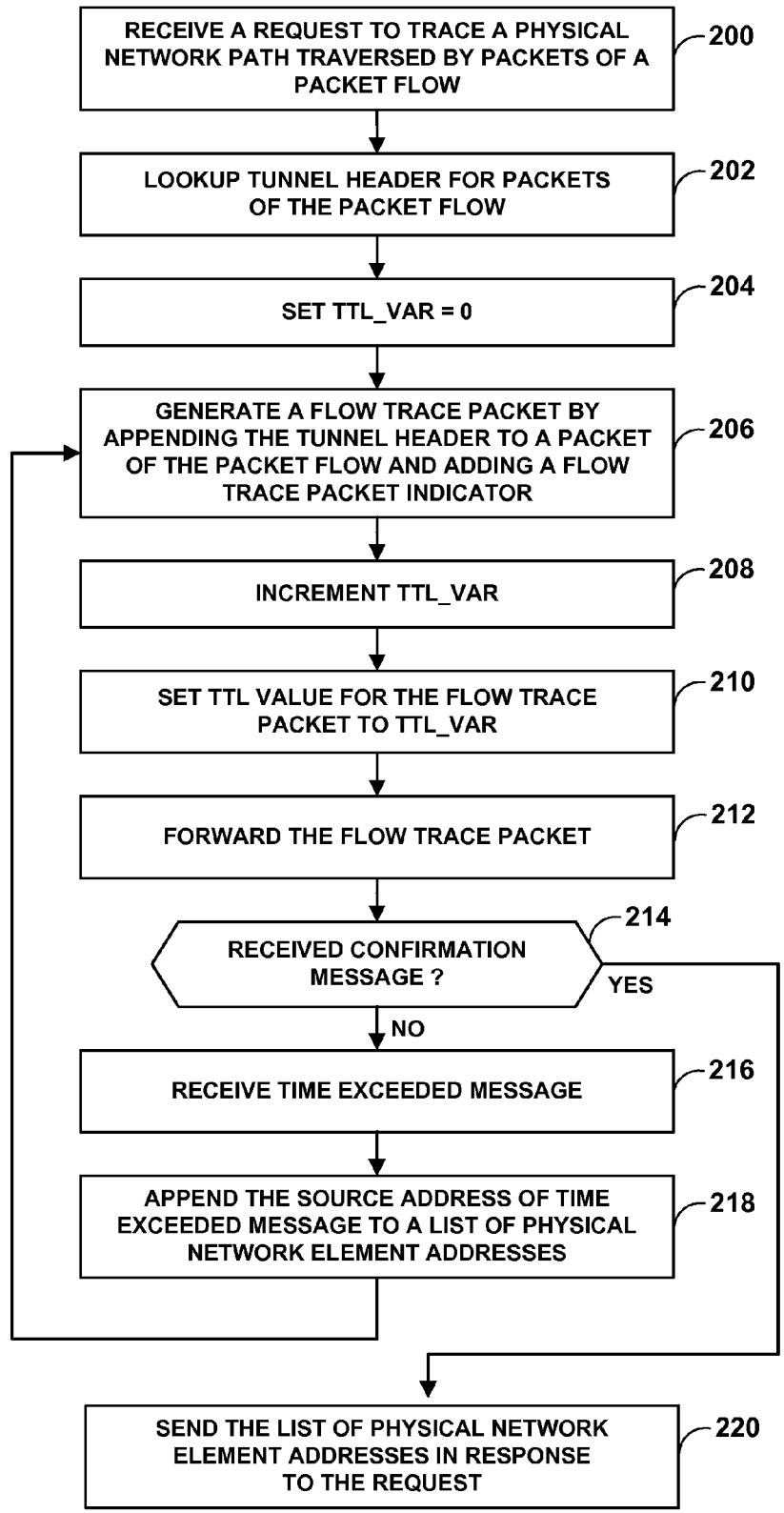
FIG. 6 is a flowchart illustrating an example mode of operation of a network element to determine a physical network path in a virtualized network domain in accordance with techniques described in this disclosure.

FIG. 6 is a flowchart illustrating an example mode of operation of a network element to determine a physical network path in a virtualized network domain in accordance with techniques described in this disclosure. This mode of operation is described with respect to components of server 12A of FIGS. 2A and 2B but may be performed by other network elements of data center 10, such as TORs 16 or chassis switches 18.

Initially, flow trace module (FTM) 48 of server 12A receives a request to determine, or "trace," a physical network path traversed by packets of a packet flow (200). The request may include, e.g., a complete IP packet that conforms to the packet flow, an IP header that matches IP headers of packets of the packet flow, or one or more fields for such an IP header (a source IP address and destination IP address for example). The packet flow may represent a packet flow that traverses an overlay/virtual network. In some examples, VN agent 35A receives the request from VNC 22 and sends the request to FTM 48. FTM 48 may use a destination IP address for the packet flow to query a network forwarding table 32 corresponding to the virtual network of the packet flow, such as NFT$_1$, to obtain a tunnel header and in some cases other tunneling information, such as an outbound interface, for packets of the packet flow (202). To initialize the flow trace, FTM 48 sets a variable, TTL_VAR, to 0 (204).

Flow trace module 48 generates an outer, flow trace packet for the virtual network by generating an inner packet that includes trace packet information, such as a trace packet identifier and sequence number, and appending the obtained tunnel header to the inner packet and adding a flow trace packet indicator to a field of the outer packet (206). For subsequently generated flow trace packets for this request, FTM 48 may increment the sequence number. The flow trace packet indicator is described in further detail with respect to FIGS. 8-9. The inner packet of the flow trace packet is a data payload of the flow trace packet.

Flow trace module 48 increments TTL_VAR (208) and sets the TTL field of the flow trace packet to TTL_VAR (210). For the initial flow trace packet, this means the TTL field has a value of 1. Switch 30A forwards the flow trace packet module by the outbound interface according to the network forwarding table corresponding to the virtual network of the packet flow (212).

If switch 30A does not receive a confirmation message (NO branch of 214) and instead receives a time exceeded message (e.g., an ICMP Time Exceeded message) responsive to the latest flow trace packet for the request (216), FTM 48 appends the source address of the time exceeded message to a list of physical network element network addresses (218). The source address is an address of the physical network element that sent the time exceeded message. Flow trace module 48 then performs again at least steps 106-112 to generate and forward another flow trace packet with an incremented value for the TTL field. In this way, flow trace module 48 generates one or more flow trace packets having incrementally increasing respective time-to-live values.

If switch 30A receives a confirmation message (YES branch of 214) responsive to a flow trace packet, such as an ICMP Echo Reply, this indicates that a tunnel endpoint for the virtual network has received the flow trace packet and that the physical network path has been fully traced. FPM module 48 therefore replies to the request by sending the list of physical network element network addresses to the requesting device (220). In some examples, VM agent 35A sends the list to VNC 22.

Figure 7:
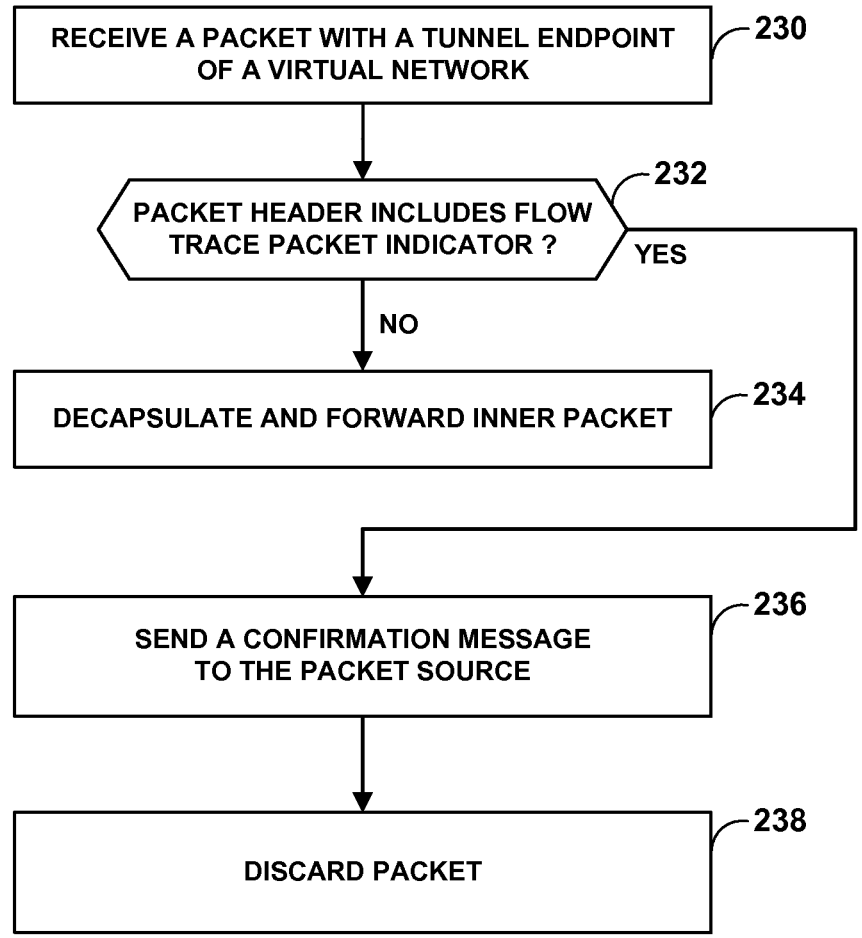
FIG. 7 is a flowchart illustrating an example mode of operation of a network element according to techniques of this disclosure.

FIG. 7 is a flowchart illustrating an example mode of operation of a network element according to techniques of this disclosure. This mode of operation is described with respect to components of server 12A of FIGS. 2A and 2B but may be performed by other network elements of data center 10, such as TORs 16 or chassis switches 18.

Switch 30A of server 12A is a tunnel endpoint for a virtual network, such as the virtual network associated with network forwarding table 32 NFT$_1$, and receives a packet by a tunnel of the virtual network (230). The packet is an outer packet that includes a tunnel header and may represent one of the packets described with respect FIGS. 8-9. If the tunnel header does not include a flow trace packet indicator (NO branch of 232), then switch 30A decapsulates the inner packet of the tunnel header and forwards the inner packet to one of VMs 32 that has a network address that is a destination network address of the inner packet (234). If, however, the tunnel includes a flow trace packet indicator (YES branch of 232), the packet is a flow trace packet and switch 30A sends a confirmation message to another of servers 12 having a network address that is a source network address of the tunnel header to confirm receipt at server 12A (236). The confirmation message may transport at least a portion of the inner packet, including the IP header of the inner packet in some cases. The confirmation message may be, e.g., an ICMP Echo Reply message. Because the flow trace packet received by server 12A does not carry application data for any of VMs 32, switch 30A discards the flow trace packet (238).

Figure 8:
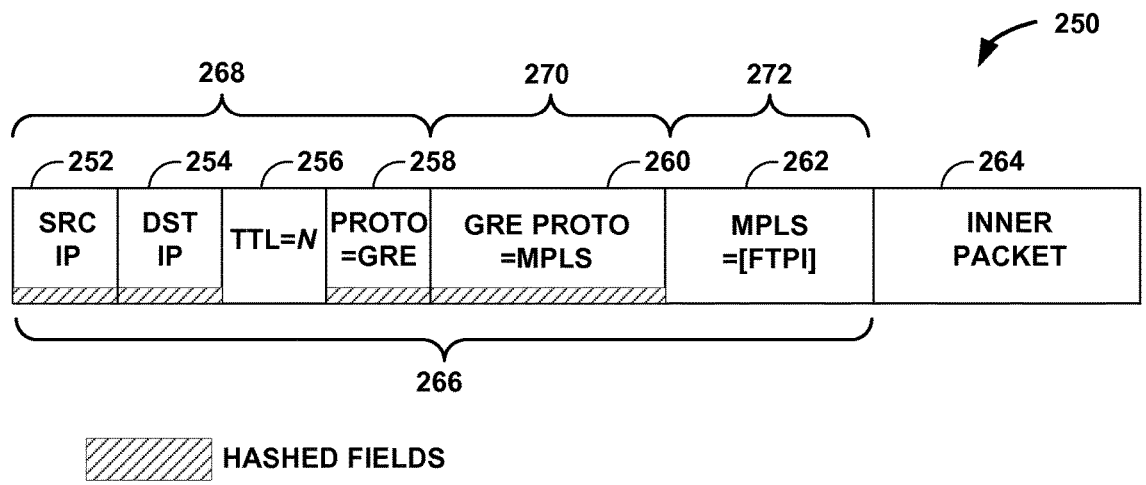
FIG. 8 is a block diagram illustrating fields of an example flow trace packet generated according to techniques described herein.

FIG. 8 is a block diagram illustrating fields of an example flow trace packet generated according to techniques described herein. MPLS-in-GRE packet 250 is a flow trace packet generated for a virtual network implemented according to MPLS-in-GRE encapsulation techniques, which encapsulates a Multiprotocol Label Switching (MPLS) packet in Generic Route Encapsulation (GRE) for a GRE tunnel. For simplicity and ease of illustration, MPLS-in-GRE packet 250 does not illustrate each and every field of a typical MPLS-in-GRE packet but is offered to highlight the techniques described herein.

A MPLS-in-GRE tunnel endpoint generates MPLS-in-GRE packet 250 to include tunnel header 266, which includes an outer IP header 268 composed of source IP address 252 ("SRC IP 252"), destination IP address 254 ("DST IP 254"), Time-to-Live field 256 having a value incrementally set according to techniques described above with respect to, e.g., FIG. 6, and IP protocol field 258 ("PROTO 258") that defines the protocol used in the data portion of the IP datagram (here, GRE); a GRE tunnel header 270 composed of GRE protocol field 260 ("GRE PROTO 260") that identifies the protocol used in the data portion of the GRE datagram (here, MPLS); and an MPLS label stack 272 that includes MPLS label 262 ("MPLS 262"). MPLS label 262 is an MPLS label value used to designate the individual MPLS-in-GRE overlay network on which communication VMs are situated. MPLS-in-GRE packet 250 also includes an inner packet 264, which may include flow trace information about MPLS-in-GRE packet 250 such as an identifier and/or sequence number.

In some cases, the tunnel endpoint may allocate a packet flow to any one of a plurality of equal-cost multipaths to reach a packet flow destination. The tunnel endpoint may apply a hashing function to one or more of the header fields of a packet for a packet flow, and the output of the hashing function determines the path in the equal-cost multipath that is selected for the packet flow. In the example MPLS-in-GRE packet 250, the tunnel endpoint applies a hashing function to SRC IP 252, DST IP 254, IP protocol field 258, and GRE protocol field 260. However, the tunnel endpoint does not apply the hashing function to MPLS label 262. As a result, MPLS-in-GRE packet 250 may be hashed to the path of the equal-cost multipath that is the same path as that selected for the packet flow whose physical network path is being traced. In other words, for a packet flow being traced, the tunnel endpoint generates MPLS-in-GRE packet 250 to include hashed fields identical to packets of the packet. Other fields may vary. Because ICMP is identified differently in other instances of IP protocol field 258 for, e.g., ICMP Echo Requests and because IP protocol field 258 is a hash field, ICMP packets will necessarily be hashed by a tunnel endpoint differently that MPLS-in-GRE packet 250 and may result in ICMP Echo Request being transported on a different path in an equal-cost multipath proceeding from the tunnel endpoint.

Accordingly, to identify MPLS-in-GRE packet 250 as a flow trace packet, MPLS-in-GRE packet 250 includes a flow trace packet indicator in the form of a flow trace packet indicator value for MPLS label 262. The flow trace packet indicator value, like MPLS label 262, may be a 20-bit value that is a specially-designated value to identify a packet as a flow trace packet rather than to designate an individual MPLS-in-GRE-based overlay network. Because a tunnel endpoint does not hash MPLS label 262 in a hashing function, MPLS-in-GRE packet 250 may follow the same physical network path as a packet of the packet flow being traced.

Figure 9:
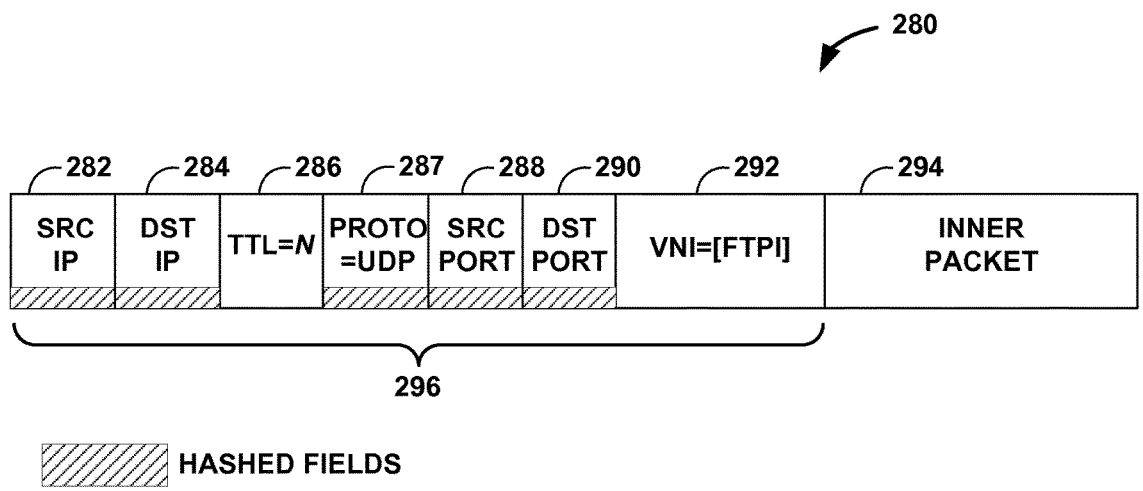
FIG. 9 is a block diagram illustrating fields of an example flow trace packet generated according to techniques described herein.

FIG. 9 is a block diagram illustrating fields of an example flow trace packet generated according to techniques described herein. Virtual eXtensible Local Area Network (VxLAN) packet 280 is a flow trace packet generated for a virtual network implemented according to VxLAN techniques. For simplicity and ease of illustration, VxLAN packet 280 does not illustrate each and every field of a typical VxLAN packet but is offered to highlight the techniques described herein.

A VxLAN Tunnel End Point is a tunnel endpoint that generates VxLAN packet 280 to include tunnel header 296, which includes an outer IP header composed of source IP address 282 ("SRC IP 282"), destination IP address 284 ("DST IP 284"), Time-to-Live field 286 having a value for multiple instances of VxLAN packet 280 incrementally increasing according to techniques described above with respect to, e.g., FIG. 6, and IP protocol field 287 that defines the protocol used in the data portion of the IP datagram (here, UDP); an outer UDP header composed of source UDP port 288 ("SRC PORT 288") and destination UDP port 290 ("DST PORT 290"); and a VxLAN header that includes VxLAN network identifier (VNI) 292 ("VNI 292") (alternatively referred to as a VxLAN segment identifier). VNI 292 is a 24 bit value used to designate the individual VxLAN overlay network on which communication VMs are situated. VxLAN packet 280 also includes an inner packet 294, which may include flow trace information about VxLAN packet 280 such as an identifier and/or sequence number.

In some cases, the tunnel endpoint may allocate a packet flow to any one of a plurality of equal-cost multipaths to reach a packet flow destination. The tunnel endpoint may apply a hashing function to one or more of the header fields of a packet for a packet flow, and the output of the hashing function determines the path in the equal-cost multipath that is selected for the packet flow. In the example VxLAN packet 280, the tunnel endpoint applies a hashing function to SRC IP 282, DST IP 284, IP protocol field 287, SRC PORT 288, and DST PORT 290. However, the tunnel endpoint does not apply the hashing function to VNI 292. As a result, VxLAN packet 280 may be hashed to the path of the equal-cost multipath that is the same path as that selected for the packet flow whose physical network path is being traced. In other words, for a packet flow being traced, the tunnel endpoint generates VxLAN packet 280 to include hashed fields identical to packets of the packet. Other fields may vary. Because ICMP is identified differently in other instances of IP protocol field 287 for, e.g., ICMP Echo Requests and because IP protocol field 287 is a hash field, ICMP packets will necessarily be hashed by a tunnel endpoint differently that VxLAN packet 280 and may result in ICMP Echo Request being transported on a different path in an equal-cost multipath proceeding from the tunnel endpoint.

Accordingly, to identify VxLAN packet 280 as a flow trace packet, VxLAN packet 280 includes a flow trace packet indicator in the form of a flow trace packet indicator value for VNI 292. The flow trace packet indicator value, like VNI 292, may be a 24-bit value that is a specially-designated value to identify a packet as a flow trace packet rather than to designate an individual VxLAN overlay network. Because a tunnel endpoint does not hash VNI 292 in a hashing function, VxLAN packet 280 may follow the same physical network path as a packet of the packet flow being traced. Although described above with respect to MPLS-in-GRE- and VxLAN-based network virtualization, the techniques of this disclosure may applicable to other network virtualization encapsulation types, including MPLS-in-IP, Network Virtualization using Generic Routing Encapsulation (NVGRE), and others.

Figure 10:
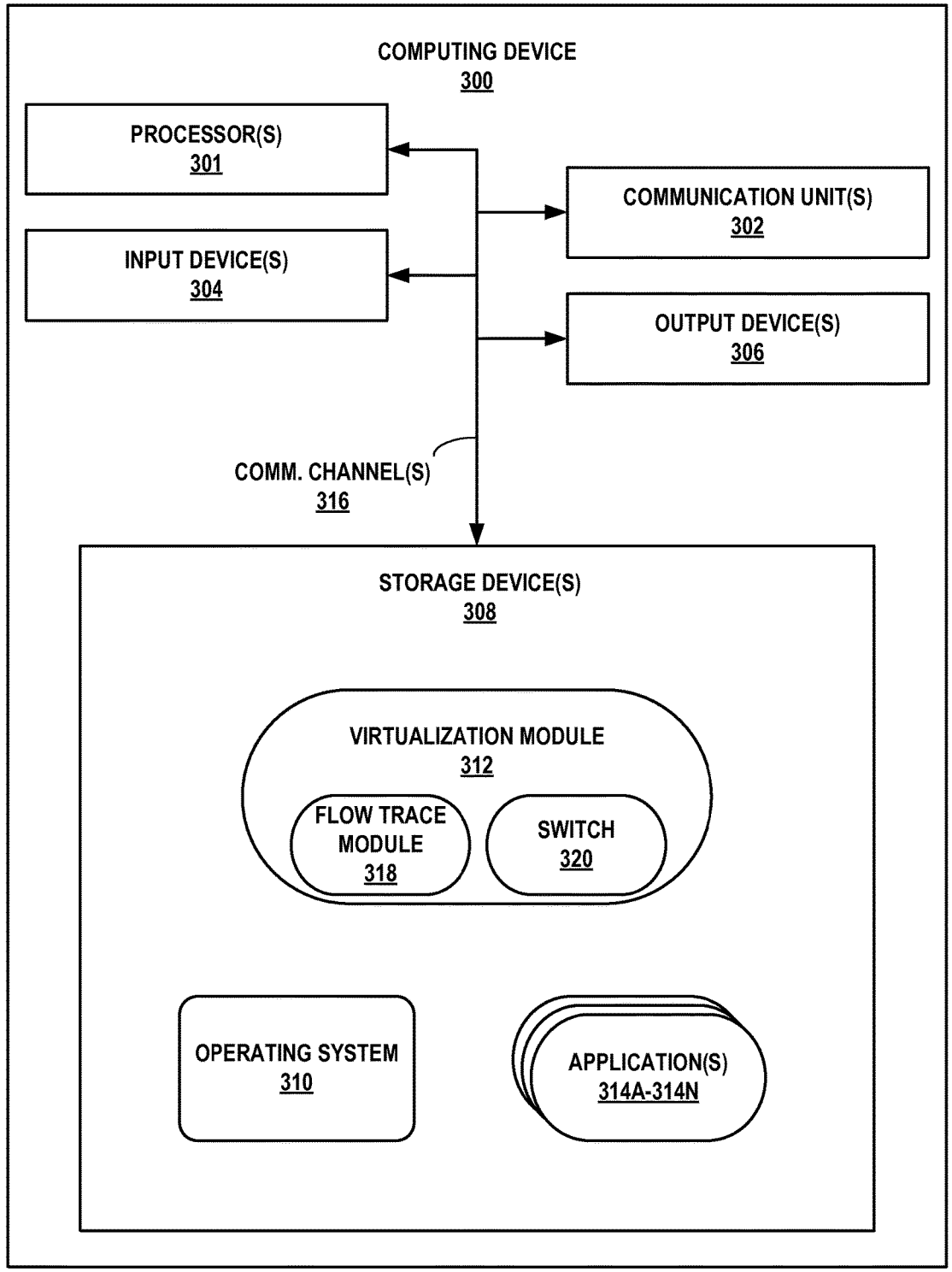
FIG. 10 is a block diagram illustrating an example computing device in accordance with one or more aspects of the present disclosure.

FIG. 10 is a block diagram illustrating an example computing device for implementing any of the various techniques describe herein. Computing device 300 may represent, e.g., any of servers 12, TORs 16, or chassis switches 18 of FIG. 1. FIG. 10 illustrates only one particular example of computing device 300, and many other examples of computing device 300 may be used in other instances. For example, a computing device that implements TORs 16 and chassis switches 18 may include a high-speed distributed forwarding plane.

As shown in the specific example of FIG. 10, computing device 300 includes one or more processors 301, one or more communication units 302, one or more input devices 304, one or more output devices 306, and one or more storage devices 308. Computing device 300 further includes operating system 310, virtualization module 312, and one or more applications 314A-314N (collectively "applications 314"). Virtualization module 312 may represent hypervisor 31 of server 12A, for instance, and applications 314 may represent different VMs 36. Each of components 301, 302, 304, 306, and 308 may be interconnected (physically, communicatively, and/or operatively) for inter-component communications. As one example in FIG. 10, components 301, 302, 304, 306, and 308 may be coupled by one or more communication channels 316. In some examples, communication channels 316 may include a system bus, network connection, interprocess communication data structure, or any other channel for communicating data. Virtualization module 312 and applications 314, as well as operating system 310 may also communicate information with one another as well as with other components in computing device 300. Virtualization module 312 includes software switch 320 to switch packets on one or more virtual networks. Virtualization module 312 also includes flow trace module 318 to determine physical network paths of network flows switched by computing device 300 by generating flow trace packets and incrementally setting respective TTL values to cause downstream switching device to return time exceeded messages to computing device. Flow trace module 318 may represent an example instance of FTM 48 of FIG. 1.

Processors 301, in one example, are configured to implement functionality and/or process instructions for execution within computing device 300. For example, processors 301 may be capable of processing instructions stored in storage devices 308. Examples of processors 301 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage devices 308, in some examples, are described as a computer-readable storage medium. In some examples, storage devices 308 are a temporary memory, meaning that a primary purpose of storage devices 308 is not long-term storage. Storage devices 308, in some examples, are described as a volatile memory, meaning that storage devices 308 do not maintain stored contents when the computer is turned off. Examples of volatile memories include random access memories (RAM), dynamic random access memories (DRAM), static random access memories (SRAM), and other forms of volatile memories known in the art. In some examples, storage devices 308 are used to store program instructions for execution by processors 301. Storage devices 308, in one example, are used by software or applications running on computing device 300 (e.g., operating system 310, virtualization module 312 and the like) to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 300, in some examples, also includes one or more communication units 302. Computing device 300, in one example, utilizes communication units 302 to communicate with external devices. Communication units 302 may communicate, in some examples, by sending data packets over one or more networks, such as one or more wireless networks, via inbound and outbound links. Communication units 302 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components. In some examples, computing device 300 utilizes communication units 302 to exchange tunneled packets with other computing devices in a virtualized network domain of a data center.

Computing device 300, in one example, also includes one or more input devices 304. Input devices 304, in some examples, are configured to receive input from a user through tactile, audio, or video feedback. Examples of input devices 304 include a presence-sensitive display, a mouse, a keyboard, a voice responsive system, video camera, microphone or any other type of device for detecting a command from a user. In some examples, a presence-sensitive display includes a touch-sensitive screen.

One or more output devices 306 may also be included in computing device 300. Output devices 306, in some examples, are configured to provide output to a user using tactile, audio, or video stimuli. Output devices 306, in one example, include a presence-sensitive display, a sound card, a video graphics adapter card, or any other type of device for converting a signal into an appropriate form understandable to humans or machines. Additional examples of output devices 306 include a speaker, a cathode ray tube (CRT) monitor, a liquid crystal display (LCD), or any other type of device that can generate intelligible output to a user.

Computing device 300 may include operating system 310. Operating system 310, in some examples, controls the operation of components of computing device 300. For example, operating system 310, in one example, facilitates the communication of applications 314 and virtualization module 312 with processors 301, communication units 302, input devices 304, output devices 306, and storage devices 310. Applications 314 may each include program instructions and/or data that are executable by computing device 300. As one example, application 314A may include instructions that cause computing device 300 to perform one or more of the operations and actions described in the present disclosure.

Finding Latency Through a Physical Network in a Virtualized Network

In general, the following sections of this disclosure describe techniques for determining latency in a physical network that includes a number of network devices over which packets travel. In a virtual network architecture, information regarding latency of any particular flow, i.e., the time it takes for a packet to travel from one network device (e.g., server) to another network device via a particular path of switches and connectors, may not be readily available to the virtual network.

When a packet matching a defined set of monitored packets travels through a network device (e.g., a switch or router) during the defined time period, the network device can make a copy of the packet without affecting the flow of the packet, and send information from the copied packet back to an analytics engine of a logically centralized virtual network controller along with the time stamp and the identity of the network device. In other words, the analytics engine receives information on when and where the packet has traveled. By analyzing this information from a number of network devices, analytics engines of the virtual network controller can determine the time taken by specific packets to traverse the physical network, and can identify network devices and/or connections in the physical network that slows the speed of the network. Additionally, instead of sending back an entire copy of the monitored packet, the network device can take a hash, i.e., signature, of an invariant portion of the copied packet that uniquely identifies the packet, for instance the payload, and send the signature back to the analytic engine along with a device identifier and timestamp information. Sending the signatures instead of the entire packet can provide a more scalable mechanism by compressing the amount of information that needs to be sent and stored in the network.

Using a collection of such latency information, the virtual network controller can identify places in the physical network that are slow or where bottlenecks in traffic are occurring. Such a bottleneck may be indicative of a problem with the physical network, such as, for example, a deteriorated cable. Identifying such problems in the physical network without having to run specific testing on each of the components of the network may save time and money, and can help ensure that the network performs optimally and without interruption.

In one embodiment, a method for determining latency of a physical network path in a network includes receiving, by a virtual network controller, a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received. The method also includes identifying, by the virtual network controller, two or more of the plurality of messages having a common packet signature, and determining, by the virtual network controller, a latency of a physical network path in the network based on analysis of contents of the identified messages having a common packet signature.

In another embodiment, a method includes receiving from a virtual network controller, by a network device, information specifying packet characteristics of packets to be analyzed, receiving a packet, responsive to determining that the packet matches the specified characteristics, and by a virtual network agent executing on the network device, determining a hash of an invariant portion of the packet that uniquely identifies the packet to obtain a packet signature, and forwarding, to the virtual network controller, a message that specifies: (1) the packet signature, (2) an identifier of the network device, and (3) a timestamp indicating a time the packet was processed by the network device.

In another embodiment, a computer-readable storage medium includes instructions for causing a programmable processor to receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received, identify two or more of the plurality of messages having a common packet signature, and determine a latency of a physical network path in the network based on analysis of contents of the identified messages having a common packet signature.

In a further embodiment, a virtual network controller includes one or more processors, and a plurality of virtual machines executed by the processors to receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received. The virtual network controller also includes a plurality of analytics virtual machines, wherein the plurality of virtual machines identify two or more of the plurality of messages having a common packet signature, and determine a latency of a physical network path in the network based on analysis of contents of the identified messages having a common packet signature.

In another example, a system includes a virtual network controller that includes one or more processors, a plurality of virtual machines executed by the processors, and a plurality of network devices comprising one or more processors, wherein the plurality of network devices receive from the virtual network controller, information specifying packet characteristics of packets to be analyzed receiving a packet, wherein the plurality of virtual machines receive a plurality of messages from the plurality of network devices, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received, wherein the virtual network controller further comprises a plurality of analytics virtual machines that identify two or more of the plurality of messages having a common packet signature, and determine a latency of a physical network path in the network based on analysis of contents of the identified messages having a common packet signature, and wherein the plurality of network devices comprise a virtual network agent executing on the processors that, responsive to determining that the packet matches the specified characteristics, determining a hash of an invariant portion of the packet that uniquely identifies the packet to obtain a packet signature, and forward, to the virtual network controller, a message that specifies: (1) the packet signature, (2) an identifier of the network device, and (3) a timestamp indicating a time the packet was processed by the network device.

Figure 11:
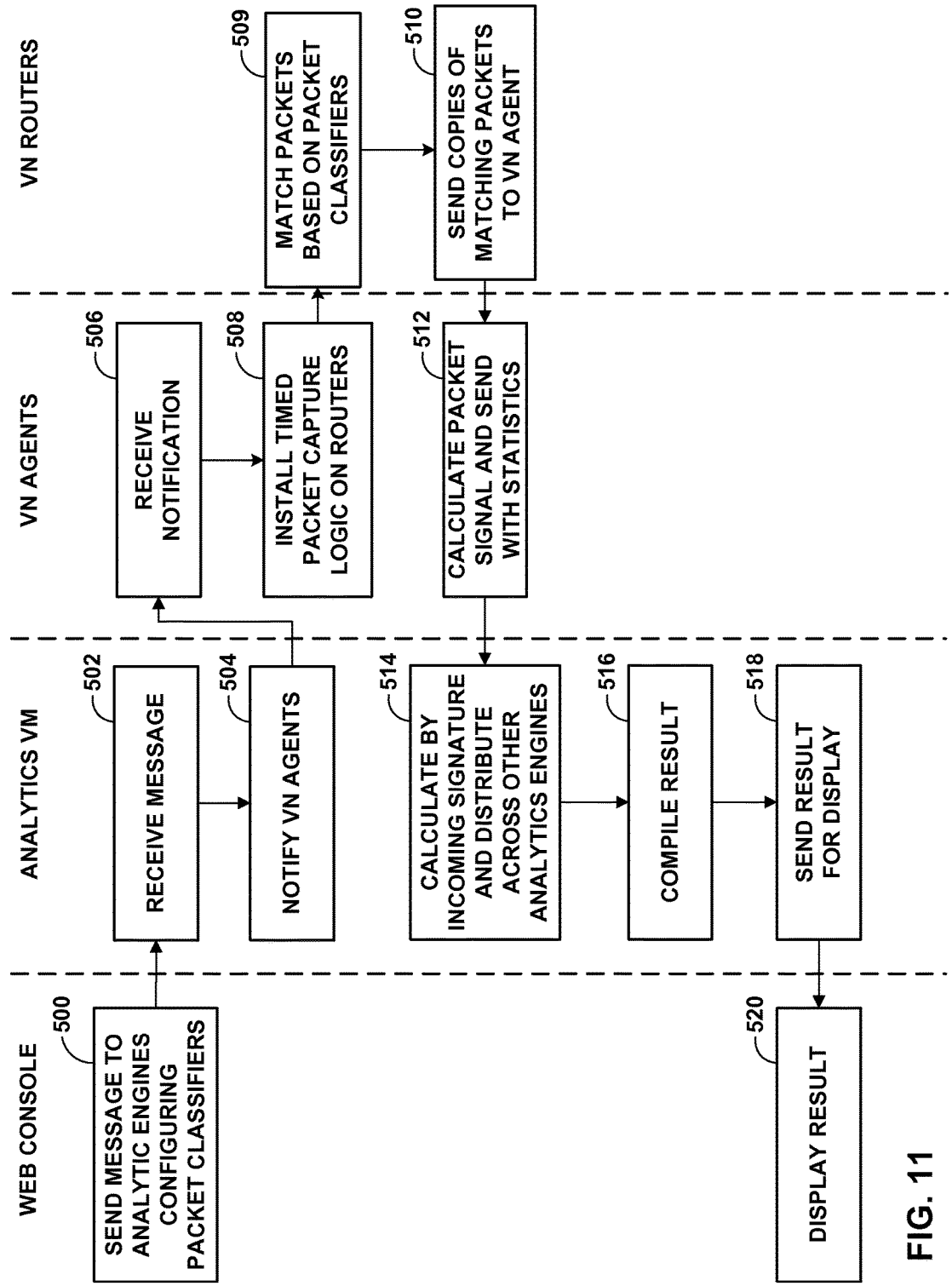
FIGS. 11-12 are flowcharts illustrating example operations of network devices in accordance with one or more embodiments of this disclosure.

FIG. 11 is a flowchart illustrating example operation of network devices in accordance with the techniques of this disclosure. FIG. 11 is described with respect to FIGS. 1-3. As shown in FIG. 11, to determine the latency of a class of traffic, a request is initiated by the admin, such as via a device used to access the network, for instance, web console 42. The request may specify a packet classifier that describes characteristics of packets to be analyzed, and may also define a time period in which the packet classifier should be applied, such as by setting a start time and end time. The web console 42 delivers a message to the analytics VM 104 with the packet classifier information (500).

The Analytics VM 104, in turn, receives the message (502) and notifies and delivers the packet classifier and time period securely to the appropriate VN switch agent 172 in the network (504). Analytics VM 104 can identify which VN switch agents 172 need to be notified based on the packet classifier, such as based on a comparison of the IP addresses in the packet classifier relative to which subnets are owned by the VN switch agent 172. Each of the notified VN switch agents 172 can install this packet classifier on their respective virtual switch 174 to capture the appropriate packets, e.g., at their egress interface. Each virtual switch 174 thus can enable the received packet classifier at the specified start time. If the end time is in the past, virtual switch 174 can ignore this packet classifier. If start time is in the past, virtual switch 174 can enable the packet classifier immediately. The virtual switch 174 will disable the packet classifier at the end time.

When a packet traveling in the network matches a packet classifier on the virtual switch 174 (509), the virtual switch 174 sends a copy of the packet to a slow path for processing at the VN switch agent 172 (510), without affecting delivery of the original received packet. In a networking data path of the switches and router, when a packet comes to be forwarded, there may exist two paths, fast path and slow path. Fast path is like cached memory, and determines what to do with the packet, such as where to send it to, without delay. If the information is not at hand, for example like cache miss, the packet is queued for further processing, where some other program looks up database to what to do with this packet, and if necessary, update the fast path cache.

Usually a network device performs this flow-based forwarding by caching or otherwise storing flow state for the packet flows of a given communication session between two devices. Generally, upon recognizing a first packet of a new flow, a network device initializes data to record the state data for the session. The VN switch agent 172 may inspect packet flows for the sessions. In some cases, the VN switch agent 172 may comprise two forwarding paths, a first path for processing a first packet of a newly established flow and a second path for inspecting and forwarding subsequent packets associated with a pre-existing flow. The first path through the VN switch agent 172 may be referred to as the "first path," "slow path," or "session management path." At this time, after processing the first packet of the newly established flow, the VN switch agent 172 may update flow tables to record the session and otherwise initialize session data. The second path through VN switch agent 172 may be referred to as the "fast path" because the second path normally does not take as long to traverse as the first path due to the lack of detailed inspection needed for subsequent packets in an already-established flow. Further details relating to network devices having a fast path and slow path can be found in U.S. Pat. No. 8,339,959, filed Jul. 30, 2008, entitled "Streamlined Packet Forwarding using Dynamic Filters for Routing and Security in a Shared Forwarding Plane," the entire content of which is incorporated by reference herein. Virtual switch 174 sends additional information such as a timestamp, ingress port and egress port etc. to the slow path along with the copy of the packet.

As will be described in more detail below with respect to FIG. 7 the VN switch agent 172 calculates the packet signature and sends that with statistics to analytics VM 104 (512), analytics VM 104 calculates by incoming signature and may distribute the calculation across other Analytics VM 104 in virtual network controller 100 (514), and analytics VMs 104 compiles the result (516) and may optionally send the compiled result to the web console 42 for display and/or further use (518). The web console may display the result (520).

Figure 12:
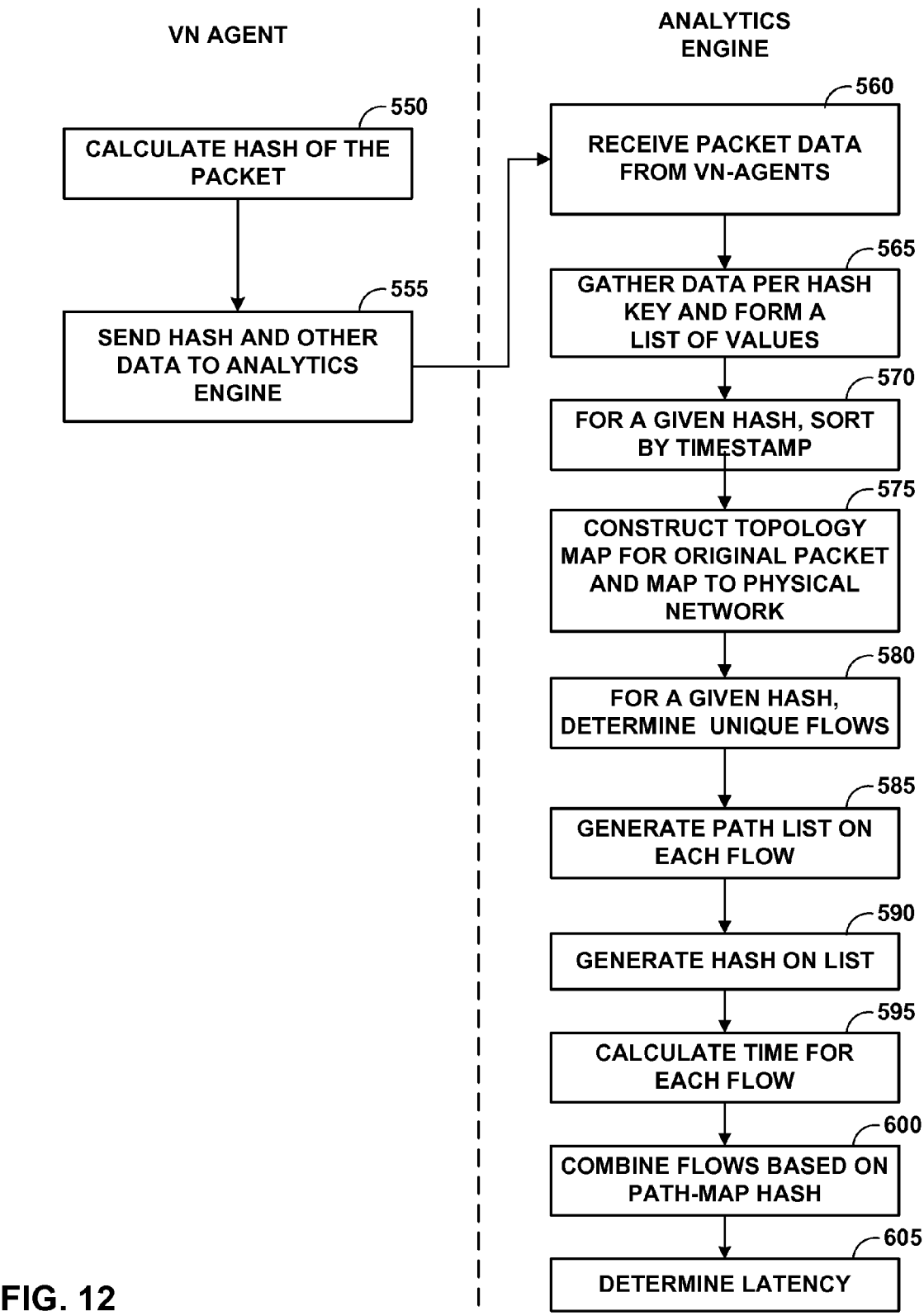

FIG. 12 is a flowchart illustrating example operation of network devices in accordance with the techniques of this disclosure. FIG. 12 illustrates one example operation of how latency may be calculated by a virtual network controller, but the techniques of this disclosure are not limited to this particular example. As shown in FIG. 12, VN switch agent 172, on receiving one such packet, first calculates a hash (550) (such as md5, sha1, etc.) of a part of packet that is path invariant and uniquely identifies the packet (such as, for example, the IP payload). This hash will be treated as the key, or signature, of the packet. This key along with the switch identifier, which is unique to the VN switch agent 172, and which identifies which virtual switch 174 the packet passed through, timestamp, ingress port, egress port, etc. as data will be sent back to the analytics VM 104 for further processing (555). Analytics VM 104 also receives this data from VN agents 172 of other servers 170 (not shown in FIG. 5) (560).

On the expiry of the end time (plus some jitter), analytics VMs 104 will start processing each packet by the hash keys. Such initial processing may include gathering data per key, and forming a list of values of the key and assigning a job per key (packet hash) to one of the analytics VMs 104 across virtual network controller 100 (565). That is, each original packet yielded a unique hash, which can be used as the key to identify each of the packets and their information. Analytics VM 104 may obtain, for each hash, a list of switch ids, timestamps, ingress ports and egress ports, etc.

For each hash, analytics VM 104 will then sort the associated list by timestamp (570) and construct the topology map that the packet has traversed (virtual network topology map) based on the list of switch ids and timestamps, and match the topology map up with the known physical topology of the network (575). The virtual network topology map includes a topology map of virtual switches based on the virtual switch ids. As analytics VMs 104 are linearly scaled, each gets a part of the job to process and determine the results. Near consistency of the timestamp is assumed to allow the clock drifts.

Next, the analytic engine 320 identifies the source and destination of this packet represented by the hash, and this hash can be broken down as n-distinct flows (580). Then, on each of the flows, analytics VM 104 generates the path list (590), which consists of {switch-1, switch-2 ... switch-r}, which are the specific physical switches that the packet traversed. Analytics VM 104 generates a hash on this switch list or path-map (595), which is used as the key for the subsequent calculation. For each path-map hash, the near consistent time that the packet took from its source to its destination can be determined. The expected error is also calculated, which will be used to calculate the jitter or latency per path.

With the path-map hash, all the flows can be combined (600) detected for a path-map and from there analytics VM 104 can compute the statistical measure of the latency (605).

By combining across the packet classifier, analytics VMs 104 can determine the real latency by evaluating minimum, maximum, mean and standard deviation per path in this network.

Using a collection of such latency information, virtual network controller 100 can identify places in the physical network that are slow or where bottlenecks in traffic are occurring. Such a bottleneck may be indicative of a problem with the physical network, such as, for example, a deteriorated cable. Identifying such problems in the physical network without having to run specific testing on each of the components of the network saves time and money, and can help ensure that the network performs optimally and without interruption.

Additionally, the method can be used with any sets of physical switches provided that for each physical switch in the set there is an associated VN-agent capable of receiving the PC, identifying (and hashing) the identified packets, and forwarding it to an analytics engine for further processing as described above.

Techniques are described for determining latency in a physical network that includes a number of network devices over which packets travel. A virtual network controller receives a plurality of messages from a plurality of network devices in a network, each of the messages including a packet signature comprising a hash of an invariant portion of an original packet that uniquely identifies the original packet, an identifier of one of the plurality of network devices from which the respective message was received, and a timestamp indicating a time an original packet was processed by the network device from which the respective message was received. The virtual network controller determines a latency of a physical network path in the network based on analysis of contents of the identified messages having a common packet signature.

Various examples are described in the following clauses. The examples set forth in any of the following clauses may be incorporated and implemented in combination with any of the other examples described throughout this disclosure in accordance with the techniques described herein.

Clause 1. A method for determining latency of a physical network path in a network, the method comprising: receiving, by a virtual network controller, a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received; identifying, by the virtual network controller, two or more of the plurality of messages having a common packet signature; determining, by the virtual network controller, a latency of a physical network path in the network based on analysis of contents of the identified messages having a common packet signature.

Clause 2. The method of clause 1, wherein the plurality of network devices comprise a plurality of virtual network agents executing on a plurality of server devices in the network, wherein the identifier of the network device comprises an identifier of a virtual switch associated with a virtual network agent.

Clause 3. The method of clause 2, wherein different ones of the plurality of server devices receive the same original packet at different times.

Clause 4. The method of any of clauses 1-3, wherein the identifying comprises identifying, by a plurality of distributed analytics virtual machines executing on the virtual network controller, the two or more of the plurality of messages having a common packet signature, and wherein the determining comprises determining at least in part by the plurality of distributed analytics virtual machines analyzing contents of the plurality of messages to determine the latency.

Clause 5. The method of any of clauses 1-4, further comprising prior to receiving the plurality of messages, sending, by the virtual network controller, one or more commands to the plurality of network device indicating characteristics of packets to be analyzed and a time range in which to collect packets matching the characteristics, wherein receiving the plurality of messages comprises receiving the plurality of messages responsive to sending the one or more commands.

Clause 6. The method of any of clauses 1-5, further comprising: by the virtual network controller: sorting contents of the plurality of messages by signature; obtaining for each signature, a list of network device identifiers and timestamps; and sorting the list for each signature by timestamp.

Clause 7. The method of clause 6, further comprising: by the virtual network controller: for a given signature, constructing a virtual network topology map that the original packet traversed based on the list of list of virtual network device identifiers and timestamps associated with that signature; and matching the virtual network topology map to a known physical topology of the network.

Clause 8. The method of clause 7, further comprising: identifying distinct flows associated with one of the signatures; generating a path map for one of the identified flows comprising a list of physical network devices that a packet in the flows traversed based on the known physical topology of the network; generating a hash on the path map; and for each path map hash, determining a time that a packet took in traversing a physical network path from a source to a destination.

Clause 9. The method of clause 8, further comprising: computing a statistical measure of the latency of the physical network path.

Clause 10. A method comprising: receiving from a virtual network controller, by a network device, information specifying packet characteristics of packets to be analyzed; receiving a packet; responsive to determining that the packet matches the specified characteristics, and by a virtual network agent executing on the network device, determining a hash of an invariant portion of the packet that uniquely identifies the packet to obtain a packet signature; and forwarding, to the virtual network controller, a message that specifies: (1) the packet signature, (2) an identifier of the network device, and (3) a timestamp indicating a time the packet was processed by the network device.

Clause 11. The method of clause 10, wherein the identifier of the network device comprises an identifier of a virtual switch associated with a virtual network agent.

Clause 12. The method of any of clauses 10-11, wherein the invariant portion of the packet comprises a payload of the packet.

Clause 13. The method of any clauses 1-12, wherein the received information specifies a time period during which to apply the packet characteristics.

Clause 14. The method of any of clauses 1-13, wherein the packet characteristics comprise a source address and destination address of the packets to be monitored.

Clause 15. A computer-readable storage medium comprising instructions for causing a programmable processor to:

receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received; identify two or more of the plurality of messages having a common packet signature; and determine a latency of a physical network path in the network based on analysis of contents of the identified messages having a common packet signature.

Clause 16. A virtual network controller comprising: one or more processors; a plurality of virtual machines executed by the processors to receive a plurality of messages from a plurality of network devices in a network, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received; and a plurality of analytics virtual machines, wherein the plurality of virtual machines identify two or more of the plurality of messages having a common packet signature, and determine a latency of a physical network path in the network based on analysis of contents of the identified messages having a common packet signature.

Clause 17. The virtual network controller of clause 16, wherein the plurality of analytics virtual machines sort contents of the plurality of messages by signature, obtain for each signature, a list of network device identifiers and timestamps, and sort the list for each signature by timestamp.

Clause 18. The virtual network controller of clause 17, wherein the plurality of analytics virtual machines, for a given signature, construct a virtual network topology map that the original packet traversed based on the list of list of virtual network device identifiers and timestamps associated with that signature, and match the virtual network topology map to a known physical topology of the network.

Clause 19. The virtual network controller of clause 18, wherein the plurality of analytics virtual machines identify distinct flows associated with one of the signatures, generate a path map for one of the identified flows comprising a list of physical network devices that a packet in the flows traversed based on the known physical topology of the network, generate a hash on the path map, and for each path map hash, determine a time that a packet took in traversing a physical network path from a source to a destination.

Clause 20. The virtual network controller of any of clauses 1-19, wherein the plurality of analytics virtual machines compute a statistical measure of the latency of the physical network path.

Clause 21. A system comprising: a virtual network controller comprising:

one or more processors; a plurality of virtual machines executed by the processors; and a plurality of network devices comprising one or more processors, wherein the plurality of network devices receive from the virtual network controller, information specifying packet characteristics of packets to be analyzed receiving a packet, wherein the plurality of virtual machines receive a plurality of messages from the plurality of network devices, wherein each of the messages includes (1) a packet signature comprising a hash of an invariant portion of an original packet that uniquely identifies the original packet, (2) an identifier of one of the plurality of network devices from which the respective message was received, and (3) a timestamp indicating a time an original packet was processed by the network device from which the respective message was received; wherein the virtual network controller further comprises a plurality of analytics virtual machines that identify two or more of the plurality of messages having a common packet signature, and determine a latency of a physical network path in the network based on analysis of contents of the identified messages having a common packet signature; wherein the plurality of network devices comprise a virtual network agent executing on the processors that, responsive to determining that the packet matches the specified characteristics, determining a hash of an invariant portion of the packet that uniquely identifies the packet to obtain a packet signature, and forward, to the virtual network controller, a message that specifies: (1) the packet signature, (2) an identifier of the network device, and (3) a timestamp indicating a time the packet was processed by the network device.

Clause 22. The system of clause 21, wherein plurality of network devices comprise a plurality of server devices each comprising a respective virtual switch and a respective virtual network agent, and wherein the identifier specified by the message comprises an identifier of a virtual switch associated with a virtual network agent.

Dynamic Logging

In general, techniques of this disclosure are described for dynamically modifying the extent of logging performed by logging information generators in response to events detected in logging information received by the collector. For example, a generator device may log information to an extent that accords with a logging baseline and regularly update the collector with the baseline logging information. The collector may determine, by analyzing the baseline logging information, that an event has occurred on or been detected by the generator that indicates a need for a greater logging extent. In other words, the collector may determine that the generator is to log more information than what is stipulated by the logging baseline due, e.g., to an error event. The collector may therefore direct the generator to increase its logging extent to log additional information. In some instances, this directive may include requesting the generator to reply with additional state information. In some instances, this directive may include requesting the generator to actively probe the application by, e.g., triggering a diagnostic subroutine that generates additional logging information than what is stipulated by the baseline. The techniques may, as a result, enable a collector to dynamically adapt the extent of logging performed by a logging information generator to expand the amount of logging information collected when needed. In a data center environment in which a large number of devices may generate logging information, the techniques may result in a more manageable collection of logging information.

Figure 13:
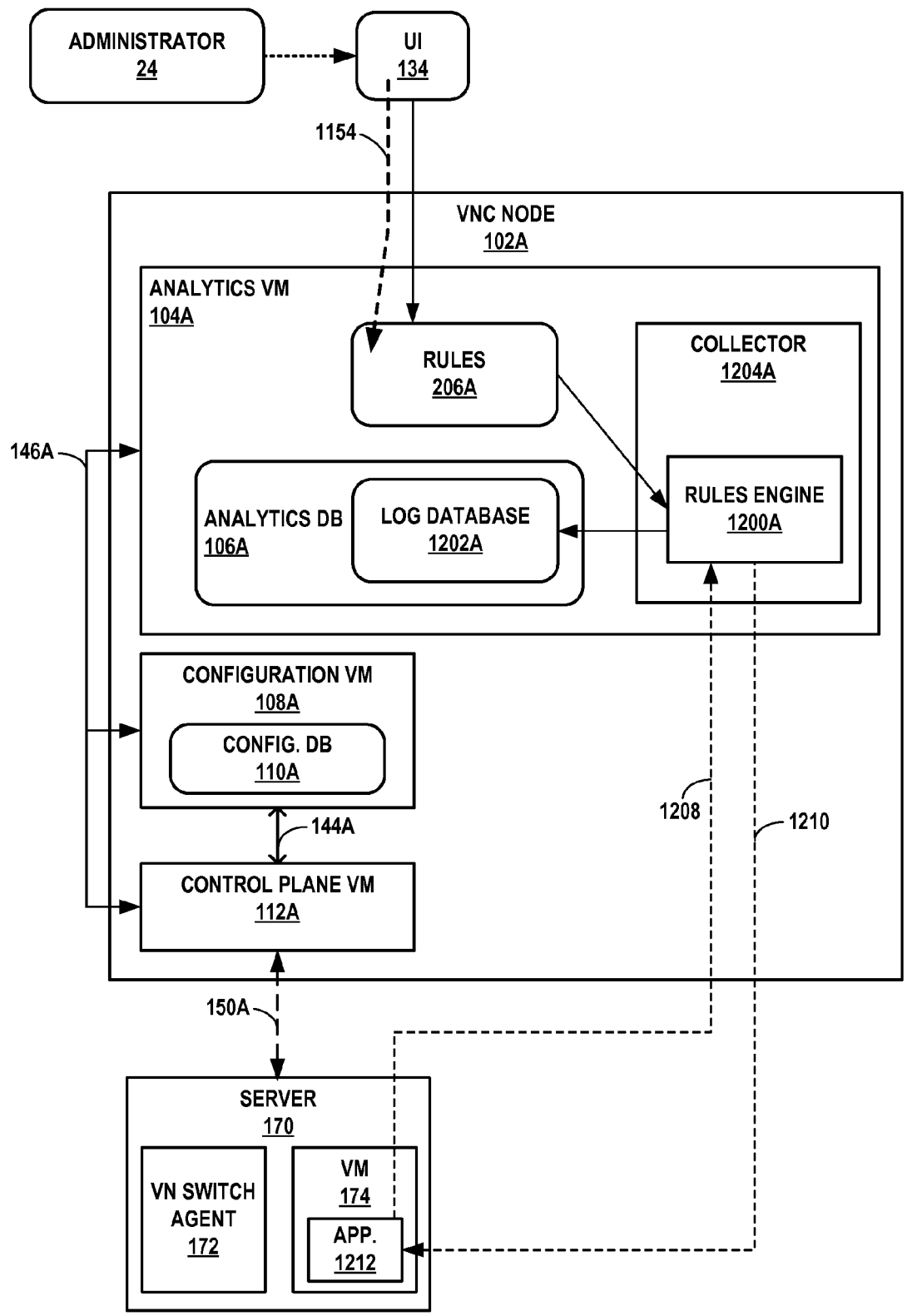
FIG. 13 is a block diagram illustrating, in detail, example components of a virtual network controller to dynamically modify logging information generated by data center elements according to techniques described herein.

FIG. 13 is a block diagram illustrating, in detail, example components of a virtual network controller to dynamically modify logging information generated by data center elements according to techniques described herein. VNC node 102A may represent an example instance of VNC node 102A of FIG. 5. Collector 1204A of analytics VM 104A communicates with data center elements to receive logging information in log messages. In the illustrated example, collector 1204A receives log message 1208 from application 1212 executing on virtual machine 1174 of server 170. Rules engine 1200A, which may represent an example instance of rules engine 200A of FIG. 5, applies a set of one or more rules 1206A, which each defines conditions and a set of one or more actions, to log messages received and collector 1204A stores a representation of the log messages (or at least logging information transported therein) to log database 1202A of analytics database 106A. Rules 1206A are programmable, in that administrator 24 may interact with UI 134 to add, modify, or delete rules in rules 1206A using rule modification message 1154. As a result, rules 1206A may be extended in the field or post development, and as new rules are defined during system/solution testing or troubleshooting at customer sites. Collector 1204A may be implemented in hardware, software, firmware, or any combination thereof.

Although described as a database, log database 1202A may be implemented using one or more of a variety of data structures, including various types of databases, log files (i.e., flat files with a series of logged records), tables, linked lists, maps, etc. Logging information in log database 1202A may be referenced by entries of a distributed hash table, which allows multiple VNC nodes 102 to identify a location of and obtain logging information for a particular server, for instance.

Logging information transported by log messages, including log message 1208, may have a structured format having known field values to enable the application of rules 1206A to structured data. For example, log messages may be encoded using XML and may conform to XMPP.

A message may include, e.g., information in the follow general format:

<msg-id, string1, field1, string2, field2, . . . >

The message identifier "msg-id" is a unique message identifier that allows users to identify and select the message in log database 1202A. The string fields, "string1, "string2, and so forth can be any character string or bitstring, where particular strings can identify a particular object, error, exception, etc. The fields "field1," "field2," and so forth can contain information relating to properties of the immediately preceding string. Accordingly, a rule of rules 1206A:

if (string=_____, field1=_____) then (action)

In the above example of action may define one or actions to be performed by rules engine 1204A (or other component of VNC node 102A). For instance, if a particular error occurs (as indicated by string and field1 values) and produces results in a particular location, rules engine 1200A may perform an action to determine more information about the error by directing application 1212 to generate additional logging information regarding the error. The string and field values can be used in any manner to indicate any form of error, and the actions can be any action that can be undertaken by a computer. The directive to application 1212 from rules engine 1200A may be to trace the contents of a particular buffer used by an application (i.e. store the contents in the analytics database), retrieve tables or other information, set up an active probe, etc.

Further examples of rules include rules such as:
1. if (Method_1 message-type is X) then (get Method_2 messages using parameters from Method_1 message)
2. if (Method_1 message-type is Y) then (get Method_2 messages using parameters from Method_1 message)
3. if (Method_2 message-type is Z) then (set Method_3 trigger)

In the immediately preceding examples, "Method 1" refers to baseline logging, "Method 2" refers to application tracing, and "Method 3" refers to active probing (e.g., triggering diagnostic subroutines in an application. In other words, examples Rules 1 and 2 trigger application tracing if either of two different message-types ("X" and "Y", which may be indicated by particular string/field combinations, for instance) occurs, and Rule 3 triggers a particular probe if another message-type ("Z") occurs. In the illustrated example, one of rules 1206A matches logging information received in log message 1208, and rules engine 1200A performs the corresponding action for the rule to send logging modification message 1210 to application 1212 to modify the extent of logging information generated. In some instances, a rule may cause logging information received in "Method 2" messages to trigger a "Method 3" action, and vice-versa. As noted above, the techniques may include other types of rules other types of "methods" that direct the generation of logging information in other ways.

Other types of actions that may be defined by rules 1206A is the implementation and population of secondary tables containing certain information. For example, rules 1206A when applied by rules engine 1200A can direct applications to generate and store specific additional information required by certain troubleshooting applications to the secondary tables, which may store information in any format.

Figure 14:
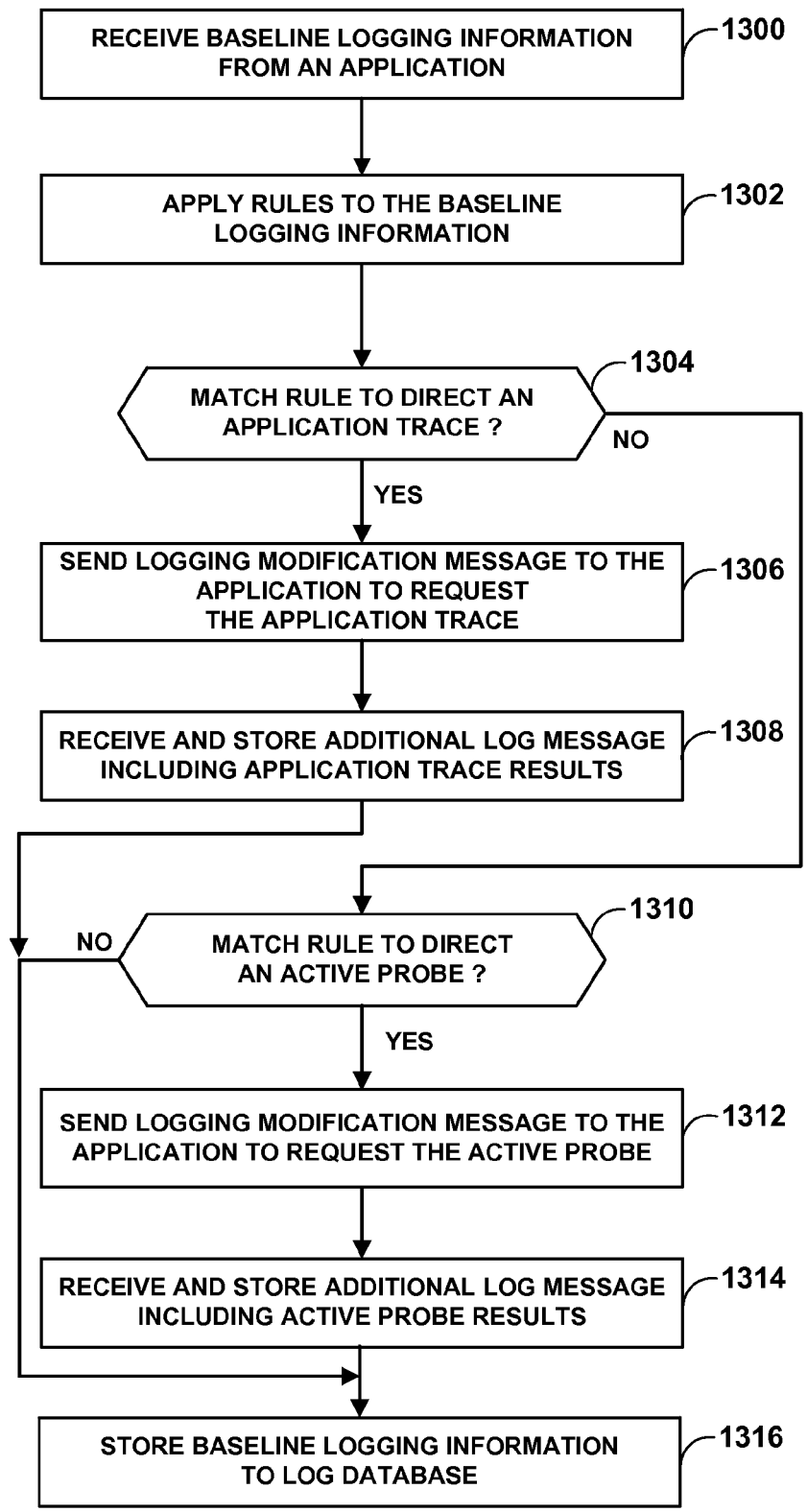
FIG. 14 is a flowchart illustrating an example mode of operation of a virtual network controller to dynamically modify logging information generated by a data center element or other generator according to techniques described herein.

FIG. 14 is a flowchart illustrating an example mode of operation of a virtual network controller to dynamically modify logging information generated by a data center element or other generator according to techniques described herein. The example is described for illustrative purposes with respect to components of VNC node 102A of FIG. 4. Initially, collector 1204A receives baseline logging information in a log message 1208 from application 1212 in accordance with a baseline extent for application 1212 (1300). Rules engine 1200A applies rules 1206A or a strict subset thereof to the baseline logging information to attempt to match respective rule conditions to properties of the baseline logging information (1302). If one of rules 1206A applied by rules engine 1200A matches and specifies an application tracing action (YES branch of 1304), rules engine 1200A sends logging modification message 1210 to include a directive to application 1212 to perform an application trace (1306). Subsequently, collector 1204A receives a responsive log message that includes the application trace results for analysis by, e.g. analytics VM 104A (1308). Collector 1204A stores the logging information to log database 1202A.

If one of rules 1206A applied by rules engine 1200A matches and specifies an active probe action (YES branch of 1310), rules engine 1200A sends logging modification message 1210 to include a directive to application 1212 to perform an active probe (1312). Subsequently, collector 1204A receives a responsive log message that includes the active probe results for analysis by, e.g. analytics VM 104A (1314). Collector 1204A stores the logging information to log database 1202A. If none of the rules 1206A applied by rules engine 1200A to log message 1208 match (NO branch of 1310), collector 1204A only stores the logging information to log database 1202A. In some cases logging information may match multiple rules 1206A and cause rules engine 1200A to execute multiple corresponding sets of actions of different types (e.g., both application tracing and active probing).

Figure 15:
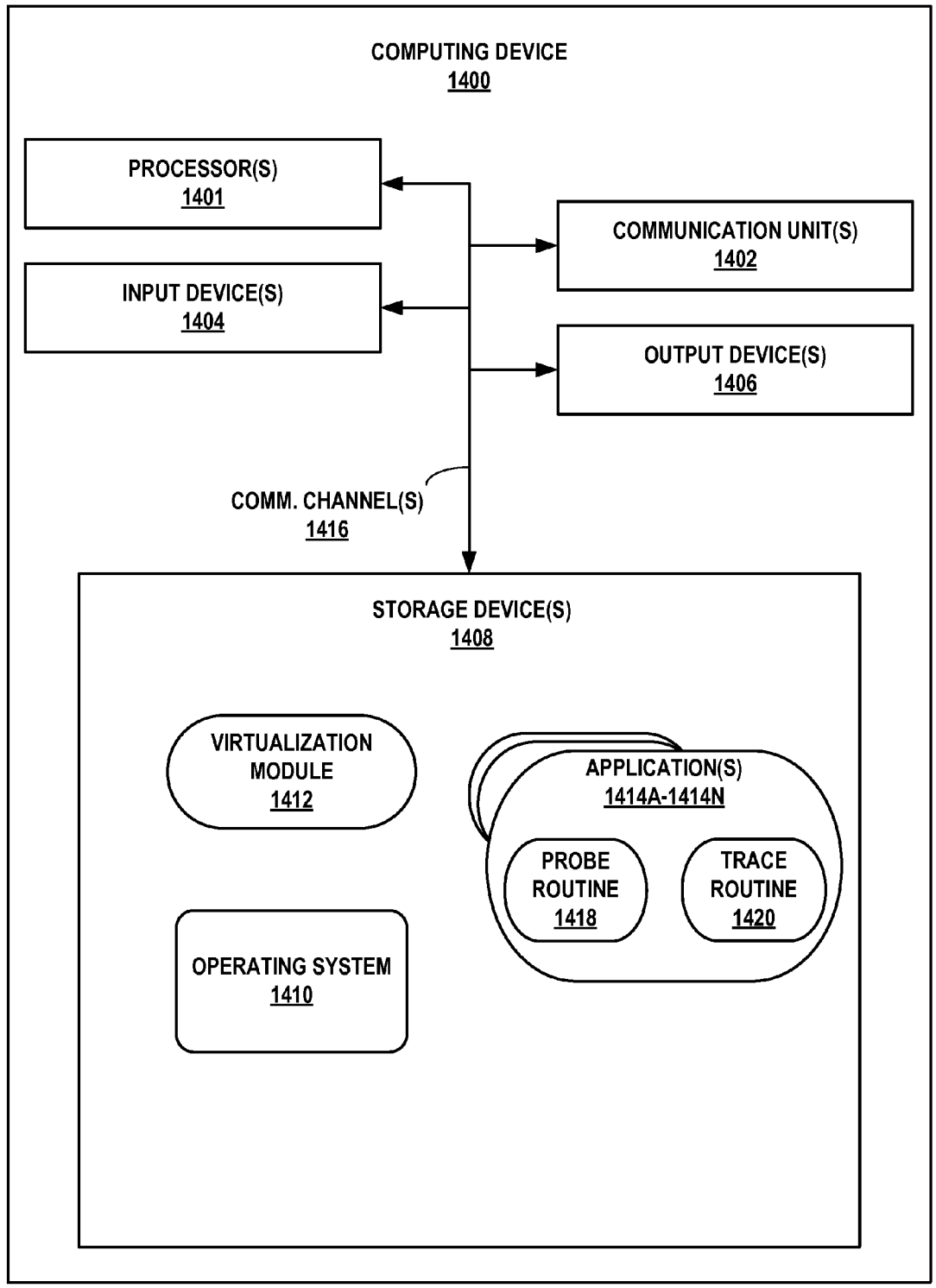
FIG. 15 is a block diagram illustrating an example computing device configured to dynamically modify an extent of logging in response to directives from a collector, according to techniques described in this disclosure.

FIG. 15 is a block diagram illustrating an example computing device configured to dynamically modify an extent of logging in response to directives from a collector, according to techniques described in this disclosure. Computing device 1400 may represent, e.g., any of servers 12, TORs 16, or chassis switches 18 of FIG. 1. FIG. 15 illustrates only one particular example of computing device 1400, and many other examples of computing device 1400 may be used in other instances. For example, a computing device that implements TORs 16 and chassis switches 18 may include a high-speed distributed forwarding plane.

As shown in the specific example of FIG. 15, computing device 1400 includes one or more processors 1401, one or more communication units 1402, one or more input devices 1404, one or more output devices 1406, and one or more storage devices 1408. Computing device 1400 further includes operating system 1410, virtualization module 1412, and one or more applications 1414A-1414N (collectively "applications 1414"). Virtualization module 1412 may represent hypervisor 31 of server 12A, for instance, and applications 1414 may represent different VMs 36. Each of components 1401, 1402, 1404, 1406, and 1408 may be interconnected (physically, communicatively, and/or operatively) for inter-component communications. As one example in FIG. 15, components 1401, 1402, 1404, 1406, and 1408 may be coupled by one or more communication channels 1416. In some examples, communication channels 1416 may include a system bus, network connection, inter-process communication data structure, or any other channel for communicating data. Virtualization module 1412 and applications 1414, as well as operating system 1410 may also communicate information with one another as well as with other components in computing device 1400. Virtualization module 1412 includes software switch 1420 to switch packets on one or more virtual networks. Virtualization module 1412 also includes flow trace module 1418 to determine physical network paths of network flows switched by computing device 1400 by generating flow trace packets and incrementally setting respective TTL values to cause downstream switching device to return time exceeded messages to computing device. Flow trace module 1418 may represent an example instance of FTM 48 of FIG. 1.

Processors 1401, in one example, are configured to implement functionality and/or process instructions for execution within computing device 1400. For example, processors 1401 may be capable of processing instructions stored in storage devices 1408. Examples of processors 1401 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1408 may be configured to store information within computing device 1400 during operation. Storage devices 1408, in some examples, are described as a computer-readable storage medium. In some examples, storage devices 1408 are a temporary memory, meaning that a primary purpose of storage devices 1408 is not long-term storage. Storage devices 1408, in some examples, are described as a volatile memory, meaning that storage devices 1408 do not maintain stored contents when the computer is turned off Examples of volatile memories include random access memories (RAM), dynamic random access memories (DRAM), static random access memories (SRAM), and other forms of volatile memories known in the art. In some examples, storage devices 1408 are used to store program instructions for execution by processors 1401. Storage devices 1408, in one example, are used by software or applications running on computing device 1400 (e.g., operating system 1410, virtualization module 1412 and the like) to temporarily store information during program execution.

Storage devices 1408, in some examples, also include one or more computer-readable storage media. Storage devices 1408 may be configured to store larger amounts of information than volatile memory. Storage devices 1408 may further be configured for long-term storage of information. In some examples, storage devices 1408 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 1400, in some examples, also includes one or more communication units 1402. Computing device 1400, in one example, utilizes communication units 1402 to communicate with external devices. Communication units 1402 may communicate, in some examples, by sending data packets over one or more networks, such as one or more wireless networks, via inbound and outbound links. Communication units 1402 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components. In some examples, computing device 1400 utilizes communication units 1402 to exchange tunneled packets with other computing devices in a virtualized network domain of a data center.

Computing device 1400, in one example, also includes one or more input devices 14014. Input devices 1404, in some examples, are configured to receive input from a user through tactile, audio, or video feedback. Examples of input devices 1404 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1406 may also be included in computing device 1400. Output devices 1406, in some examples, are configured to provide output to a user using tactile, audio, or video stimuli. Output devices 1406, in one example, include a presence-sensitive display, a sound card, a video graphics adapter card, or any other type of device for converting a signal into an appropriate form understandable to humans or machines. Additional examples of output devices 1406 include a speaker, a cathode ray tube (CRT) monitor, a liquid crystal display (LCD), or any other type of device that can generate intelligible output to a user.

Computing device 1400 may include operating system 1412. Operating system 1412, in some examples, controls the operation of components of computing device 1400. For example, operating system 1412, in one example, facilitates the communication of modules applications 1414 with processors 1401, communication units 1402, input devices 1404, output devices 1406, and storage devices 1410. Applications 1414 may each include program instructions and/or data that are executable by computing device 1400.

As one example, application 1414A may include instructions that cause computing device 1400 to perform one or more of the operations and actions described in the present disclosure. Application 1414A includes probe routine 1418 and trace routine 1420. Responsive to directives from a collector, probe routine 1418 increases an extent to which application 1414A generates logging information. Responsive to directives from a collector, trace routine 1420 reads application trace information from memory to generate additional logging information. Application 1414A sends generated logging information to the collector.

Figure 16:
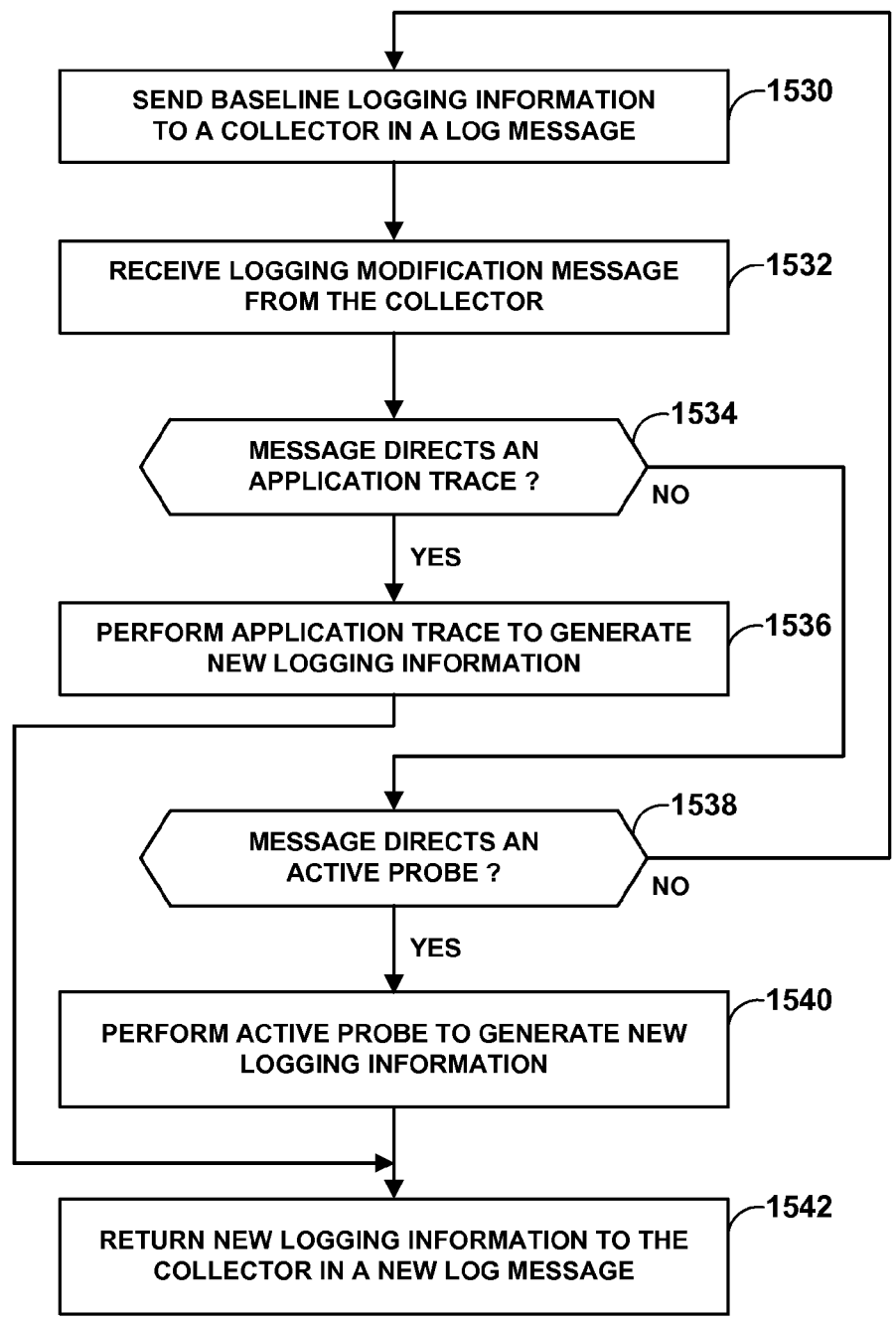
FIG. 16 is a flowchart illustrating an example mode of operation by an application to dynamically modify an extent of logging in response to directives from a collector, according to techniques described in this disclosure.

FIG. 16 is a flowchart illustrating an example mode of operation by an application to dynamically modify an extent of logging in response to directives from a collector, according to techniques described in this disclosure. The example mode of operation is described for illustrative purposes with respect to computing device 1400 of FIG. 15.

Initially, application 1414A of computing device 1400 is configured to send baseline logging information to a collector, such as VNC 22 of FIG. 1, in a log message (1530). Application 1414A receives a logging modification message from the collector directing application 1414A to modify the extent of logging information generation (1532). If the logging modification message includes a directive to perform an application trace (YES branch of 1534), trace routine 1420 executes to perform the application trace and generate new logging information in accordance with zero or more parameters specified in the logging modification message (1536). For example, the logging modification message may specify performing the application trace with respect to a particular data structure stored by application 1414A.

If the logging modification message includes a directive to perform an active probe (YES branch of 1538), probe routine 1418 executes to perform the probe to generate new logging information (1540). Performing the probe may include setting a flag or modifying a variable to increase an extent to which application 1414A generates logging information. Application 1414A sends the newly-generated logging information in a new log message to the collector for analysis (1542).

Various examples are described in the following clauses. The examples set forth in any of the following clauses may be incorporated and implemented in combination with any of the other examples described throughout this disclosure in accordance with the techniques described herein Clause 1. A method comprising receiving, by a collector, a log message that includes logging information from a generator; applying, by the collector, one or more rules that each specify a condition and a corresponding action to the logging information to identify a matching rule; and upon identifying a matching rule, executing the action of the matching rule to generate and send a logging modification message to increase an extent to which the generator generates logging information.

Clause 2. The method of clause 1, further comprising receiving, by the collector, an additional log message that includes additional logging information generated by the generator in accordance with the increased extent.

Clause 3. The method of any of clauses 1-2, wherein the action of the matching rule specifies an active probe and the logging modification message includes a directive to the generator to perform an active probe of an application.

Clause 4. The method of any of clauses 1-3, wherein the action of the matching rule specifies an application trace and the logging modification message includes a directive to the generator to perform an application trace of an application.

Clause 5. The method of any of clauses 1-4, further comprising receiving, by the collector, a rule modification message that includes a new rule; adding the new rule to the one or more rules; and applying the new rule to the logging information.

Clause 6. A network device comprising one or more processors; a collector configured for execution by the processors to receive a log message that includes logging information from a generator; and a rules engine to apply one or more rules that each specify a condition and a corresponding action to the logging information to identify a matching rule, wherein the rules engine, upon identifying a matching rule, executes the action of the matching rule to generate and send a logging modification message to increase an extent to which the generator generates logging information.

Clause 7. The network device of clause 6, wherein the collector receives an additional log message that includes additional logging information generated by the generator in accordance with the increased extent.

Clause 8. The network device of any of clauses 6-7, wherein the action of the matching rule specifies an active probe and the logging modification message includes a directive to the generator to perform an active probe of an application.

Clause 9. The network device of any of clauses 6-8, wherein the action of the matching rule specifies an application trace and the logging modification message includes a directive to the generator to perform an application trace of an application.

Clause 10. The network device of any of clauses 6-9, further comprising a control plane process to receive a rule modification message that includes a new rule and add the new rule to the one or more rules, wherein the rules engine applies the new rule to the logging information.

Clause 11. The network device of any of clauses 6-10, wherein the collector comprises a virtual network controller that controls operation of one or more virtual networks.

Clause 12. The network device of clause 11, further comprising a distributed analytics database that includes a log database, wherein the collector stores the logging information to the log database.

Clause 13. The network device of clause 12, further comprising an analytics virtual machine to analyze the distributed analytics database to diagnose conditions of one the virtual networks.

Clause 14. A method comprising sending, by a computing device and to a collector, baseline logging information for an application in a log message; receiving, by the computing device and from the collector, a logging modification message; responsive to the logging modification message, increasing an extent to which the application generates logging information; and sending, by the computing device and to the collector, an additional log message that includes additional logging information generated by the application in accordance with the increased extent.

Clause 15. The method of clause 14, wherein the logging modification message includes a directive to perform an active probe of an application, the method further comprising executing the active probe by the application.

Clause 16. The method of any of clauses 14-15, wherein the logging modification message includes a directive to perform an application trace of an application, the method further comprising executing the application trace by the application.

Clause 17. A network device comprising one or more processors; an application configured for execution by the processors; an output device to send, to a collector, baseline logging information for the application in a log message; an input device to receive, from the collector, a logging modification message, wherein the application, responsive to the logging modification message, increases an extent to which the application generates logging information, and wherein the output device sends, to the collector, an additional log message that includes additional logging information generated by the application in accordance with the increased extent.

Clause 18. The network device of clause 17, wherein the logging modification message includes a directive to perform an active probe of an application, the network device further comprising an active probe module of the application to execute the active probe.

Clause 19. The network device of any of clauses 17-18, wherein the logging modification message includes a directive to perform an application trace of an application, the network device further comprising an application trace module to execute the application trace.

Re-Routing Network Traffic after Link Failure

In general, this portion of the disclosure describes techniques for communicating between network devices. For example, in accordance with the techniques of this disclosure, servers may be configured to use a virtual network overlay even when communicating in the underlying physical network. Servers may be configured with a reserved virtual network representing the physical network. In one example, the virtual network is referred to as virtual-network-0 or VN0. VN0 may be one of a plurality of virtual networks configured on a server. However, in contrast to the other virtual networks for which the server encapsulates packets and forwards the encapsulated packets according to overlay network rules, when forwarding packets to the VN0 virtual network, the server does not encapsulate packets and forwards them according to the rules of the physical network based on the forwarding information specified by a network forwarding table for VN0.

Initial communication between a virtual network agent of the server and a virtual network controller occurs over the default route specified by VN0, prior to a communication session being established between virtual network agent of the server and the virtual network controller or during establishment of the communication session. Once the communication session is established between the virtual network agent of the server and the virtual network controller, the virtual network controller sends commands to the virtual network agent of the server to install specific routes in the route table (forwarding table) for VN0, where the installed specific routes will use the overlay network and encapsulation.

In this manner, the virtual network controller and the server may communicate using virtual subnet VN0 in accordance with default network forwarding table $NFT_0$ during discovery and initialization of the overlay network, and during conditions where a failed link, node, or other network disruption has temporarily halted communication via the overlay network. In accordance with the techniques of this disclosure, when link failure is detected, a the virtual network agent local to the failed link can change the encapsulation of network packet to redirect traffic within the overlay network, and the virtual network agent notifies the virtual network controller of the routing change. In turn, the virtual network controller updates its routing information any may issues messages to other virtual network agents of other servers to update local routing information stored by the virtual network agents within network forwarding tables.

In one example, a method includes prior to establishing a communication session between a virtual network controller and a virtual network agent executing on a server device, sending network packets by the server device to the virtual network controller using a default route for a physical network, and after establishing the communication session between the virtual network controller device and the virtual network agent, receiving from the virtual network controller a command to install a new route at the server device, wherein the new route specifies encapsulation information to use for encapsulating network packets for sending the network packets to the virtual network controller over an overlay network. The method also includes, responsive to detecting a failed link in the physical network, sending packets to the virtual network controller on an alternate route in the overlay network.

In one example, a network device includes a virtual network agent, and a network interface to send network packets to the virtual network controller using a default route for a physical network prior to establishing a communication session between a virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network.

In another example, a computer-readable storage medium includes instructions that cause a programmable processor to prior to establishing a communication session between a virtual network controller and a virtual network agent executing on a server device, send network packets by the server device to the virtual network controller using a default route for a physical network, after establishing the communication session between the virtual network controller device and the virtual network agent, receive from the virtual network controller a command to install a new route at the server device, wherein the new route specifies encapsulation information to use for encapsulating network packets for sending the network packets to the virtual network controller over the overlay network, and, responsive to detecting a failed link in the physical network, send packets to the virtual network controller on an alternate route in the overlay network.

In a further example, a system includes a virtual network controller; and a server network device that includes a virtual network agent and a network interface to send network packets to the virtual network controller using a default route for a physical network prior to establishing a communication session between a virtual network controller and the virtual network agent. After establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network. Responsive to detecting a failed link in the physical network, the virtual network agent sends packets to the virtual network controller on an alternate route in the overlay network. The virtual network controller includes one or more processors, and a plurality of virtual machines executed by the processors, wherein the plurality of virtual machines receive a plurality of messages from a plurality of network devices including the server network device, wherein each of the plurality of messages specifies a respective default route.

Figure 17A:
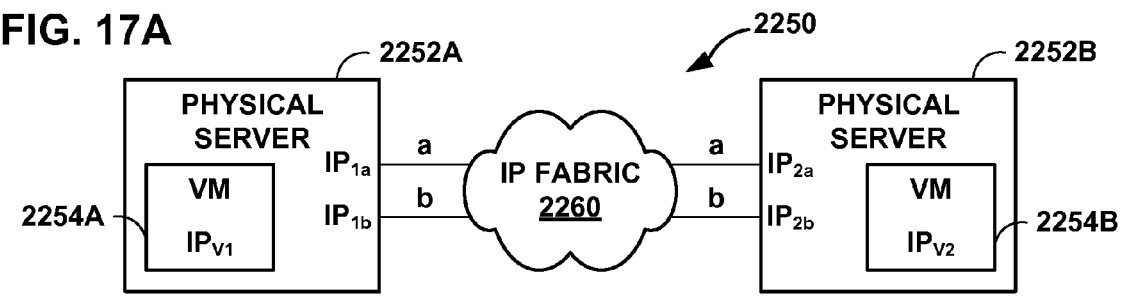
FIG. 17A is a block diagram illustrating a system that includes network devices that operate in accordance with the techniques of this disclosure.

FIG. 17A is a block diagram illustrating a system 2250 that includes network devices that operate in accordance with the techniques of this disclosure. FIG. 17A includes links that represent the connections of physical servers to IP Fabric 2260. Servers 2252A-2252B ("servers 2252") may be similar to any of servers 12 of FIGS. 1-2A and 2B, servers 51 of FIG. 3, and server 170 of FIG. 5. In the depiction of FIG. 17A, each server 2252 is connected to the IP Fabric 2260 via a first link a and a second link b Server 2252A has a first link a having an IP address IP1*a* and a second link b having an IP address IP1*b*. Server 2252B has a first link a that is assigned the IP address IP2*a* and a second link b that is assigned the IP address IP2*b*. The VMs 2254A-2254B ("VMs 2254") of server 2252A generates packets bearing a source IP address of IPV1, and server 2252B generates packets bearing source IP addresses of IPV2.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet." Encapsulation and/or de-capsulation of virtual network packets within physical network packets may be performed within virtual switches, e.g., within the hypervisor or the host operating system running on each of servers 2252. ECMP paths between first and second network devices such as servers 2252 may be viewed by the virtual network as one physical connection, as their packet (inner packet) is encapsulated by the outer IP encapsulation.

Figure 17B:
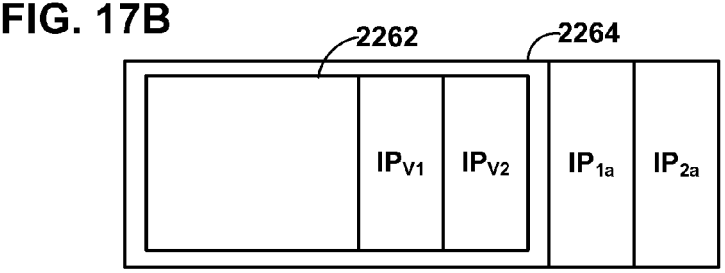
FIG. 17B is a block diagram illustrating example tunneled encapsulation in accordance with one example embodiment.

FIG. 17B is a block diagram illustrating example tunneled encapsulation in accordance with one example embodiment. For example, FIG. 17B illustrates tunneled encapsulation to direct data packets having a source IP address IP1*a* and a destination IP address IP2*a*. As mentioned above, tunneling encapsulation is used to re-route packets in a virtual network. During encapsulation, packet 2262 (shown as having a source address of IPV1 and a destination address of IPV2) is encapsulated with an outer envelope 2264, which indicates the address to which the packet 2262 should be routed. In the particular example, packets 2262 is routed from the interface of server 2252A having IP address IP1*a* over link a, through IP fabric 2260, and then over link a to server 2252B to destination IP address IP2*a*.

Figure 17C:
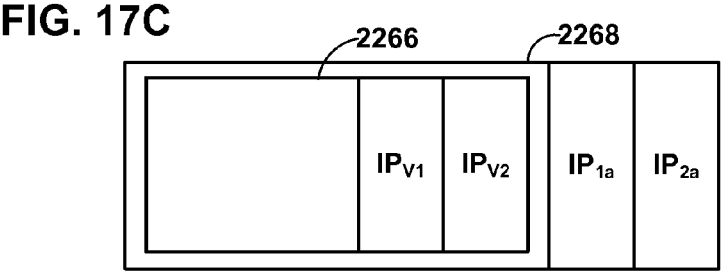
FIG. 17C is a block diagram illustrating a packet that is directed to a default virtual subnet when there is no link failure.

FIG. 17C is a block diagram illustrating a packet that is directed to a default virtual subnet VN0 when there is no link failure. When there is no link failure, virtual switch 30A encapsulates packet 2266 such that the address on the encapsulation envelope 2268 matches the original intended address of the packet 2266 since no adjustment is needed. This ends up being the same as the example of FIG. 17B.

Figure 17D:
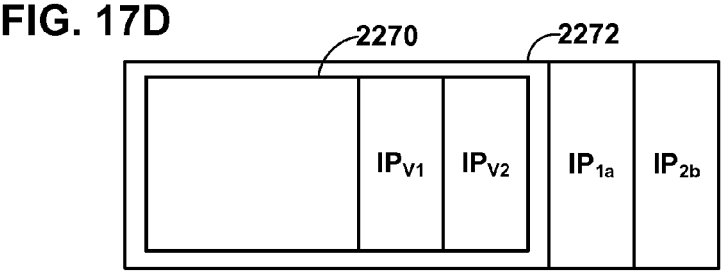
FIG. 17D is a block diagram illustrating example tunneled encapsulation in accordance with one example embodiment.

FIG. 17D is a block diagram illustrating example tunneled encapsulation in accordance with one example embodiment. For example, FIG. 17D illustrates an example case where hypervisor 31 of the sending server 2252A has detected a failed link on a path to the destination. For example, the link a between IP fabric 2260 and server 2252B may have failed, and a hypervisor of server 2252A is notified of the failure. When a failed link occurs in the network, hypervisor 31 is notified of the failure, and updates its forwarding information to indicate to use an envelope 2272 that has an alternate destination address to encapsulate the packet 2270. In the particular example, the packet 2270 that before the failure would be routed from source address IP1*a* to destination address IP2*a* will now be routed from source address IP1*a* to destination address IP2*b*, because link a between IP fabric 2260 and server 2252B is failed.

Figure 17E:
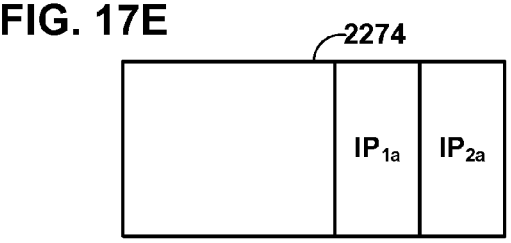
FIG. 17E is a block diagram illustrating example unencapsulated packet in accordance with one example embodiment.

FIG. 17E is a block diagram illustrating example unencapsulated packet 2274 in accordance with one example embodiment. FIG. 17E illustrates an example case where a NFT 32 indicates that a switch should route a data packet to a default route, which takes the packet to TOR switch 16A. When the default route is used, overlay network is not used, and virtual switch 30A forwards the packet to TOR switch 16A without encapsulation.

Figure 18A:
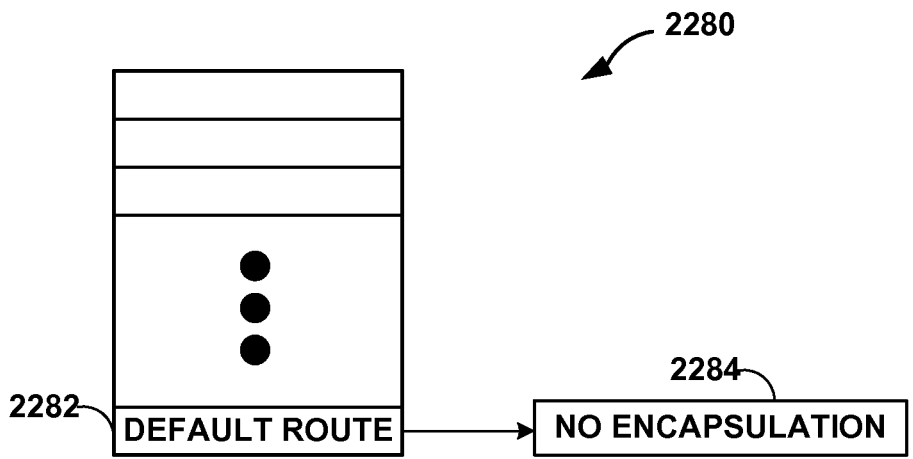
FIGS. 18A-18B are block diagrams illustrating example network forwarding tables in accordance with one example embodiment.
Figure 18B:
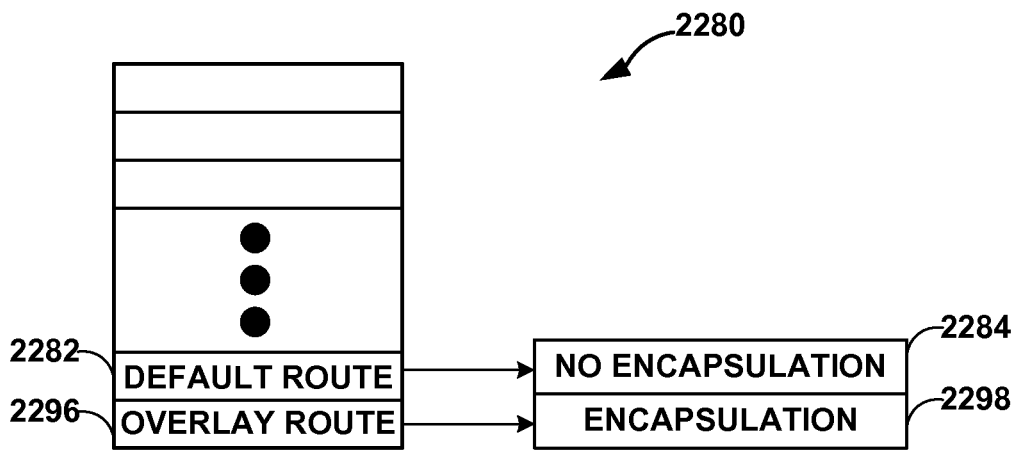

FIGS. 18A-18B are block diagrams illustrating example network forwarding tables in accordance with one example embodiment. Network forwarding table 2280 is a L3 routing table, and may correspond to one of NFTs 32 of virtual switch 30A (FIG. 1), such as NFT 32 associated with VN0. In the example of FIG. 18A, example network forwarding table 2280 is depicted at a time before the VN agent 35A associated with the virtual switch 30A has established a communication session with virtual network controller 22. In the example of FIG. 18A, NFT 2280 includes a default route for forwarding packets on the physical network to the virtual network controller. NFT 2280 includes route entries that indicate encapsulation addresses comprising actual network addresses assigned to physical network devices in the physical network.

In the example of FIG. 18B, network forwarding table 2280 is depicted at a time after the VN agent 35A has established a communication session with virtual network controller 22 and received an overlay route 2296 that has been installed in network forwarding table 2280.

Each route entry of network forwarding table 2280 points to a respective next hop. The next hop specifies information on how to forward the packet and whether the packet is encapsulated in an outer IP packet (or other encapsulation). The special virtual network VN0 is reserved for the physical network (e.g., of IP fabric 14). The default route 2282 in the network forwarding table 2280 points to a next hop 2284 indicating to forward a packet without encapsulation, to the physical network as per routing rules of the physical network. Once the connectivity with virtual network controller 22 is established, virtual network controller 22 starts putting new specific routes in this routing table, which uses an encapsulated overlay technique. The encapsulation works at the network layer and does not break any L4 connections, which is transparent to applications. This keeps the IP fabric simple and cost-effective. For example, virtual network controller 22 adds an entry 2296 specifying an overlay route and pointing to an encapsulation action 2298. In some examples, a control plane VM of virtual network controller 22 communicates with virtual network switches, e.g., illustrated VM switches 2254 executed by servers 2252, using a communication protocol such as XMPP operating over network 2260, such as described above with respect to FIG. 5.

The server device may maintain multiple routing tables or NFTs, such as one for each subnet supported by the server. For example, in addition to NFT 2280, a server may also include a second L3 routing table other than the default table for VN0, i.e., a table associated with a virtual network for which network addresses of network components in the virtual network are different than network addresses of network devices in the physical network.

Responsive to detecting a failed link in the physical network prior to establishing the communication session between the virtual network controller device and the virtual network agent, the virtual switch sends packets to the virtual network controller on an alternate route in the physical network, and responsive to detecting a failed link in the physical network after to establishing the communication session between the virtual network controller device and the virtual network agent, the virtual switch sends packets to the virtual network controller on an alternate route in the overlay network.

Figure 19:
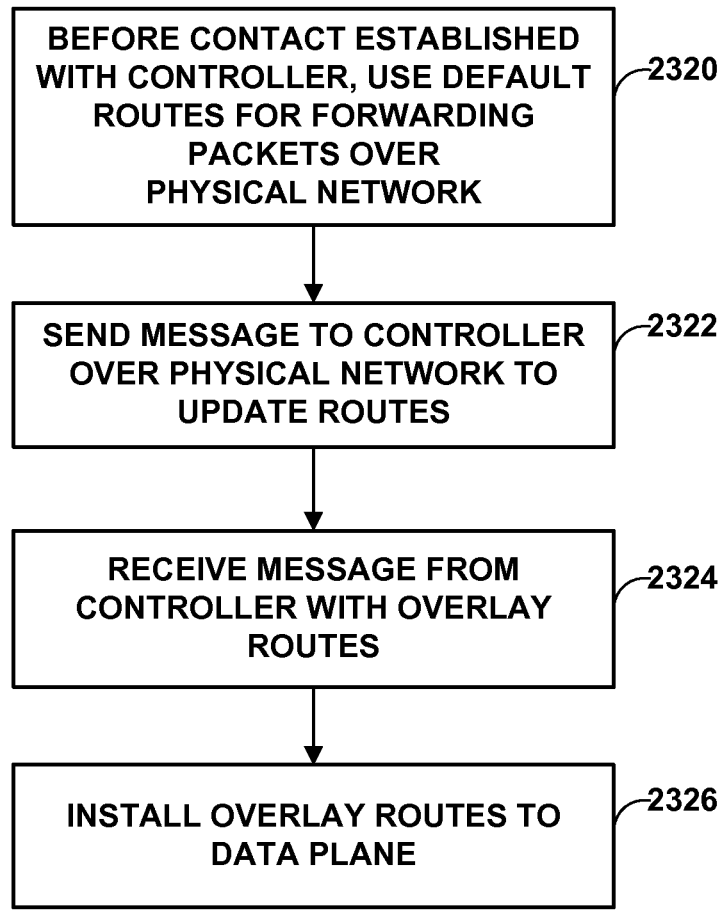
FIGS. 19-20 are flowcharts illustrating example operations of network devices in accordance with one or more embodiments of this disclosure.

FIG. 19 is a flowchart depicting an initiation process in accordance with the techniques of this disclosure. As described with reference to FIGS. 18A-18B, the network forwarding table 2280 includes a default route 2282 which, if taken, sends a packet to a subnet VN0 without encapsulation. Before a VN agent has established a communication session with the virtual network controller, the virtual switch associated with the VN agent uses the default route 2282 for forwarding packets over the physical network (2320). That is, while initial contact with the virtual network controller 22 has not yet been established, virtual switch 30A directs received packets unencapsulated to the subnet VN0. For example, without encapsulation, the packet is sent to virtual network controller 22 via TOR switch 16A. The subnet VN0 does not use an overlay network, and VN agent 35A sends a message to virtual network controller 22 over the physical network (2322) to trigger virtual network controller 22 to update network forwarding table 2280 with specific routes. Once initial contact has been established with virtual network controller 22, such as using XMPP, virtual network controller 22 may send an overlay route to VN agent 35A to install in network forwarding table 2280 having a next hop to encapsulate packets and direct the encapsulated packets to intended destinations using overlay network rules. VN agent 35A receives the message from virtual network controller 22 with the overlay route(s) (2324) and installs the overlay route(s) to the data plane at network forwarding table 2280 (2326).

Figure 20:
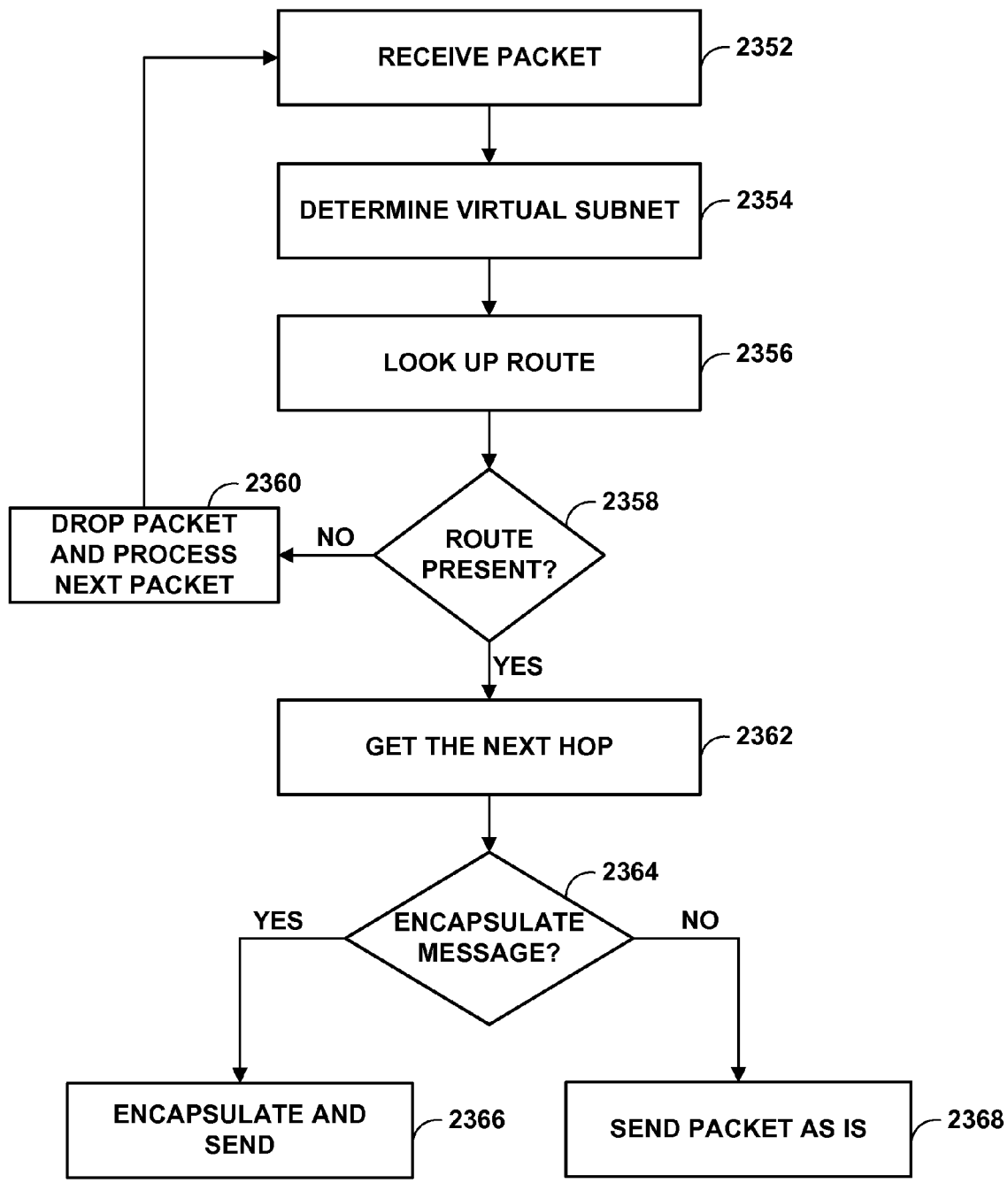

FIG. 20 is a flowchart depicting example operation of network devices in accordance with the techniques of this disclosure. FIG. 20 will be described for purposes of example with respect to FIG. 2A. Upon receiving a packet (2352), server 12A determines the virtual subnet containing the correct destination, e.g., based on the destination address specified in a header of the packet (2354). Then, hypervisor 31 (for example, virtual switch 30A of hypervisor 31) looks up the route in $NFT_0$ using any technique such as a longest-prefix matching (LPM) algorithm (2356). If virtual switch 30A determines that the route is not present (NO branch of 2358), the packet is dropped and the process begins again with the next packet (2360). If, on the other hand, virtual switch 30A determines that the route is present in $NFT_0$ (YES branch of 2358), then virtual switch 30A determines the next hop for the route from $NFT_0$ (2362). If the next hop says to encapsulate the packet (YES branch of 2364), then the envelope information is added as shown in FIG. 17B and virtual switch 30A sends the packet to the destination address. If virtual switch 30A determines that the next hop does not prescribe encapsulation (NO branch of 2364), then virtual switch 30A sends the packet without encapsulation, as in FIG. 17E.

Figure 21:
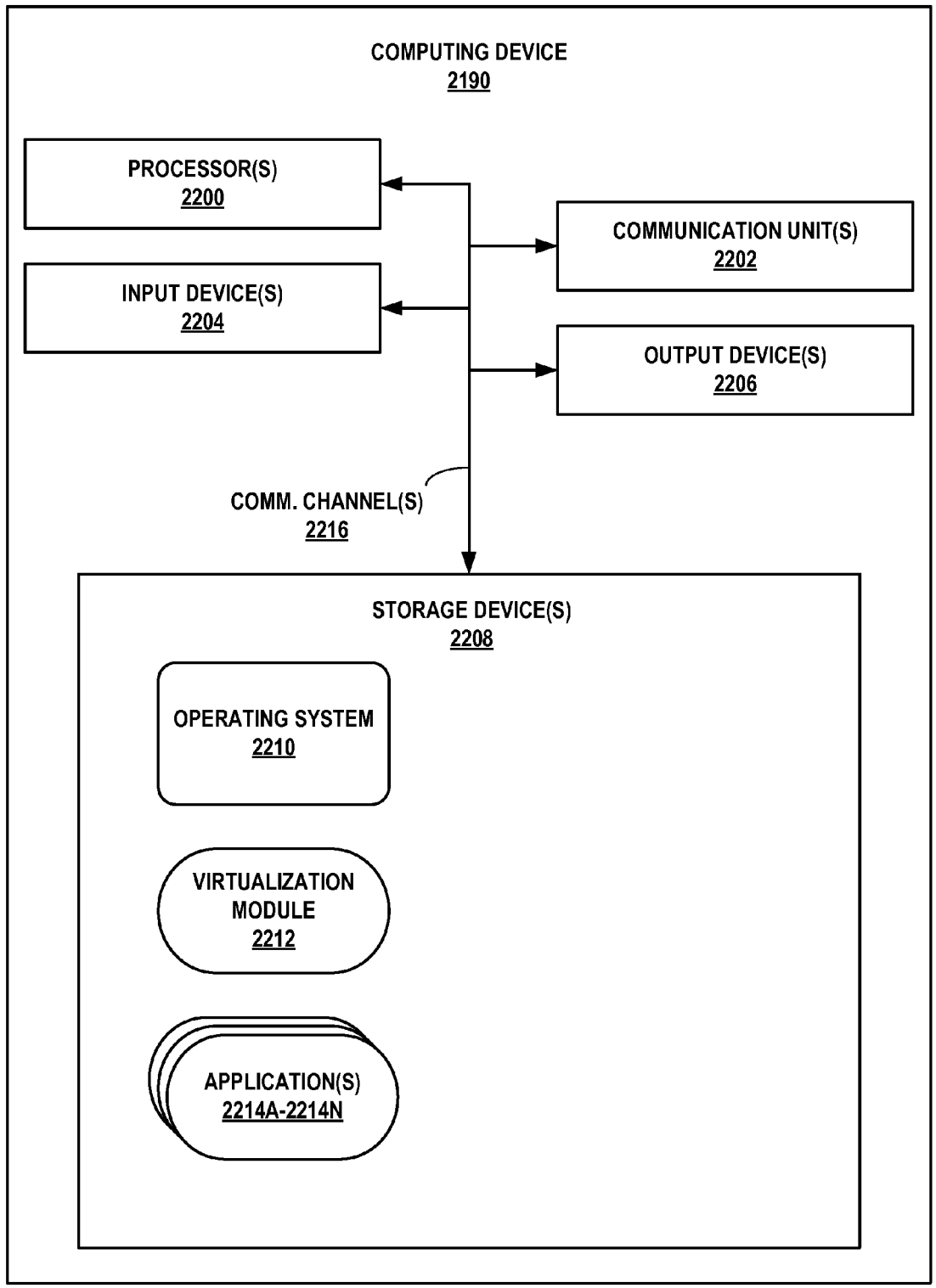
FIG. 21 is a block diagram illustrating an example device in accordance with one or more aspects of the present disclosure.

FIG. 21 is a block diagram illustrating an example device 2190 in accordance with one or more aspects of the present disclosure. FIG. 19 illustrates only one particular example of computing device 2190, and many other examples of computing device 2190 may be used in other instances. Computing device 2190 may represent, for example, any of servers 12, TOR switches 16, chassis switches 18, virtual network controller 22, web console 42, or IFMAP server 26 of FIGS. 1-2, for example.

As shown in the specific example of FIG. 19, computing device 2190 includes one or more processors 2200, one or more communication units 2202, one or more input devices 2204, one or more output devices 2206, and one or more storage devices 2208. Computing device 2190, in the specific example of FIG. 19, further includes operating system 2210, virtualization module 2212, and one or more applications 2214A-2214N (collectively "applications 2214"). Each of components 2200, 2202, 2204, 2206, and 2208 may be interconnected (physically, communicatively, and/or operatively) for inter-component communications. As one example in FIG. 19, components 2200, 2202, 2204, 2206, and 2208 may be coupled by one or more communication channels 2216. In some examples, communication channels 2216 may include a system bus, network connection, inter-process communication data structure, or any other channel for communicating data. Virtualization module 2212 and applications 2214, as well as operating system 2210 may also communicate information with one another as well as with other components in computing device 2190. Virtualization may allow the functions of these components to be distributed over multiple machines or multiple virtual machines, while a hypervisor gives the appearance of single component.

Processors 2200, in one example, are configured to implement functionality and/or process instructions for execution within computing device 2190. For example, processors 2200 may be capable of processing instructions stored in storage devices 2208. Examples of processors 2200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 2208 may be configured to store information within computing device 2190 during operation. Storage devices 2208, in some examples, are described as a computer-readable storage medium. In some examples, storage devices 2208 are a temporary memory, meaning that a primary purpose of storage devices 2208 is not long-term storage. Storage devices 2208, in some examples, are described as a volatile memory, meaning that storage devices 2208 do not maintain stored contents when the computer is turned off. Examples of volatile memories include random access memories (RAM), dynamic random access memories (DRAM), static random access memories (SRAM), and other forms of volatile memories known in the art. In some examples, storage devices 2208 are used to store program instructions for execution by processors 2200. Storage devices 2208, in one example, are used by software or applications running on computing device 2190 (e.g., operating system 2210, virtualization module 2212 and the like) to temporarily store information during program execution.

Storage devices 2208, in some examples, also include one or more computer-readable storage media. Storage devices 2208 may be configured to store larger amounts of information than volatile memory. Storage devices 2208 may further be configured for long-term storage of information. In some examples, storage devices 2208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 2190, in some examples, also includes one or more communication units 2202. Computing device 2190, in one example, utilizes communication units 2202 to communicate with external devices. Communication units 2202 may communicate, in some examples, by sending data packets over one or more networks, such as one or more wireless networks, via inbound and outbound links. Communication units 2202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components. In some examples, computing device 2190 utilizes communication units 2202 to communicate with other network devices, such as to send or receive messages as described herein.

Computing device 2190, in one example, also includes one or more input devices 2204. Input devices 2204, in some examples, are configured to receive input from a user through tactile, audio, or video feedback. Examples of input devices 2204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 2206 may also be included in computing device 2190. Output devices 2206, in some examples, are configured to provide output to a user using tactile, audio, or video stimuli. Output devices 2206, in one example, include a presence-sensitive display, a sound card, a video graphics adapter card, or any other type of device for converting a signal into an appropriate form understandable to humans or machines. Additional examples of output devices 2206 include a speaker, a cathode ray tube (CRT) monitor, a liquid crystal display (LCD), or any other type of device that can generate intelligible output to a user.

Computing device 2190 may include operating system 2212. Operating system 2212, in some examples, controls the operation of components of computing device 2190. For example, operating system 2212, in one example, facilitates the communication of modules applications 2214 with processors 2200, communication units 2202, input devices 2204, output devices 2206, and storage devices 2210. Applications 2214 may each include program instructions and/or data that are executable by computing device 2190. As one example, application 2214A may include instructions that cause computing device 2190 to perform one or more of the operations and actions described in the present disclosure.

In accordance with techniques of the present disclosure, computing device 2190 may operate in accordance with the example processes described in FIGS. 19-20.

Various examples are described in the following clauses. The examples set forth in any of the following clauses may be incorporated and implemented in combination with any of the other examples described throughout this disclosure in accordance with the techniques described herein Clause 1. A method comprising: prior to establishing a communication session between a virtual network controller and a virtual network agent executing on a server device, sending network packets by the server device to the virtual network controller using a default route for a physical network; after establishing the communication session between the virtual network controller device and the virtual network agent, receiving from the virtual network controller a command to install a new route at the server device, wherein the new route specifies encapsulation information to use for encapsulating network packets for sending the network packets to the virtual network controller over an overlay network; and responsive to detecting a failed link in the physical network, sending packets to the virtual network controller on an alternate route in the overlay network.

Clause 2. The method of clause 1, further comprising: by the server device, maintaining a layer three (L3) routing table having a default route for forwarding packets on the physical network to the virtual network controller.

Clause 3. The method of clause 2, wherein the L3 routing table includes route entries that indicate encapsulation addresses comprising actual network addresses assigned to physical network devices in the physical network.

Clause 4. The method of any of clauses 1-3, further comprising: by the server device, maintaining a second L3 routing table, wherein the second L3 routing table is associated with a virtual network for which network addresses of network components in the virtual network are different than network addresses of network devices in the physical network.

Clause 5. The method of any of clauses 1-4, further comprising: responsive to receiving the command from the virtual network controller, installing the new route to the L3 routing table; and sending network packets as encapsulated network packets using the overlay network to the virtual network controller based at least on the new route.

Clause 6. The method of any of clauses 1-5, wherein the default route is expressed as an Internet Protocol (IP) address assigned to a physical network device.

Clause 7. The method of any of clauses 1-6, wherein the virtual network controller device and the virtual network agent are part of a software defined network (SDN).

Clause 8. The method of any of clauses 1-7, wherein sending packets on an alternate route comprises: responsive to detecting a failed link in the physical network prior to establishing the communication session between the virtual network controller device and the virtual network agent, sending packets to the virtual network controller on an alternate route in the physical network; and responsive to detecting a failed link in the physical network after to establishing the communication session between the virtual network controller device and the virtual network agent, sending packets to the virtual network controller on an alternate route in the overlay network.

Clause 9. A computer-readable storage medium comprising instructions for causing a programmable processor to: prior to establishing a communication session between a virtual network controller and a virtual network agent executing on a server device, send network packets by the server device to the virtual network controller using a default route for a physical network; after establishing the communication session between the virtual network controller device and the virtual network agent, receive from the virtual network controller a command to install a new route at the server device, wherein the new route specifies encapsulation information to use for encapsulating network packets for sending the network packets to the virtual network controller over the overlay network; and responsive to detecting a failed link in the physical network, send packets to the virtual network controller on an alternate route in the overlay network.

Clause 10. A network device comprising: a virtual network agent; and a network interface to send network packets to a virtual network controller using a default route for a physical network prior to establishing a communication session between the virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network.

Clause 11. The network device of clause 10, further comprising: a layer three (L3) routing table having a default route for forwarding packets on a physical network to a virtual network controller device.

Clause 12. The network device of any of clauses 10 or 11, wherein in response to receiving the command from the virtual network controller device, the virtual network agent installs the new route to the L3 routing table, and sends network packets as encapsulated network packets using the overlay network to the virtual network controller based on the new route.

Clause 13. The network device of any of clauses 10-12, wherein the default route is expressed as an Internet Protocol (IP) address assigned to a physical network device.

Clause 14. The network device of any of clauses 10-13, wherein the virtual network controller device and the virtual network agent are part of a software defined network (SDN).

Clause 15. A system comprising: a virtual network controller; and a server network device comprising: a virtual network agent; and a network interface to send network packets to the virtual network controller using a default route for a physical network prior to establishing a communication session between a virtual network controller and the virtual network agent, wherein, after establishing the communication session between the virtual network controller device and the virtual network agent, the virtual network agent receives from the virtual network controller a command to install a new route at the network device, wherein the new route specifies encapsulation information to use for encapsulating network packets for sending the network packets to the virtual network controller over an overlay network, and wherein, responsive to detecting a failed link in the physical network, the virtual network agent sends packets to the virtual network controller on an alternate route in the overlay network, wherein the virtual network controller comprises: one or more processors; a plurality of virtual machines executed by the processors, wherein the plurality of virtual machines receive a plurality of messages from a plurality of network devices including the server network device, wherein each of the plurality of messages specifies a respective default route.

Multicast Service in Virtual Networks

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers, e.g., a Clos network. More sophisticated data centers provide infrastructure spread throughout the world with subscriber support equipment located in various physical hosting facilities.

In general, multicast service involves delivering data through a network to a group of subscribers, e.g., customers of a data center or servers within a data center, substantially simultaneously in a single transmission from a source device, e.g., a server. As an example, when two or more subscribers are interested in receiving the same multicast data, each of the subscribers may request to join a multicast group associated with the multicast data. The multicast data from the source is replicated, as needed, by physical network switches and routers within the network in order to reach the subscribers of the multicast group. The network switches and routers used to replicate and forward the multicast data for the multicast group may create a multicast distribution tree through the network for delivery of the multicast data.

In a case where a large number of servers are interconnected by a switch fabric, each pair of servers may have a large number of equal cost paths between them. In this scenario, layer two (L2) connectivity between the physical servers may become unmanageable, and the physical servers may only be connected to each other using layer three (L3) connectivity. The physical servers connected via the switch fabric may communicate using unicast service, but multicast service between the physical servers may be more difficult to manage due to the large number of redundant paths in the network. In some cases, a virtual overlay network may be built on top of the switch fabric to emulate an L2 network between virtual switches executed on the servers using a tunnel encapsulation protocol, e.g., IP-in-IP, NvGRE, or VXLAN. In order for the virtual overlay network to emulate L2 multicast service, however, the underlying switch fabric must also support multicast service.

In general, techniques are described to provide multicast service within a virtual network without requiring multicast support in the underlying network. More specifically, the techniques enable support of L2 multicast service in a virtual overlay network of a switch fabric using a logically centralized virtual network controller and endpoint replication. The virtual network controller is configured to create a multicast tree for endpoint devices, e.g., servers, of a multicast group in the virtual network. The virtual network controller then communicates the multicast tree to one or more of the endpoint devices of the multicast group to instruct the endpoint devices to replicate and forward multicast packets to other endpoint devices according to the multicast tree. The multicast tree may be a unidirectional multicast tree or a bidirectional multicast tree.

According to the techniques, the multicast tree is calculated at a centralized location of the virtual network controller instead of in a distributed fashion by network switches and routers that service the multicast group. In addition, the replication and forwarding of multicast packets is performed by virtual switches executed on the endpoint devices in the virtual network. No replication is performed within the underlying network. In this way, the techniques enable multicast service within a virtual network without requiring multicast support in the underlying network. In addition, the centralized virtual network controller may create the multicast tree to minimize a replication limit such that several endpoints of the virtual network may replicate and forward a small number of multicast packets, instead of the source endpoint having to incur the load of replicating and forwarding the packets to all the endpoints that belong to the multicast group. Further, the virtual network controller may configure a unique virtual network tunnel encapsulation for each link direction in the multicast tree for the multicast group in order to efficiently use bandwidth in the network.

In one example, a method comprises creating, with a virtual network controller of a virtual network, a multicast tree for endpoint devices of a multicast group in the virtual network, storing the multicast tree in a memory within the virtual network controller, and communicating, with the virtual network controller, the multicast tree to one or more of the endpoint devices of the multicast group in order to instruct virtual switches executed on the endpoint devices to replicate and forward multicast packets according to the multicast tree.

In another example, a method comprises receiving, with an endpoint device of a multicast group in a virtual network, multicast packets for the multicast group to be forwarded on the virtual network according to a multicast tree for the multicast group, the multicast tree created by a virtual network controller of the virtual network, replicating, with a virtual switch executed on the endpoint device, the multicast packets for the multicast group according to the multicast tree, and forwarding, with the virtual switch executed on the endpoint device, the replicated multicast packets using tunnel encapsulations to one or more other endpoint devices of the multicast group according to the multicast tree.

In a further example, a virtual network controller of a virtual network comprises a memory, and one or more processor configured to create a multicast tree for endpoint devices of a multicast group in the virtual network, store the multicast tree in the memory of the virtual network controller, and communicate the multicast tree to one or more of the endpoint devices of the multicast group in order to instruct virtual switches executed on the endpoint devices to replicate and forward multicast packets according to the multicast tree.

In an additional example, an endpoint device in a virtual network comprises one or more processors configured to receive multicast packets for a multicast group to which the endpoint device belongs to be forwarded on the virtual network according to a multicast tree for the multicast group, wherein the multicast tree is created by a virtual network controller of the virtual network, and a virtual switch executed on the processors configured to replicate the multicast packets for the multicast group according to the multicast tree, and forward the replicated multicast packets using tunnel encapsulations to one or more other endpoint devices of the multicast group according to the multicast tree.

In another example, a system of a virtual network, the system comprises a virtual network controller configured to create a multicast tree for endpoint devices of a multicast group in the virtual network, store the multicast tree in a memory within the virtual network controller, and communicate the multicast tree to one or more of the endpoint devices of the multicast group, and one of the endpoint devices of the multicast group configured to receive multicast packets for the multicast group to be forwarded on the virtual network, and execute a virtual switch to replicate multicast packets for the multicast group according to the multicast tree, and forward the replicated multicast packets using tunnel encapsulations to one or more of the other endpoint devices of the multicast group according to the multicast tree.

In a further example, a computer-readable storage medium comprises instructions that when executed cause one or more processor to create, with a virtual network controller of a virtual network, a multicast tree for endpoint devices of a multicast group in the virtual network, store the multicast tree in a memory within the virtual network controller, and communicate, with the virtual network controller, the multicast tree to one or more of the endpoint devices of the multicast group in order to instruct virtual switches executed on the endpoint devices to replicate and forward multicast packets according to the multicast tree.

In another example, a computer-readable storage medium comprises instructions that when executed cause one or more processor to receive, with an endpoint device of a multicast group in a virtual network, multicast packets for the multicast group to be forwarded on the virtual network according to a multicast tree for the multicast group, the multicast tree created by a virtual network controller of the virtual network, replicate, with a virtual switch executed on the endpoint device, the multicast packets for the multicast group according to the multicast tree, and forward, with the virtual switch executed on the endpoint device, the replicated multicast packets using tunnel encapsulations to one or more other endpoint devices of the multicast group according to the multicast tree.

Figure 22A:
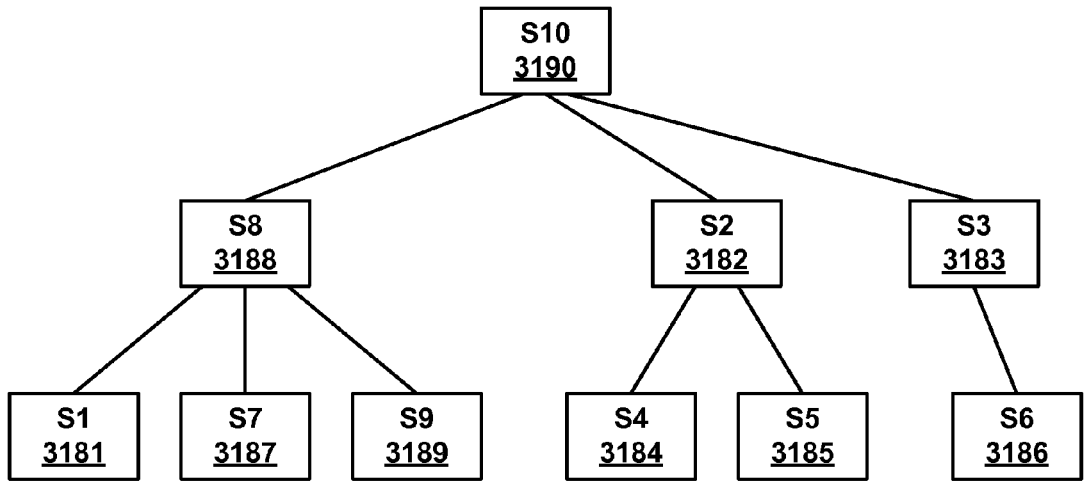
FIGS. 22A-22B are conceptual diagrams illustrating examples of unbalanced and balanced multicast trees created by a virtual network controller to provide distributed multicast service in a virtual network.

FIG. 22A illustrates an unbalanced multicast tree that may be created by a virtual network controller, e.g., virtual network controller 22 from FIGS. 2A and 2B. Virtual network controller 22 may create the illustrated multicast tree in order to minimize a replication limit for each of the servers. The replication limit (N) for a given multicast tree may be selected based on a device population in the multicast group (M) such that $2 \leq N \leq (M-1)$. In some cases, the replication limit (N) for the multicast tree may be selected such that $2 \leq N << M$. In yet other cases, the replication limit (N) for the multicast tree may be determined to satisfy $[LOG_N(M)]=D$, wherein D is equal to a depth of the tree, and [X] connotes a floor function equal to the largest integer not greater than X. The replication limit specifies a maximum number of copies of a multicast packet that each server in the multicast tree must make. The tree depth specifies a number of stages or levels of servers in the topology of the multicast tree.

In some cases, virtual network controller 22 may create the multicast tree to balance the replication limit (N) and the tree depth (D). Minimizing the replication limit for all the servers in the multicast tree avoids having an overly horizontal tree topology in which one or two servers in the tree incur the load of replicating and forwarding packets to a majority of the servers. The replication limit may be balanced against the tree depth to avoid having an overly vertical tree topology in which each server is making only a few, e.g., one, copies of the multicast packet for further transmission. In this way, computing resources and network resources may be conserved, and the computing load may be distributed across all the servers of the multicast group.

In the example illustrated in FIG. 22A, the number of servers in the multicast group of the multicast tree is equal to 10 (M=10) and the multicast tree has two stages or levels of servers (D=2). Virtual network controller 22, therefore, may create the multicast tree illustrated in FIG. 22A based on a replication limit equal to 3 (N=3), which satisfies $2 \leq N \leq 9$, $2 \leq N << 10$, and $[LOG_N(10)]=2$. As shown in FIG. 22A, assuming the root server S10 is the source server, S10 3190 makes three packet copies and transmits the copies to S8 3188, S2 3182 and S3 3183. S8 3188 then makes three packet copies and transmits the copies to S1 3181, S7 3187 and S9 3189. S2 3182 makes two packet copies and transmits the copies to S4 3184 and S5 3185. S3 3183 makes only one packet copy and transmits the copy to S6 3186. As can be seen, although each of the servers in the multicast tree is within the replication limit of 3, the replication load is unevenly distributed with S10 3190 and S8 3188 each generating 3 copies (N=3), S2 3182 generating 2 copies (2<N), and the S3 3183 generating 1 copy (1<N).

When total number of nodes is not $(N^{(D+1)}-1)/(N-1)$ then some of the penultimate leaf nodes may not have N leafs. This is true of the multicast tree illustrated in FIG. 6A, in which the total number of nodes is not equal to 13 so not all of S8 3188, S2 3182 and S3 3183 can have 3 leaf nodes. In such cases, virtual network controller 22 may generate a balanced multicast tree, as illustrated in FIG. 22B, such that each penultimate leaf node will have a number of leaf nodes that differ with each other by $+/-(N/2)$.

Figure 22B:
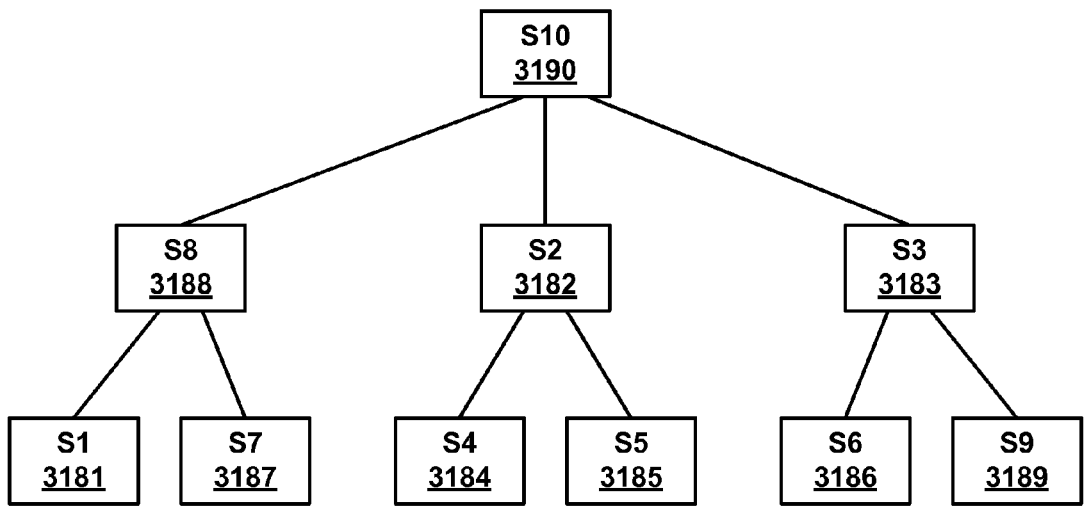

FIG. 22B illustrates a balanced multicast tree that may be created by virtual network controller 22. As shown in FIG. 22B, again assuming the root server S10 is the source server, S10 3190 makes three packet copies and transmits the copies to S8 3188, S2 3182 and S3 3183. S8 3188 then makes two packet copies and transmits the copies to S1 3181 and S7 3187. S2 3182 makes two packet copies and transmits the copies to S4 3184 and S5 3185. S3 3183 also makes two packet copies and transmits the copies to S6 3186 and S9 3189. As can be seen, each of the servers in the multicast tree is within the replication limit of 3, and the replication load is evenly distributed with S10 190 generating 3 copies (N=3) and each of S8 3188, S2 3182 and S3 3183 generating 2 copies (2<N).

Figure 23A:
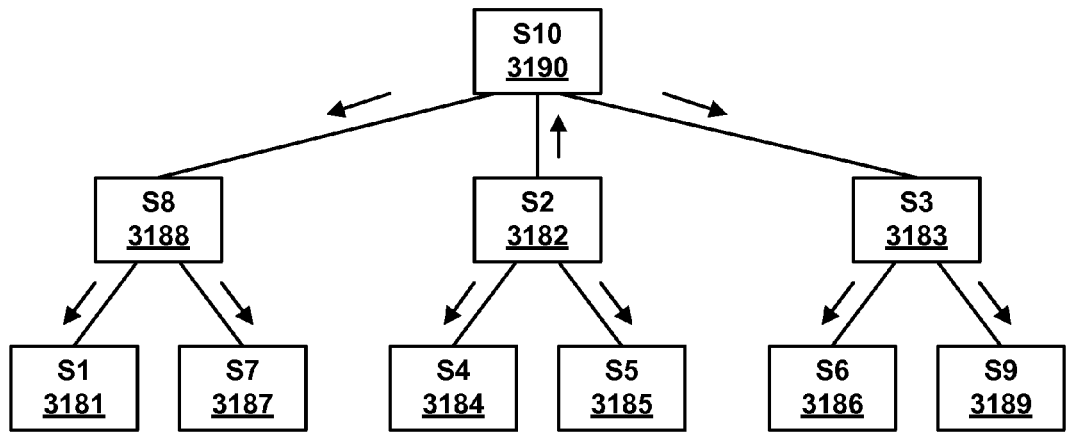
FIGS. 23A-23C are conceptual diagrams illustrating examples of multicast trees created by a virtual network controller for network endpoints in a multicast group in which any of the endpoints operates as a source node for the tree.
Figure 23B:
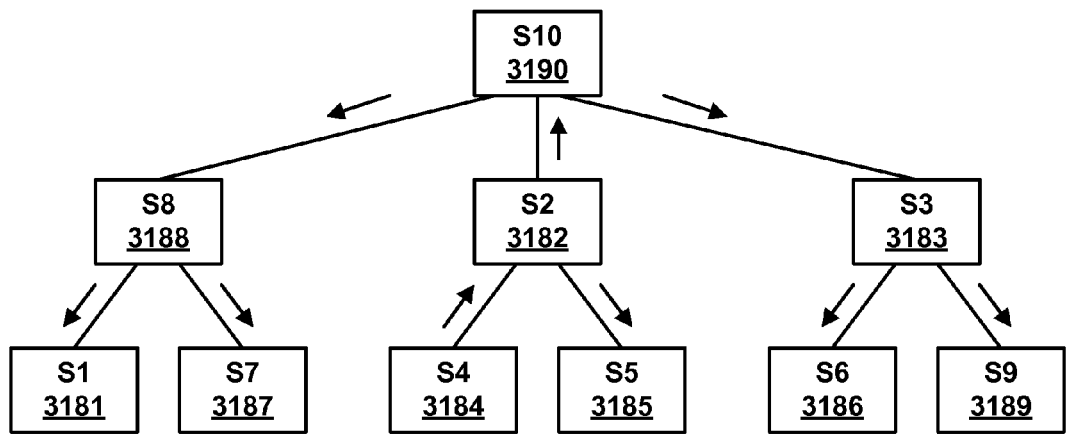
Figure 23C:
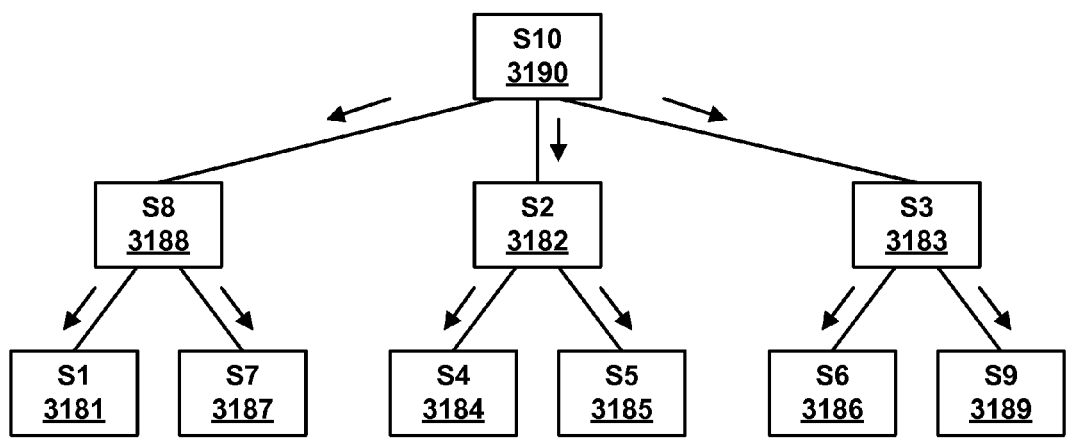

FIGS. 23A-23C are conceptual diagrams illustrating examples of multicast trees created by a virtual network controller for all servers in a multicast group in which any server operates as a source node for the tree. In the illustrated examples, the multicast trees include the same ten servers and the same balanced topology as the multicast tree illustrated in FIG. 22B. In accordance with the techniques of this disclosure, the multicast trees are created in a virtual overlay network capable of emulating L2 multicast. The multicast trees, therefore, may be bidirectional multicast trees in which any of the servers may operate as the source server of the multicast packets for the multicast group. When any of the intermediate servers receives a packet from another server in the tree, the intermediate server performs replication and transmits a packet copy on each link of the multicast tree, except the link on which the packet was received.

FIG. 23A illustrates a bidirectional multicast tree in which server S2 3182 operates as the source server. As shown in FIG. 23A, S2 3182 makes three packet copies and transmits the copies to S4 3184, S5 3185, and S10 3190 (i.e., the root server). S10 3190 then makes two packet copies and transmits the copies to S8 3188 and S3 3183. S10 3190 does not send a packet copy on the link from which it received the packet from S2 3182. S8 3188 then makes two packet copies and transmits the copies to S1 3181 and S7 3187, but S8 3188 does not send a packet copy on the link from which it received the packet from S10 3190. S3 3183 also makes two packet copies and transmits the copies to S6 3186 and S9 3189, but does not send a packet copy on the link from which it received the packet from S10 3190.

FIG. 23B illustrates a bidirectional multicast tree in which server S4 3184 operates as the source server. As shown in FIG. 23B, S4 3184 makes one packet copy and transmits the copy to S2 3182. S2 3182 then makes two packet copies and transmits the copies to S5 3185 and S10 3190 (i.e., the root server). S2 3182 does not send a packet copy on the link from with it received the packet from S4 3184. S10 3190 then makes two packet copies and transmits the copies to S8 3188 and S3 3183. S10 3190 does not send a packet copy on the link from with it received the packet from S2 3182. S8 3188 then makes two packet copies and transmits the copies to S1 3181 and S7 3187, but S8 3188 does not send a packet copy on the link from which it received the packet from S10 3190. S3 3183 also makes two packet copies and transmits the copies to S6 3186 and S9 3189, but does not send a packet copy on the link from which it received the packet from S10 3190.

FIG. 23C illustrates a multicast tree in which server S10 3190 (i.e., the root server) operates as the source server. In this example, the illustrated multicast tree may be a unidirectional multicast tree or a bidirectional multicast tree. As shown in FIG. 23C, S10 3190 makes three packet copies and transmits the copies to S8 3188, S2 3182, and S3 3183. S8 3188 then makes two packet copies and transmits the copies to S1 3181 and S7 3187, but S8 3188 does not send a packet copy on the link from which it received the packet from S10 3190. S2 3182 makes two packet copies and transmits the copies to S4 3184 and S5 3185, but S2 3182 does not send a packet copy on the link from which it received the packet from S10 3190. S3 3183 also makes two packet copies and transmits the copies to S6 3186 and S9 3189, but does not send a packet copy on the link from which it received the packet from S10 3190.

Figure 24:
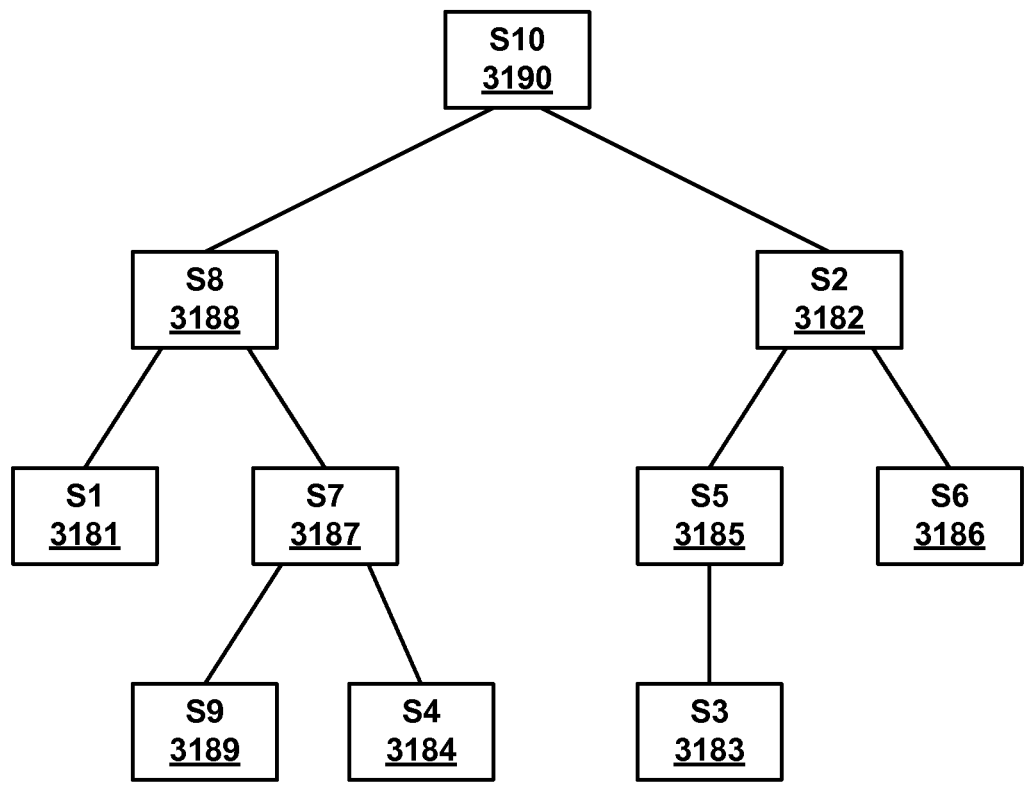
FIG. 24 is a conceptual diagram illustrating an example multicast tree created by a virtual network controller for all servers in a multicast group with a minimized replication limit.

FIG. 24 is a conceptual diagram illustrating an example multicast tree created by a virtual network controller for all servers in a multicast group with a minimized replication limit. In the illustrated example, the multicast tree includes the same ten servers as the multicast trees illustrated in FIGS. 22A-22B and FIGS. 23A-23C in a different topology. The multicast trees arrange the servers in stages or levels such that one or more of the servers generate copies of multicast packets to be transmitted to intermediate servers that, in turn, may make additional copies of the multicast packets to be transmitted to other servers in the multicast group.

The multicast tree illustrated in FIG. 24 may be created by a virtual network controller, e.g., virtual network controller 22 from FIGS. 2A and 2B. Virtual network controller 22 may create the illustrated multicast tree in order to further minimize a replication limit for each of the servers. In the example multicast trees in FIGS. 22A-22B and FIGS. 23A-23C, the replication limit (N) was set equal to 3 based on the number of servers in the multicast group of the multicast tree being equal to 10 (M=10) and the multicast trees having two stages or levels of servers (D=2). In the example multicast tree illustrated in FIG. 24, the number of servers in the multicast group of the multicast tree is again equal to 10 (M=10) except the tree topology has changed to include three stages or levels of servers (D=3). Virtual network controller 22, therefore, may create the multicast tree illustrated in FIG. 24 based on a replication limit equal to 2 (N=2), which satisfies $2 \leq N \leq 9$, $2 \leq N \ll 10$, and $[LOG_N(10)]=3$.

As shown in FIG. 24, assuming the root server S10 3190 is the source server, S10 3190 makes two packet copies and transmits the copies to S8 3188 and S2 3182. S8 3188 then makes two packet copies and transmits the copies to S1 3181 and S7 3187. S7 3187 also makes two packet copies and transmits the copies to S9 3189 and S4 3184. S2 3182 makes two packet copies and transmits the copies to S5 3185 and S6 3186. S5 3185 then makes one packet copy and transmits the copy to S3 3183. As can be seen, each of the servers in the multicast tree is within the replication limit of 2, and the replication load is evenly distributed with each of S10 3190, S8 3188, S7 3187, and S2 3182 generating 2 copies (N=2), and the S5 3185 generating 1 copy (1<N).

Figure 25A:
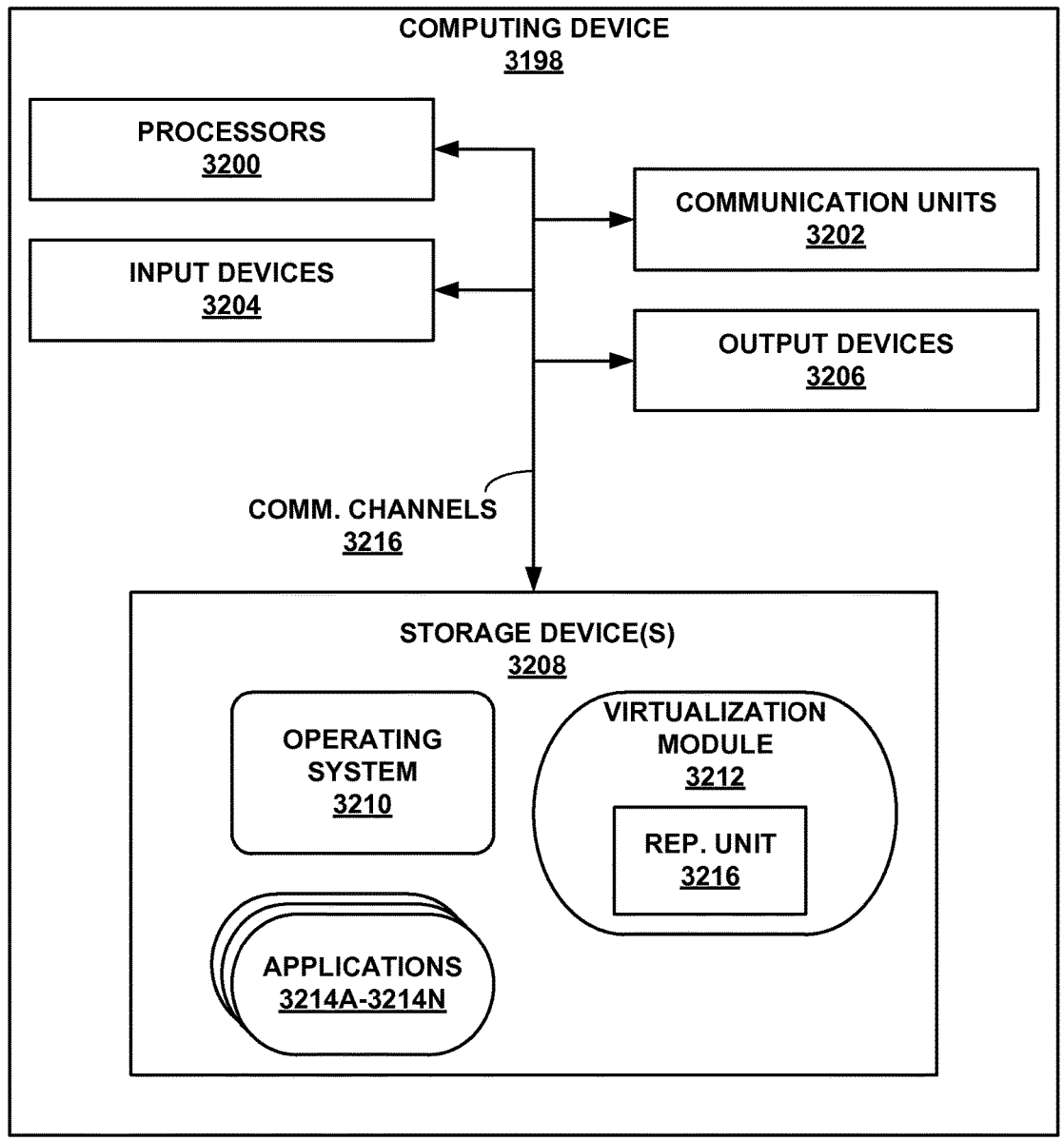
FIG. 25A is a block diagram illustrating an example computing device for replicating and forwarding packets according to a multicast tree created by a virtual network controller, in accordance with one or more aspects of the present disclosure.

FIG. 25A is a block diagram illustrating an example computing device 3198 for replicating and forwarding packets according to a multicast tree created by a virtual network controller, in accordance with one or more aspects of the present disclosure. FIG. 25A illustrates only one particular example of computing device 3198, and many other examples of computing device 3198 may be used in other instances.

As shown in the specific example of FIG. 25A, computing device 3198 includes one or more processors 3200, one or more communication units 3202, one or more input devices 3204, one or more output devices 3206, and one or more storage devices 3208. Computing device 3198, in the specific example of FIG. 25A, further includes operating system 3210, virtualization module 3212, and one or more applications 3214A-3214N (collectively "applications 3214"). Each of components 3200, 3202, 3204, 3206, and 3208 may be interconnected (physically, communicatively, and/or operatively) for inter-component communications. As one example in FIG. 25A, components 3200, 3202, 3204, 3206, and 3208 may be coupled by one or more communication channels 3216. In some examples, communication channels 3216 may include a system bus, network connection, inter-process communication data structure, or any other channel for communicating data. Virtualization module 3212 and applications 3214, as well as operating system 3210 may also communicate information with one another as well as with other components in computing device 3198.

Processors 3200, in one example, are configured to implement functionality and/or process instructions for execution within computing device 3198. For example, processors 3200 may be capable of processing instructions stored in storage devices 3208. Examples of processors 3200 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 3208 may be configured to store information within computing device 3198 during operation. Storage devices 3208, in some examples, are described as a computer-readable storage medium. In some examples, storage devices 3208 are a temporary memory, meaning that a primary purpose of storage devices 3208 is not long-term storage. Storage devices 3208, in some examples, are described as a volatile memory, meaning that storage devices 3208 do not maintain stored contents when the computer is turned off Examples of volatile memories include random access memories (RAM), dynamic random access memories (DRAM), static random access memories (SRAM), and other forms of volatile memories known in the art. In some examples, storage devices 3208 are used to store program instructions for execution by processors 3200. Storage devices 3208, in one example, are used by software or applications running on computing device 3198 (e.g., operating system 3210, virtualization module 3212 and the like) to temporarily store information during program execution.

Storage devices 3208, in some examples, also include one or more computer-readable storage media. Storage devices 3208 may be configured to store larger amounts of information than volatile memory. Storage devices 3208 may further be configured for long-term storage of information. In some examples, storage devices 3208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 3198, in some examples, also includes one or more communication units 3202. Computing device 3198, in one example, utilizes communication units 3202 to communicate with external devices. Communication units 3202 may communicate, in some examples, by sending data packets over one or more networks, such as one or more wireless networks, via inbound and outbound links. Communication units 3202 may include one or more network interface cards (IFCs), such as an Ethernet card, an optical transceiver, a radio frequency transceiver, or any other type of device that can send and receive information. Other examples of such network interfaces may include Bluetooth, 3G and WiFi radio components.

Computing device 3198, in one example, also includes one or more input devices 3204. Input devices 3204, in some examples, are configured to receive input from a user through tactile, audio, or video feedback. Examples of input devices 3204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 3206 may also be included in computing device 3198. Output devices 3206, in some examples, are configured to provide output to a user using tactile, audio, or video stimuli. Output devices 3206, in one example, include a presence-sensitive display, a sound card, a video graphics adapter card, or any other type of device for converting a signal into an appropriate form understandable to humans or machines. Additional examples of output devices 3206 include a speaker, a cathode ray tube (CRT) monitor, a liquid crystal display (LCD), or any other type of device that can generate intelligible output to a user.

Computing device 3198 may include operating system 3210. Operating system 3210, in some examples, controls the operation of components of computing device 3198. For example, operating system 3210, in one example, facilitates the communication of applications 3214 with processors 3200, communication units 3202, input devices 3204, output devices 3206, and storage devices 3208. Applications 3214 may each include program instructions and/or data that are executable by computing device 3198. As one example, application 3214A may include instructions that cause computing device 3198 to perform one or more of the operations and actions described in the present disclosure.

In accordance with techniques of the present disclosure, computing device 3198 may operate as an endpoint device of a virtual network, such as one of servers 12 in data center 10 from FIGS. 1, 2A and 2B. More specifically, computing device 3198 may use virtualization module 3212 to execute one or more virtual switches (not shown) that create and manage one or more virtual networks as virtual overlay networks of a data center switch fabric. Communication units 3202 of computer device 3198 may receive communications from a virtual network controller for the virtual networks.

According to the techniques, communication units 3202 may receive a multicast tree for a multicast group of a virtual network from the virtual network controller, and communicate the multicast tree to a replication unit ("rep. unit") 3216 executed on virtualization module 3212. Communication units 3202 may then receive multicast packets for the multicast group to be forwarded on the virtual network. The multicast tree may instruct replication unit 3216 to replicate and forward the multicast packets to other endpoint devices according to the multicast tree. The multicast tree is calculated for the virtual network by the virtual network controller in a centralized location instead of in a distributed fashion by components in an underlying physical network. In addition, the replication and forwarding of multicast packets is only performed by virtual switches executed on computing device 3198 and the other endpoint devices of the virtual network. No replication is performed within the underlying physical network. In this way, the techniques enable multicast service between computing device 3198 and the other endpoint devices within the virtual network without requiring multicast support in the underlying network.

Figure 25B:
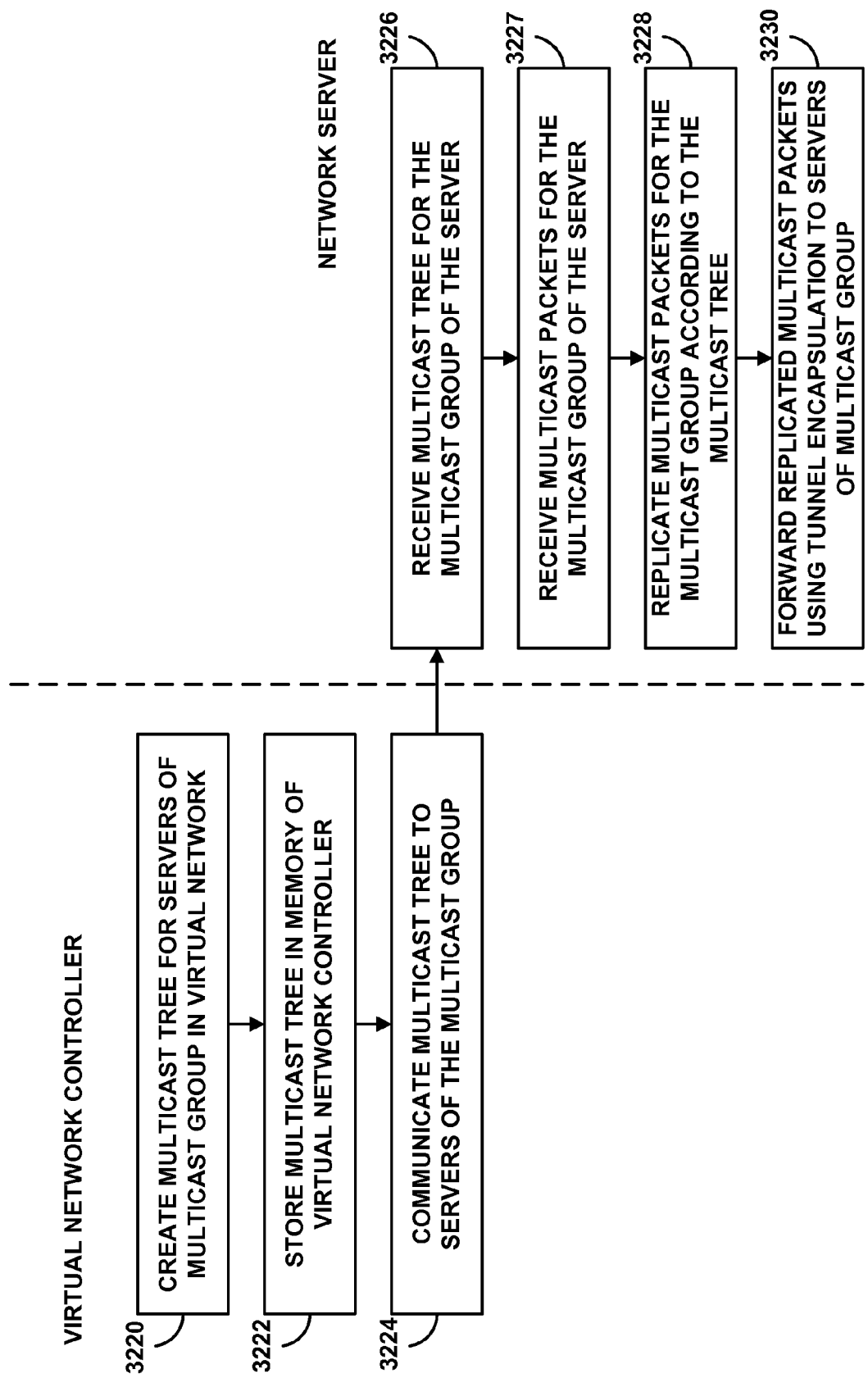
FIG. 25B is a flowchart illustrating an example operation of creating a multicast tree with a virtual network controller for network endpoints of a multicast group in a virtual network, and replicating and forwarding packets with one of the endpoints in accordance with the multicast tree to provide distributed multicast service in the virtual network.

FIG. 25B is a flowchart illustrating an example operation of creating a multicast tree with a virtual network controller for network endpoints of a multicast group in a virtual network, and replicating and forwarding packets with one of the endpoints in accordance with the multicast tree to provide distributed multicast service in the virtual network. The operation of FIG. 25B is described with respect to virtual network controller 22 and server 12A from FIG. 2A.

Virtual network controller 22 creates a multicast tree for servers 12 of a multicast group in a virtual network (3220). In this way, the multicast tree is created in a logically centralized location, i.e., virtual network controller 22, instead of in a distributed fashion by components in the underlying network that service the multicast group. Virtual network controller 22 may create the multicast tree to facilitate delivery of multicast packets for the multicast group between two or more endpoints or servers in the virtual network.

In some cases, the multicast tree may be a unidirectional multicast tree in which a root node of the multicast tree operates as the source of the multicast packets for the multicast group and the multicast packets are communicated in a single, downstream direction from the root node. In other cases, the multicast tree may be a bidirectional multicast tree in which any node of the multicast tree may operate as the source of the multicast packets for the multicast group and the multicast packets may be communicated in either an upstream or downstream direction from a root node of the multicast tree. According to the techniques, virtual network controller 22 may create bidirectional multicast trees because the virtual overlay network emulates L2 multicast, which supports bidirectional multicast.

Virtual network controller 22 may calculate the multicast tree based on topology information of the underlying physical network received, e.g., in accordance with a routing protocol executed by VNC 22. In addition, virtual network controller 22 may calculate the multicast tree in order to minimize a replication limit at each of the servers and balance the replication across the tree. In this way, virtual network controller 22 may create the multicast tree such that each of the source and intermediate servers performs a similar, small amount of replication, instead of the source server having to incur the load of replicating and forwarding the packets to all the servers that belong to the multicast group. Virtual network controller 22 stores the multicast tree to memory (3222). Virtual network controller 22 then communicates the multicast tree to one or more of the servers 12 of the multicast group (3224).

Server 12A, for example, receives the multicast tree for the multicast group to which server 12A belongs from virtual network controller 22 (3226). Server 12A also receives multicast packets for the multicast group to be forwarded on the virtual network according to the multicast tree (3227). Server 12A executes virtual switch 30A for the virtual network within hypervisor 31. Server 12A uses a replication unit of virtual switch 30A (e.g., replication unit 3216 of computing device 3198) to replicate the multicast packets for the multicast group according to the multicast tree (3228). For example, if server 12A is the source server or an intermediate server in the multicast tree, then the replication unit may create one or more copies of the packet as required by the multicast tree.

Server 12A then uses virtual switch 30A to forward the replicated multicast packets using tunnel encapsulation to the other servers of the multicast group in the virtual network according to the multicast tree (3230). Virtual switch 30A may encapsulate each of the copies of the packet in a unique tunnel encapsulation header. In this way, multiple equal cost paths in the underlying network may be used for the same multicast group to efficiently use bandwidth. The unique tunnel encapsulation headers may be configured by virtual network controller 22 such that each link direction in the multicast tree has a unique virtual network tunnel encapsulation. The replication and forwarding of multicast packets is only performed by virtual switches 30 executed on servers 12 in the virtual network. No replication is performed within the underlying network. In this way, the techniques enable multicast service within a virtual network without requiring multicast support in the underlying network.

Various examples are described in the following clauses. The examples set forth in any of the following clauses may be incorporated and implemented in combination with any of the other examples described throughout this disclosure in accordance with the techniques described herein Clause 1. A method comprising: creating, with a virtual network controller of a virtual network, a multicast tree for endpoint devices of a multicast group in the virtual network; storing the multicast tree in a memory within the virtual network controller; and communicating, with the virtual network controller, the multicast tree to one or more of the endpoint devices of the multicast group in order to instruct virtual switches executed on the endpoint devices to replicate and forward multicast packets according to the multicast tree.

Clause 2. The method of clause 1, wherein communicating the multicast tree to a particular one of the endpoint devices comprises communicating one or more forwarding entries of the multicast tree relevant to the particular one of the endpoint devices.

Clause 3. The method of clause 2, wherein the one or more forwarding entries include next hop information of the multicast tree, and wherein the next hop information includes a chained next hop that specifies replication to be performed on each of the multicast packets for the multicast group by the particular one of the endpoint devices.

Clause 4. The method of any of clauses 1-3, wherein creating the multicast tree comprises configuring a unique virtual network tunnel encapsulation for each link direction in the multicast tree.

Clause 5. The method of any of clauses 1-4, wherein creating the multicast tree comprises creating the multicast tree based on one or more of membership information for the multicast group, network topology information of a physical network underlying the virtual network, and network topology information of the virtual network.

Clause 6. The method any of clauses 1-5, wherein creating the multicast tree comprises creating the multicast tree to minimize a replication limit for each of the endpoint devices in the multicast group.

Clause 7. The method any of clauses 1-6, wherein creating the multicast tree comprises creating the multicast tree to balance a replication limit for each of the endpoint devices in the multicast group with a tree depth of the multicast tree.

Clause 8. The method any of clauses 1-7, wherein the virtual network controller of the virtual network comprises a centralized controller of a virtual overlay network of a data center switch fabric.

Clause 9. The method any of clauses 1-8, wherein the multicast tree comprises one of a unidirectional multicast tree or a bidirectional multicast tree.

Clause 10. A method comprising: receiving, with an endpoint device of a multicast group in a virtual network, multicast packets to be forwarded on the virtual network according to a multicast tree for the multicast group, the multicast tree created by a virtual network controller of the virtual network; replicating, with a virtual switch executed on the endpoint device, the multicast packets for the multicast group according to the multicast tree; and forwarding, with the virtual switch executed on the endpoint device, the replicated multicast packets using tunnel encapsulations to one or more other endpoint devices of the multicast group according to the multicast tree.

Clause 11. The method of clause 10, further comprising receiving, with the endpoint device from the virtual network controller, one or more forwarding entries of the multicast tree relevant to the endpoint device.

Clause 12. The method of clause 11, wherein the one or more forwarding entries include next hop information of the multicast tree, and wherein the next hop information includes a chained next hop that specifies replication to be performed on each of the multicast packets for the multicast group by the endpoint device.

Clause 13. The method of any of clauses 10-12, wherein forwarding the multicast packets comprises encapsulating each copy of the multicast packets with a unique virtual network tunnel encapsulation configured by the virtual network controller.

Clause 14. The method of any of clauses 10-13, wherein replicating the multicast packets comprises replicating the multicast packets based on a minimized replication limit for the endpoint device.

Clause 15. The method of any of clauses 10-14, wherein the endpoint device comprises a source node of the multicast tree that replicates and forwards multicast packets to one or more other endpoint devices of the multicast group according to the multicast tree.

Clause 16. The method of clause any of clauses 10-14, wherein the endpoint device comprises an intermediate node that receives multicast packets from another endpoint device of the multicast group, and replicates and forwards the multicast packets to one or more other endpoint devices of the multicast group according to the multicast tree without sending the multicast packets on a link to the endpoint device from which the multicast packets were received.

Clause 17. The method of clause any of clauses 10-14, wherein the endpoint device in the virtual network comprises a server in a virtual overlay network of a data center switch fabric.

Clause 18. The method of clause 10, wherein the multicast tree comprises one of a unidirectional multicast tree or a bidirectional multicast tree.

Clause 19. A virtual network controller of a virtual network comprising: a memory; and one or more processor configured to create a multicast tree for endpoint devices of a multicast group in the virtual network, store the multicast tree in the memory of the virtual network controller, and communicate the multicast tree to one or more of the endpoint devices of the multicast group in order to instruct virtual switches executed on the endpoint devices to replicate and forward multicast packets according to the multicast tree.

Clause 20. The virtual network controller of clause 19, wherein the processors are configured to communicate the multicast tree to a particular one of the endpoint devices as one or more forwarding entries of the multicast tree relevant to the particular one of the endpoint devices.

Clause 21. The virtual network controller of clause 20, wherein the one or more forwarding entries include next hop information of the multicast tree, and wherein the next hop information includes a chained next hop that specifies replication to be performed on each of the multicast packets for the multicast group by the particular one of the endpoint devices.

Clause 22. The virtual network controller of any of clauses 19-21, wherein the processors are configured to configure a unique virtual network tunnel encapsulation for each link direction in the multicast tree.

Clause 23. The virtual network controller of any of clauses 19-22, wherein the processors are configured to create the multicast tree based on one or more of membership information for the multicast group, network topology information of a physical network underlying the virtual network, and network topology information of the virtual network.

Clause 24. The virtual network controller of any of clauses 19-22, wherein the processors are configured to create the multicast tree to minimize a replication limit for each of the endpoint devices in the multicast group.

Clause 25. The virtual network controller of any of clauses 19-22, wherein the processor are configured to create the multicast tree to balance a replication limit for each of the endpoint devices in the multicast group with a tree depth of the multicast tree.

Clause 26. The virtual network controller any of clauses 19-25, wherein the virtual network controller of the virtual network comprises a centralized controller of a virtual overlay network of a data center switch fabric.

Clause 27. An endpoint device in a virtual network comprising: one or more processors configured to receive multicast packets for a multicast group to which the endpoint device belongs to be forwarded on the virtual network according to a multicast tree for the multicast group, wherein the multicast tree is created by a virtual network controller of the virtual network; and a virtual switch executed on the processors configured to replicate the multicast packets for the multicast group according to the multicast tree, and forward the replicated multicast packets using tunnel encapsulations to one or more other endpoint devices of the multicast group according to the multicast tree.

Clause 28. The endpoint device of clause 27, wherein the processors are configured to receive, from the virtual network controller, one or more forwarding entries of the multicast tree relevant to the endpoint device.

Clause 29. The endpoint device of any of clauses 27-28, wherein the one or more forwarding entries include next hop information of the multicast tree, and wherein the next hop information includes a chained next hop that specifies replication to be performed on each of the multicast packets for the multicast group by the endpoint device.

Clause 30. The endpoint device of any of clauses 27-29, wherein the virtual switch is configured to encapsulate each copy of the multicast packets with a unique virtual network tunnel encapsulation configured by the virtual network controller.

Clause 31. The endpoint device of clause any of clauses 27-30, wherein the virtual switch is configured to replicate the multicast packets based on a minimized replication limit for the endpoint device.

Clause 32. The endpoint device of any of clauses 27-31, wherein the endpoint device comprises a source node of the multicast tree that replicates and forwards multicast packets to two or more other endpoint devices of the multicast group according to the multicast tree.

Clause 33. The endpoint device of any of clauses 27-31, wherein the endpoint device comprises an intermediate node that receives multicast packets from another endpoint device of the multicast group, and replicates and forwards the multicast packets to one or more other endpoint devices of the multicast group according to the multicast tree without sending the multicast packets on a link to the endpoint device from which the multicast packets were received.

Clause 34. The endpoint device of any of clauses 27-31, wherein the endpoint device in the virtual network comprises a server in a virtual overlay network of a data center switch fabric.

Clause 35. A system of a virtual network, the system comprising: a virtual network controller configured to create a multicast tree for endpoint devices of a multicast group in the virtual network, store the multicast tree in a memory within the virtual network controller, and communicate the multicast tree to one or more of the endpoint devices of the multicast group; and one of the endpoint devices of the multicast group configured to receive multicast packets for the multicast group to be forwarded on the virtual network, and execute a virtual switch to replicate the multicast packets for the multicast group according to the multicast tree, and forward the replicated multicast packets using tunnel encapsulations to one or more of the other endpoint devices of the multicast group according to the multicast tree.

Clause 36. A computer-readable storage medium comprising instructions that when executed cause one or more processors to: create, with a virtual network controller of a virtual network, a multicast tree for endpoint devices of a multicast group in the virtual network; store the multicast tree in a memory within the virtual network controller; and communicate, with the virtual network controller, the multicast tree to one or more of the endpoint devices of the multicast group in order to instruct virtual switches executed on the endpoint devices to replicate and forward multicast packets according to the multicast tree.

Clause 37. A computer-readable storage medium comprising instructions that when executed cause one or more processors to: receive, with an endpoint device of a multicast group in a virtual network, multicast packets to be forwarded on the virtual network according to a multicast tree for the multicast group, the multicast tree created by a virtual network controller of the virtual network; replicate, with a virtual switch executed on the endpoint device, the multicast packets for the multicast group according to the multicast tree; and forward, with the virtual switch executed on the endpoint device, the replicated multicast packets using tunnel encapsulations to one or more other endpoint devices of the multicast group according to the multicast tree.

Multitenant Server for Virtual Networks within Datacenter

In general, techniques are described to facilitate multi-tenancy in the context of a vendor-neutral server, such as an Interface for Metadata Access Point (IF-MAP) server. The various techniques described in this disclosure may provide for a multi-tenant IF-MAP server in the context of a number of virtual networks executing within a data center, where each of the virtual networks are associated with a different tenant and access the IF-MAP server to maintain session data. Virtual switches that support these virtual networks may ensure identifiers associated with the session data may be globally unique across the virtual networks so as to effectively maintain separate or non-overlapping virtual IF-MAP server spaces for each of the virtual networks. To ensure this separation, the virtual switches may translate identifiers in responses from the virtual networks from locally unique identifiers that are unique within the context of the virtual network to globally unique identifiers that are unique across all of the virtual networks. Typically, this translation involves appending a namespace to the identifier in the response to create a globally unique identifier in the form of "namespace:identifier." In this manner, the techniques may facilitate multi-tenancy within vendor-neutral databases.

Figure 26:
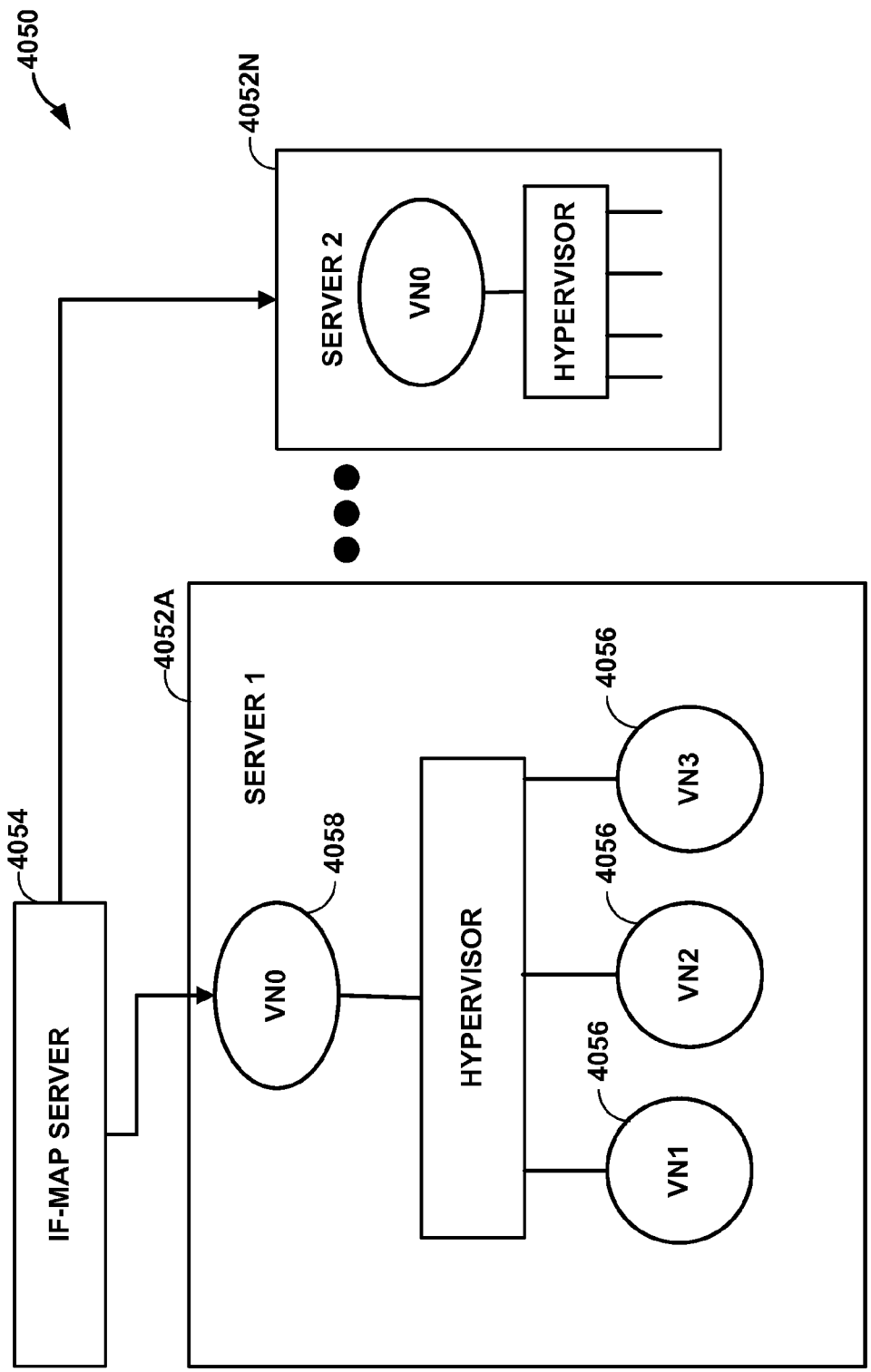
FIG. 26 is another block diagram illustrating a system that stores session information in accordance with various aspects of the techniques described in this disclosure.

FIG. 26 is block diagram illustrating a system 4050 that stores session information in accordance with various aspects of the techniques described in this disclosure. Multiple servers 4052A-4052N ("servers 4052") have access to IF-MAP server 4054. Servers 4052 may each represent one of servers 12 shown in the examples above. IF-MAP server 4054 may represent IF-MAP server 26 in some examples. As described above, IF-MAP server 4054 is virtualization-aware, and may use a format such as "namespace:identifier." Also, multiple tenants have access to IF-MAP server 26. Each of servers 4052 has multiple tenants VN1, VN2, VN3 (which may be referred to collectively as "VNs 4056") and a translator VN0 (which may also be referred to as translator 4058") that includes data defining all the tenants managed by its corresponding one of servers 4052.

Upon receiving a query from a subnet VN1 that belongs to, for example, CompanyA, the translator VN0 converts the query into a globally unique query by adding the unique namespace of the querying tenant (in this case, CompanyA). For example, suppose a query is generated by Company A about Employee#5. Without the translator VN0, a query regarding Employee#5 may not be processed because CompanyB and CompanyC may also have an identifier Employee#5 in their respective namespaces and IF-MAP server 4054 would not know to which Employee#5 the query pertains. The translator VN0 translates the query "Employee#5" into "CompanyA: Employee#5" by identifying the connection through which the query came in. With the translated query that is globally unique, IF-MAP server 4052 can be used efficiently given that multiple tenants may "share" the same IF-MAP server, i.e., IF-MAP server 4054 in the example of FIG. 3.

The query result generated by IF-MAP server 4054 may include the namespace "CompanyA." The translator VN0 may strip the namespace before forwarding the result to the subnet VN1 because the subnet VN1 may not recognize the result that includes the namespace "CompanyA."

Typically, VNs 4056 forward all packets that are directed to resources internal to data center 10 to VN 4058, which represents the VN for data center 10. In other words, when configuring VNs 4056, each of VNs 4056 are configured to forward requests for resources internal to data center 10, such as IF-MAP server 4054, to VN 4058. VN 4058 may then process these requests, which in the case of IF-MAP server 4054 may include translating this identifier (which is layer seven (L7) data in terms of the Open Systems Interconnection (OSI) model) and modifying the request to replace this identifier with the globally unique identifier.

Although not shown in the example of FIG. 3, VN 4058 may also include a table or other data structure that identifies which of VNs 4056 have been configured to use a namespace so as to automatically generate globally unique identifiers and which of VNs 4056 have not been configured to use a namespace so as to automatically generation globally unique identifiers. That is, some of VNs 4056 may be configured to use a namespace when formatting requests for session data associated with a particular identifier, while others of VNs 4056 may not be configured to use a namespace in this manner. For those of VNs 4056 not configured to use a namespace, translator 4058 may transparently translate the identifier in these requests to generate an updated request having the globally unique identifier in place of the identifier generated by those of VNs 4056 that do not use namespaces. VN 4058 may maintain a data structure to identify those of VNs 4056 that use namespaces and those that do not use namespaces, using this table to process both requests sent to and responses from IF-MAP server 4054.

Figure 27:
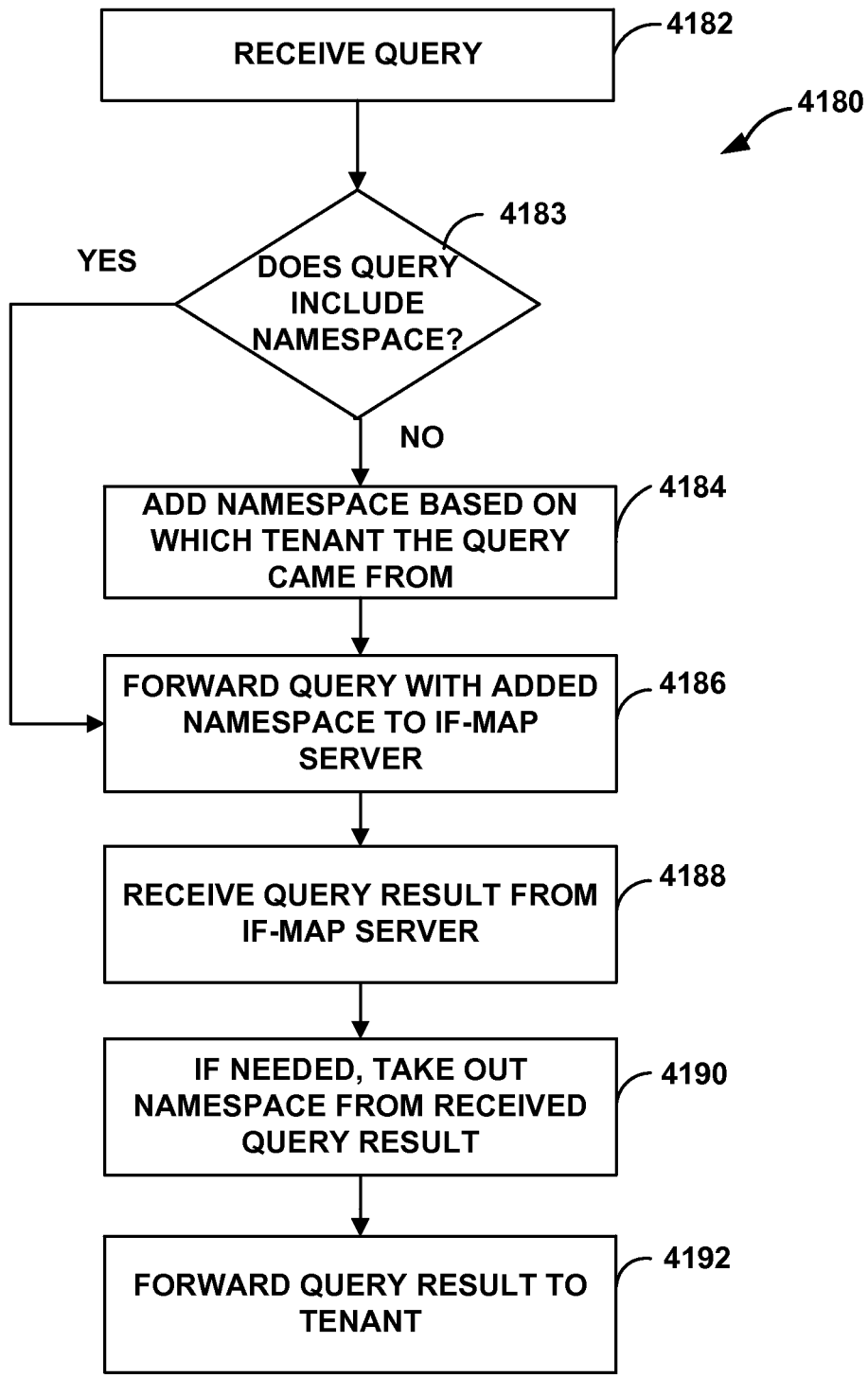
FIG. 27 is a flowchart depicting operation of a virtual switch executed by server a server in performing the query translation process according to various aspects of the techniques described in this disclosure.

FIG. 27 is a is a flowchart depicting operation of a virtual switch executed by a server in performing the query translation process according to various aspects of the techniques described in this disclosure. Typically, the query translation process (denoted as query translation process "4180" in the example of FIG. 35) would be executed in server 4052A, for example, by the translator VN0 (or in server 4052A, for example, by VN 4058). In some instances, one or more of configuration VMs 108 may execute query translation process 4180.

The translator VN0 receives a query (e.g., for data associated with the identifier "Employee#5") from one of the tenants (step 4182), such as CompanyA that is hosted by subnet VN1. If the query does not include a namespace (step 4183), the translator VN0 globalizes the query by adding a namespace to it based on from which tenant the query came (step 4184). If the query already includes a namespace, then no namespace is added and step 4184 may be bypassed. The query with the added namespace may now be "CompanyA: Employee#5." This query with the added namespace is then forwarded to IF-MAP server 4054 (step 4186), and a result is received (step 4188). The result includes the namespace "CompanyA," as the IF-MAP server 4054 is universal and handles queries from different subnets 218. For example, the result may be "CompanyA:Miami." If the original query did not include a namespace, the translator VN0 takes out of the namespace (step 4190) and forwards the result ("Miami") to the tenant (step 4192). If the original query included a namespace, the Translator VN0 may forward the query result to the tenant without taking out the namespace.

With the query translation process 4180, server 4052A may automatically add the namespace to an identifier without the client or tenant being aware of the naming scheme. Server 4052A may, in this sense, effectively translate between a locally unique identifier and a globally unique identifier, allowing multiple tenants to share the IF-MAP server 4054.

As described above, the techniques may facilitate multi-tenancy of a server accessed by virtual networks of a data center. Various examples are described in the following clauses. The examples set forth in any of the following clauses may be incorporated and implemented in combination with any of the other examples described throughout this disclosure in accordance with the techniques described herein Clause 1. A method comprising: receiving, with a virtual switch that supports a plurality of virtual networks executing within a data center, a request regarding data associated with an identifier that is unique within one of the plurality of virtual networks that originated the request; translating the identifier included within the request to generate a globally unique identifier that is unique within the plurality of virtual networks; updating the request to replace the identifier included within the request with the globally unique identifier; and transmitting the updated request to a server of the data center.

Clause 2. The method of clause 1, wherein translating the identifier included within the request comprises appending a namespace assigned to the one of the virtual networks that originated the request to the identifier to generate the globally unique identifier.

Clause 3. The method of any of clauses 1-2, wherein the one of the plurality of virtual network that originated the request comprises a first one of the plurality of virtual networks, wherein the request comprises a first request, wherein the globally unique identifier comprises a first globally unique identifier, and wherein the method further comprises: receiving, with the virtual switch, a second request regarding data associated with the same identifier as that included in the first request, wherein the same identifier is also unique within a second one of the plurality of virtual networks that originated the second request; translating the identifier included within the second request to generate a second globally unique identifier that is unique within the plurality of virtual networks and different from the first globally unique identifier; updating the second request to replace the second identifier included within the second request with the second globally unique identifier; and transmitting the updated second request to the server.

Clause 4. The method of any of clauses 1-3, further comprising: receiving a response from the server that includes the globally unique identifier; translating the globally unique identifier to recover the identifier included within the request; updating the response to replace the globally unique identifier with the recovered identifier; and transmitting the response to the one of the plurality of virtual networks that issued the request.

Clause 5. The method of clause 4, wherein translating the request comprises transparently translating the identifier included within the request to generate the globally unique identifier that is unique within the plurality of virtual networks such that the one of the plurality of virtual networks that originated the response does not detect the translation, and wherein translating the globally unique identifier comprises transparently translating the globally unique identifier included within the response to recover the identifier included within the request such that the one of the plurality of virtual networks that originated the response is not aware of the translation.

Clause 6. The method of clause any of clauses 1-5, wherein translating the identifier comprises transparently translating the identifier included within the request to generate the globally unique identifier that is unique within the plurality of virtual networks such that the one of the plurality of virtual networks that originated the response is not aware of the translation.

Clause 7. The method of clause any of clauses 1-6, wherein the request conforms to a vendor neutral protocol, and wherein the server comprises a vendor neutral server that stores data in accordance with a vendor neutral data model.

Clause 8. The method of any of clauses 1-5, wherein the request conforms to an Interface for Metadata Access Point (IF-MAP) protocol, and wherein the server comprises an IF-MAP server that stores data in accordance with an IF-MAP data model.

Clause 9. The method of clause 1, wherein each of the plurality of virtual networks is associated with a different customer of the data center, and wherein the server comprises a multi-tenant server that stores data for at least two of the different customers.

Clause 10. A device included within a data center comprising: one or more processors configured to execute a virtual switch that supports a plurality of virtual networks executing within the data center, wherein the virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server of the data center.

Clause 11. The device of clause 10, wherein the one or more processors are further configured to, when translating the identifier included within the request, append a namespace assigned to the one of the virtual networks that originated the request to the identifier to generate the globally unique identifier.

Clause 12. The device of any of clauses 10-11, wherein the one of the plurality of virtual network that originated the request comprises a first one of the plurality of virtual networks, wherein the request comprises a first request, wherein the globally unique identifier comprises a first globally unique identifier, and wherein the one or more processors are further configured to receive a second request regarding data associated with the same identifier as that included in the first request, wherein the same identifier is also unique within a second one of the plurality of virtual networks that originated the second request, translate the identifier included within the second request to generate a second globally unique identifier that is unique within the plurality of virtual networks and different from the first globally unique identifier, update the second request to replace the second identifier included within the second request with the second globally unique identifier, and transmit the updated second request to the server.

Clause 13. The device of any of clauses 10-12, wherein the one or more processors are further configured to receive a response from the server that includes the globally unique identifier, translate the globally unique identifier to recover the identifier included within the request, update the response to replace the globally unique identifier with the recovered identifier, and transmit the response to the one of the plurality of virtual networks that issued the request.

Clause 14. The device of clause 13, wherein the one or more processors are further configured to, when translating the request, transparently translate the identifier included within the request to generate the globally unique identifier that is unique within the plurality of virtual networks such that the one of the plurality of virtual networks that originated the response does not detect the translation, and wherein the one or more processors are further configured to, when translating the globally unique identifier, transparently translate the globally unique identifier included within the response to recover the identifier included within the request such that the one of the plurality of virtual networks that originated the response is not aware of the translation.

Clause 15. The device of any of clauses 10-14, wherein the one or more processors are further configured to, when translating the identifier, transparently translate the identifier included within the request to generate the globally unique identifier that is unique within the plurality of virtual networks such that the one of the plurality of virtual networks that originated the response is not aware of the translation.

Clause 16. The device of any of clauses 10-15, wherein the request conforms to a vendor neutral protocol, and wherein the server comprises a vendor neutral server that stores data in accordance with a vendor neutral data model.

Clause 17. The device of any of clauses 10-15, wherein the request conforms to an Interface for Metadata Access Point (IF-MAP) protocol, and wherein the server comprises an IF-MAP server that stores data in accordance with an IF-MAP data model.

Clause 18. The device of clause 10, wherein each of the plurality of virtual networks is associated with a different customer of the data center, and wherein the server comprises a multi-tenant server that stores data for at least two of the different customers.

Clause 19. A non-transitory computer readable storage medium having stored thereon instructions that, when executed, cause one or more processors of a device included within a data center to execute a virtual switch that supports a plurality of virtual networks executing within the data center, wherein the virtual switch is configured to receive a request regarding data associated with an identifier that is unique within one of the plurality of virtual networks that originated the request, translate the identifier included within the request to generate a globally unique identifier that is unique within the plurality of virtual networks, update the request to replace the identifier included within the request with the globally unique identifier, and transmit the updated request to a server.

Facilitating Operation of One or More Virtual Networks

In general, techniques for facilitating the operation of one or more virtual networks using a distributed virtual network controller are described. The one or more virtual networks may include at least a server device that is connected to an Internet Protocol network through at least a switch device. The system may include a first controller node device configured to control operation of a first set of elements in the one or more virtual networks. The system may further include a second controller node device configured to control operation of a second set of elements in the one or more virtual networks. The first controller node device and the second controller node device may be peered using a peering protocol and may be peers according to the peering protocol. The system may include hardware (and software) associated with one or more of the first controller node device and the second controller node device.

Figure 28:
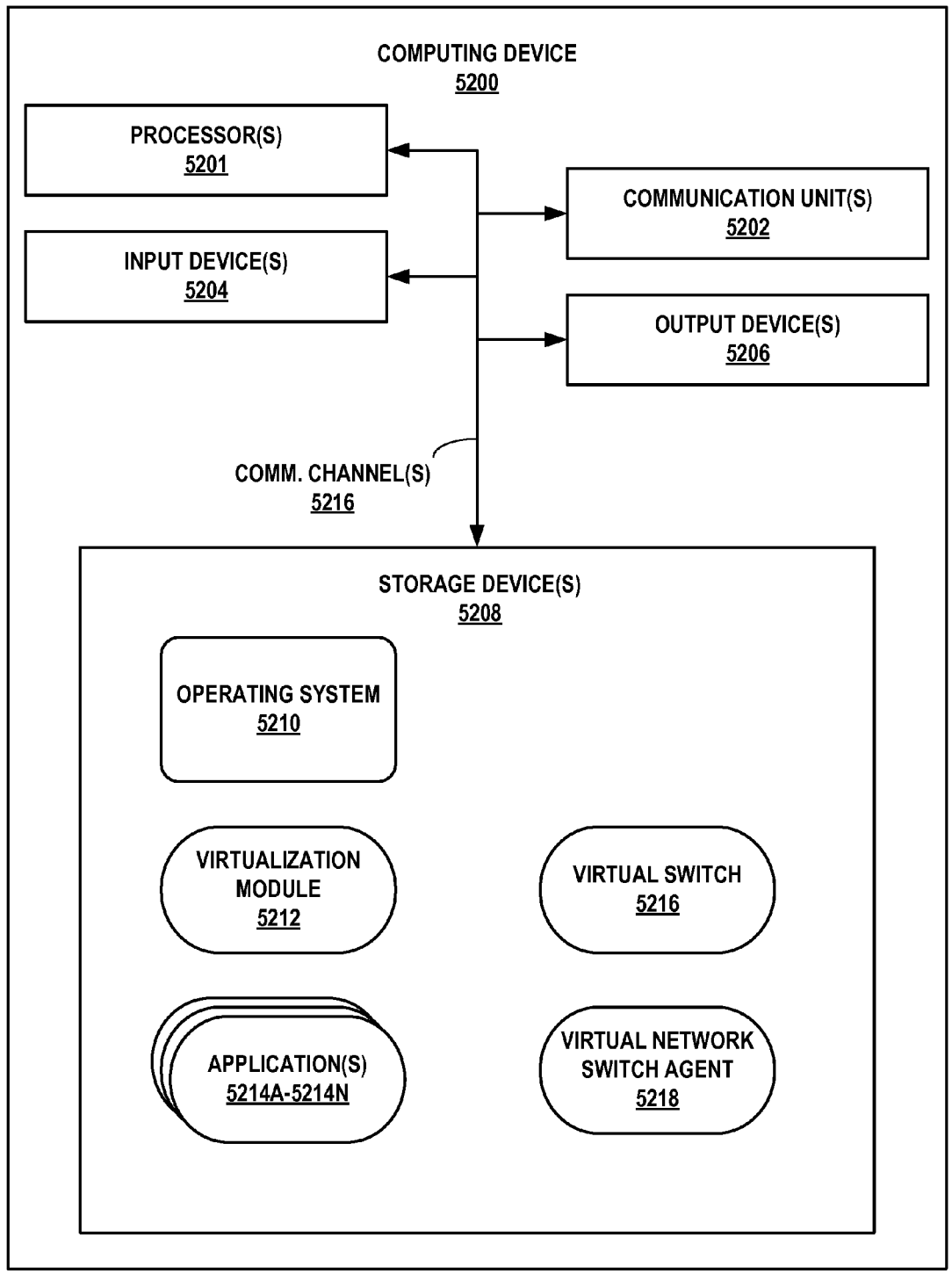
FIG. 28 is a block diagram illustrating an example computing device for facilitating operation of one or more virtual networks, in accordance with one or more aspects of the present disclosure.

FIG. 28 is a block diagram illustrating an example device 5200 for facilitating operation of one or more virtual networks in accordance with one or more aspects of the present disclosure. FIG. 28 illustrates only one particular example of computing device 5200, and many other examples of computing device 5200 may be used in other instances. Computing device 5200 may, for instance, represent an example instance of any of servers 12 of FIG. 1.

As shown in the specific example of FIG. 28, computing device 5200 includes one or more processors 5201, one or more communication units 5202, one or more input devices 5204, one or more output devices 5206, and one or more storage devices 5208. Computing device 5200, in the specific example of FIG. 23, further includes operating system 5210, virtualization module 5212, and one or more applications 5214A-5214N (collectively "applications 5214"). Each of components 5201, 5202, 5204, 5206, and 5208 may be interconnected (physically, communicatively, and/or operatively) for inter-component communications. As one example in FIG. 28, components 5201, 5202, 5204, 5206, and 5208 may be coupled by one or more communication channels 5216. In some examples, communication channels 5216 may include a system bus, network connection, inter-process communication data structure, or any other channel for communicating data. Virtualization module 5212 and applications 5214, as well as operating system 5210 may also communicate information with one another as well as with other components in computing device 5200.

Processors 5201, in one example, are configured to implement functionality and/or process instructions for execution within computing device 5200. For example, processors 5201 may be capable of processing instructions stored in storage devices 5208. Examples of processors 5201 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 5208 may be configured to store information within computing device 5200 during operation. Storage devices 5208, in some examples, are described as a computer-readable storage medium. In some examples, storage devices 5208 are a temporary memory, meaning that a primary purpose of storage devices 5208 is not long-term storage. Storage devices 5208, in some examples, are described as a volatile memory, meaning that storage devices 5208 do not maintain stored contents when the computer is turned off. Examples of volatile memories include random access memories (RAM), dynamic random access memories (DRAM), static random access memories (SRAM), and other forms of volatile memories known in the art. In some examples, storage devices 5208 are used to store program instructions for execution by processors 5201. Storage devices 5208, in one example, are used by software or applications running on computing device 5200 (e.g., operating system 5210, virtualization module 5212 and the like) to temporarily store information during program execution.

Storage devices 5208, in some examples, also include one or more computer-readable storage media. Storage devices 5208 may be configured to store larger amounts of information than volatile memory. Storage devices 5208 may further be configured for long-term storage of information. In some examples, storage devices 5208 include non-volatile storage elements. Examples of such non-volatile storage elements include magnetic hard discs, tape cartridges or cassettes, optical discs, floppy discs, flash memories, or forms of electrically programmable memories (EPROM) or electrically erasable and programmable memories (EEPROM).

Computing device 5200, in some examples, also includes one or more communication units 5202. Computing device 5200, in one example, utilizes communication units 5202 to communicate with external devices. Communication units 5202 may communicate, in some examples, by sending data packets over one or more networks, such as one or more wireless networks, via inbound and outbound links. Communication units 5202 may include one or more network interface cards (IFCs), such as an Ethernet card, an optical transceiver, a radio frequency transceiver, or any other type of device that can send and receive information. Other examples of such network interfaces may include Bluetooth, 3G and Wi-Fi radio components.

Computing device 5200, in one example, also includes one or more input devices 5204. Input devices 5204, in some examples, are configured to receive input from a user through tactile, audio, or video feedback. Examples of input devices 5204 include a presence-sensitive display, a mouse, a keyboard, a voice responsive system, video camera, microphone or any other type of device for detecting a command from a user. In some examples, a presence-sensitive display includes a touch-sensitive screen.

One or more output devices 5206 may also be included in computing device 5200. Output devices 5206, in some examples, are configured to provide output to a user using tactile, audio, or video stimuli. Output devices 5206, in one example, include a presence-sensitive display, a sound card, a video graphics adapter card, or any other type of device for converting a signal into an appropriate form understandable to humans or machines. Additional examples of output devices 5206 include a speaker, a cathode ray tube (CRT) monitor, a liquid crystal display (LCD), or any other type of device that can generate intelligible output to a user.

Computing device 5200 may include operating system 5212. Operating system 5212, in some examples, controls the operation of components of computing device 5200. For example, operating system 5212, in one example, facilitates the communication of modules applications 5214 with processors 5201, communication units 5202, input devices 5204, output devices 5206, and storage devices 5210. Applications 5214 may each include program instructions and/or data that are executable by computing device 5200. As one example, application 5214A may include instructions that cause computing device 5200 to perform one or more of the operations and actions described in the present disclosure.

In accordance with techniques of the present disclosure, computing device 5200 may further include virtual switch 5216 and virtual network agent 5218, which may be executed by executed on virtualization module 5212 operating as a hypervisor or on a native operating system of computing device 5200. Virtual switch 5216 and virtual switch agent 5218 may execute virtual switch 174 and virtual network switch agent 172 of FIG. 5, respectively. Virtual switch 5216 may implement the layer 3 forwarding and policy enforcement point for one or more end points and/or one or more hosts (e.g., VMs 36) executing on computing device 5200. The one or more end points or one and/or one or more hosts may be classified into a virtual network due to configuration information received from a virtual network controller, such as VNC 22 of FIG. 1.

Techniques are described for facilitating the operation of one or more virtual networks using a distributed virtual network controller are described. Various examples are described in the following clauses. The examples set forth in any of the following clauses may be incorporated and implemented in combination with any of the other examples described throughout this disclosure in accordance with the techniques described herein Clause 1. A system comprising a first set of elements and a second set of elements that implement one or more virtual networks; first server device and a second server device each connected to a network by a switch fabric; a first controller node device configured to control operation of the first set of elements in the one or more virtual networks, wherein the first set of elements includes the first server device; and a second controller node device configured to control operation of the second set of elements in the one or more virtual networks, wherein the second set of elements includes the second server device, wherein the first controller node device and the second controller node device are peers according to a peering protocol by which the first controller node device and the second controller node device exchange information relating to the operation of the first set of elements and the second set of elements.

Clause 2. The system of clause 1, further comprising a virtual network switch of the first server device, the virtual network switch being configured to facilitate overlay of a plurality of networks in the one or more virtual networks by tunneling packets to the second server device using a layer 3 protocol.

Clause 3. The system of any of clauses 1-2, wherein the first controller node device includes a first analytics database for storing diagnostic information related to the first set of elements, wherein the second controller node device includes a second analytics database for storing diagnostic information related to the second set of elements, and wherein the first controller node device and the second controller node are configured to share at least some diagnostic data related to one or more of the first set of elements and the second set of elements.

Clause 4. The system of clause 3, wherein the first analytics database and the second analytics database are parts of a distributed database.

Clause 5. The system of any of clauses 1-4, wherein the first controller node device includes a first configuration database for storing configuration information related to the first set of elements using an Interface for Metadata Access Points protocol, wherein the second controller node device includes a second configuration database for storing configuration information related to the second set of elements, and wherein the first controller node device and the second controller node are configured to share at least some configuration data related to one or more of the first set of elements and the second set of elements.

Clause 6. The system of any of clauses 1-5, further comprising a user interface configured for interacting with the first controller node device and for interacting with the second controller node device.

Clause 7. The system of any of clauses 1-6, wherein the first controller node device is configured to use the peering protocol to provide information related to the first set of elements to the second controller node device.

Clause 8. The system of any of clauses 1-7, wherein the peering protocol is a Border Gateway Protocol.

Clause 9. The system of any of clauses 1-8, wherein the first controller node device includes a first control plane virtual machine, wherein the second controller node device includes a second control plane virtual machine, and wherein the first control plane virtual machine is configured to use the peering protocol to provide information related to the first set of elements to the second control plane virtual machine.

Clause 10. The system of any of clauses 1-9, further comprising a virtual network switch implemented in the first server device and configured to facilitate overlay of a plurality of networks in the one or more virtual networks, wherein the first control plane virtual machine is configured to use an eXtensible Messaging and Presence Protocol to communicate with the virtual network switch.

Clause 11. The system of any of clauses 1-9, wherein the first controller node device further includes a first configuration virtual machine configured to store configuration information related to the first set of elements, and wherein the first control plane virtual machine is configured to use at least one of an Extensible Messaging and Presence Protocol and an Interface for Metadata Access Points protocol to communicate with the first configuration virtual machine.

Clause 12. The system of any of clauses 1-9, wherein the first controller node device further includes a first analytics virtual machine configured to store diagnostic information related to the first set of elements, and wherein the first control plane virtual machine is configured use an eXtensible Messaging and Presence Protocol to communicate with the first analytics virtual machine.

Clause 13. The system of any of clauses 1-9, wherein the first control plane virtual machine includes a type of software of a particular version, and wherein the second control plane virtual machine includes the type of software of a different version that is different from the particular version.

Clause 14. A method for facilitating operation of one or more virtual networks, the one or more virtual networks including a first server device and a second server device each connected to a network by a switch fabric, the method comprising using a first controller node device to control operation of a first set of elements in the one or more virtual networks, wherein the first set of elements includes the first server device; using a second controller node device to control operation of a second set of elements in the one or more virtual networks, wherein the second set of elements includes the second server device; and peering the first controller node device and the second controller node device using a peering protocol to exchange information, between the first controller node device and the second controller node device, relating to the operation of the first set of elements and the second set of elements.

Clause 15. The method of clause 14, further comprising using a virtual network switch implemented in the server device and using a layer 3 protocol to facilitate overlay of a plurality of networks in the one or more virtual networks.

Clause 16. The method of any of clauses 14-15, further comprising using a first analytics database implemented in the first controller node device to store diagnostic information related to the first set of elements; using a second analytics database implemented in the second controller node device to store diagnostic information related to the second set of elements; and using the first controller node device to provide at least some diagnostic data related to one or more of the first set of elements and the second set of elements to the second controller node.

Clause 17. The method of any of clauses 14-16, wherein the first analytics database and the second analytics database are parts of a distributed database.

Clause 18. The method of any of clauses 14-17, further comprising using a first configuration database implemented in the first controller node device and using an Interface for Metadata Access Points protocol to store configuration information related to the first set of elements; using a second configuration database implemented in the second controller node device to store configuration information related to the second set of elements; and using the first controller node device to provide at least some configuration data related to one or more of the first set of elements and the second set of elements to the second controller node device.

Clause 19. A virtual network controller node device comprising one or more processors; a control plane virtual machine executed by the processors to communicate with a plurality of virtual network switches using an eXtensible Messaging and Presence Protocol (XMPP); a configuration virtual machine to store and manage a configuration database that includes configuration information for the virtual network switches; an analytics virtual machine to store and manage an analytics database that includes logging information for the virtual network switches, wherein the configuration virtual machine and analytics virtual machine communicate with the control plane virtual machine using an Interface for Metadata Access Points protocol, wherein the control plane virtual machine configures the virtual network switches by using XMPP to send route data and configuration information to the virtual network switches, and wherein the control plane virtual machine uses XMPP to receive logging information for the virtual network switches and routes the logging information to the analytics virtual machine for storage to the analytics database.

Clause 20. A network system comprising a switch fabric comprising a plurality of switches; a distributed controller having a set of controller node devices in peer communication with each other in accordance with a peering protocol, wherein each of the controller node devices configures and manages an overlay network within the plurality of switches; a plurality of servers interconnected by the switch fabric, wherein each of the servers comprises an operating environment executing one or more virtual machines in communication via the overlay networks, and wherein the servers comprises a set of virtual switches that extends the overlay network as virtual networks to the operating environment of the virtual machines.

Clause 21. The network system of clause 20, wherein the network comprises a network data center.

Clause 22. The network system of any of clauses 20-21, wherein the controller node devices exchange information relating to the operation of the virtual switches via the peering protocol.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A system comprising:
a first set of elements and a second set of elements that implement one or more virtual networks;
a first server device and a second server device each connected to a switch fabric;
a first virtual network controller node device configured to store route data and to store, to a first configuration database using an interface protocol, configuration information for the first set of elements and to send the route data and configuration information for the first set of elements to the first set of elements to control virtual switching operation of the first set of elements to implement a first one or more overlay networks, over the switch fabric, for tunneling packets among elements of the first set of elements for the one or more virtual networks, wherein the first set of elements includes the first server device; and
a second virtual network controller node device configured to store route data and to store, to a second configuration database using the interface protocol, configuration information for the second set of elements and to send the route data and configuration information for the second set of elements to the second set of elements to control virtual switching operation of the second set of elements to implement a second one or more overlay networks, over the switch fabric, for tunneling packets among elements of the second set of elements for the one or more virtual networks, wherein the second set of elements includes the second server device,
wherein the first virtual network controller node device and the second virtual network controller node device are peers according to a peering protocol by which the first virtual network controller node device and the second virtual network controller node device exchange information relating to the virtual switching operation of the first set of elements and the second set of elements, the information including the route data for the first set of elements and the route data for the second set of elements.

2. The system of claim 1, further comprising:
a virtual network switch of the first server device, the virtual network switch being configured to facilitate overlay of a plurality of networks in the one or more virtual networks by tunneling packets to the second server device using a layer 3 protocol.

3. The system of claim 1,
wherein the first virtual network controller node device includes a first analytics database for storing diagnostic information related to the first set of elements,
wherein the second virtual network controller node device includes a second analytics database for storing diagnostic information related to the second set of elements, and
wherein the first virtual network controller node device and the second virtual network controller node are configured to share at least some diagnostic data related to one or more of the first set of elements and the second set of elements.

4. The system of claim 3, wherein the first analytics database and the second analytics database are parts of a distributed database.

5. The system of claim 1,
wherein the first virtual network controller node device includes a first configuration database for storing the configuration information for the first set of elements using an Interface for Metadata Access Points protocol,
wherein the second virtual network controller node device includes a second configuration database for storing the configuration information for the second set of elements, and
wherein the first virtual network controller node device and the second virtual network controller node are configured to share at least some configuration data for one or more of the first set of elements and the second set of elements.

6. The system of claim 1, further comprising:
a user interface configured for interacting with the first virtual network controller node device and for interacting with the second virtual network controller node device.

7. The system of claim 1, wherein the first virtual network controller node device is configured to use the peering protocol to provide the information related to the virtual switching operation of the first set of elements to the second virtual network controller node device.

8. The system of claim 1, wherein the peering protocol is a Border Gateway Protocol.

9. The system of claim 1,
wherein the first virtual network controller node device includes a first control plane virtual machine,
wherein the second virtual network controller node device includes a second control plane virtual machine, and
wherein the first control plane virtual machine is configured to use the peering protocol to provide the information related to the virtual switching operation of the first set of elements to the second control plane virtual machine.

10. The system of claim 9, further comprising:
a virtual network switch implemented in the first server device and configured to facilitate overlay of a plurality of networks in the one or more virtual networks, wherein the first control plane virtual machine is configured to use an eXtensible Messaging and Presence Protocol to communicate with the virtual network switch.

11. The system of claim 9,
wherein the first virtual network controller node device further includes a first configuration virtual machine configured to store the configuration information for the first set of elements, and
wherein the first control plane virtual machine is configured to use at least one of an Extensible Messaging and Presence Protocol and an Interface for Metadata Access Points protocol to communicate with the first configuration virtual machine.

12. The system of claim 9,
wherein the first virtual network controller node device further includes a first analytics virtual machine configured to store diagnostic information related to the first set of elements, and wherein the first control plane virtual machine is configured use an eXtensible Messaging and Presence Protocol to communicate with the first analytics virtual machine.

13. The system of claim 9,
wherein the first control plane virtual machine includes a type of software of a particular version, and
wherein the second control plane virtual machine includes the type of software of a different version that is different from the particular version.

14. A method for facilitating operation of one or more virtual networks, the one or more virtual networks including a first server device and a second server device each connected to a switch fabric, the method comprising:
using a first virtual network controller node device to store route data and configuration information for the first set of elements and to send the route data and to store, to a first configuration database using an interface protocol, configuration information for the first set of elements to the first set of elements to control operation of a first set of elements to implement a first one or more overlay networks, over the switch fabric, for tunneling packets among elements of the first set of elements for in the one or more virtual networks, wherein the first set of elements includes the first server device;
using a second virtual network controller node device to store route data and to store, to a second configuration database using the interface protocol, configuration information for the second set of elements and to send the route data and configuration information for the second set of elements to the second set of elements to control operation of a second set of elements to implement a second one or more overlay networks, over the switch fabric, for tunneling packets among elements of the second set of elements for the one or more virtual networks, wherein the second set of elements includes the second server device; and
peering the first virtual network controller node device and the second virtual network controller node device using a peering protocol to exchange information, between the first virtual network controller node device and the second virtual network controller node device, relating to the virtual switching operation of the first set of elements and the second set of elements, the information including the route data for the first set of elements and the route data for the second set of elements.

15. The method of claim 14, further comprising:
using a virtual network switch implemented in the server device and using a layer 3 protocol to facilitate overlay of a plurality of networks in the one or more virtual networks.

16. The method of claim 14, further comprising:
using a first analytics database implemented in the first virtual network controller node device to store diagnostic information related to the first set of elements;
using a second analytics database implemented in the second virtual network controller node device to store diagnostic information related to the second set of elements; and
using the first virtual network controller node device to provide at least some diagnostic data related to one or more of the first set of elements and the second set of elements to the second virtual network controller node device.

17. The method of claim 16, wherein the first analytics database and the second analytics database are parts of a distributed database.

18. The method of claim 14, further comprising:
using a first configuration database implemented in the first virtual network controller node device and using an Interface for Metadata Access Points protocol to store the configuration information for the first set of elements;
using a second configuration database implemented in the second virtual network controller node device to store the configuration information for the second set of elements; and
using the first virtual network controller node device to provide at least some configuration data for one or more of the first set of elements and the second set of elements to the second virtual network controller node device.

19. A virtual network controller node device comprising:
a memory;
one or more processors operably coupled to the memory;
a control plane virtual machine executed by the processors to communicate with a plurality of virtual network switches using an eXtensible Messaging and Presence Protocol (XMPP);
a configuration virtual machine to store and manage a configuration database that includes configuration information for the virtual network switches;
an analytics virtual machine to store and manage an analytics database that includes logging information for the virtual network switches, wherein the configuration virtual machine and analytics virtual machine communicate with the control plane virtual machine using an Interface for Metadata Access Points protocol,
wherein the control plane virtual machine configures the virtual network switches by using XMPP to send route data and configuration information to the virtual network switches, and
wherein the control plane virtual machine uses XMPP to receive logging information for the virtual network switches and routes the logging information to the analytics virtual machine for storage to the analytics database.

20. A network system comprising:
a switch fabric comprising a plurality of switches;
a distributed controller having a set of virtual network controller node devices in peer communication with each other in accordance with a peering protocol, wherein each of the virtual network controller node devices stores route data and stores, to a corresponding configuration database using an interface protocol, configuration information for a corresponding virtual network of a plurality of virtual networks and configures and manages at least one overlay network implemented at least in part by the plurality of switches;
a plurality of servers interconnected by the switch fabric, wherein each of the servers comprises an operating environment executing one or more virtual machines in communication via the at least one overlay network, and wherein the servers comprise a set of virtual switches that extends the at least one overlay network as virtual networks to the operating environment of the virtual machines using route data and configuration information for the plurality of virtual networks received from the virtual network controller node devices,
wherein the virtual network controller node devices communicate in the peer communication with each other in accordance with the peering protocol to exchange information relating to virtual switching operations of the virtual switches for tunneling packets among the servers for the virtual networks, the information including the route data for the plurality of virtual networks.

21. The network system of claim 20, wherein the switch fabric is a located within a network data center.

22. The network system of claim 20, wherein the virtual network controller node devices exchange information relating to the operation of the virtual switches via the peering protocol.

* * * * *